US012647956B2

(12) United States Patent
Yuan et al.

(10) Patent No.: US 12,647,956 B2
(45) Date of Patent: Jun. 2, 2026

(54) WIRELESS COMMUNICATION METHOD AND APPARATUS

(71) Applicant: HUAWEI TECHNOLOGIES CO., LTD., Shenzhen (CN)

(72) Inventors: Shitong Yuan, Chengdu (CN); Fengwei Liu, Chengdu (CN); Xinghua Song, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 321 days.

(21) Appl. No.: 18/475,448

(22) Filed: Sep. 27, 2023

(65) Prior Publication Data

US 2024/0032004 A1 Jan. 25, 2024

Related U.S. Application Data

(63) Continuation of application No. PCT/CN2022/085193, filed on Apr. 2, 2022.

(30) Foreign Application Priority Data

Apr. 2, 2021 (CN) .......................... 202110363709.8

(51) Int. Cl.
*H04W 72/0446* (2023.01)
*H04W 72/0453* (2023.01)
*H04W 72/232* (2023.01)

(52) U.S. Cl.
CPC ... *H04W 72/0446* (2013.01); *H04W 72/0453* (2013.01); *H04W 72/232* (2023.01)

(58) Field of Classification Search
CPC ......... H04W 72/0446; H04W 72/0453; H04W 72/232; H04W 72/20; H04W 72/044;
(Continued)

(56) References Cited

U.S. PATENT DOCUMENTS 10,708,907 B2 * 7/2020 He ...................... H04W 72/541
2009/0262699 A1 * 10/2009 Wengerter ........... H04L 1/1812
370/330
(Continued)

FOREIGN PATENT DOCUMENTS

EP 3520311 B1 3/2021

OTHER PUBLICATIONS

NTT Docomo, Inc.: "Resource multiplexing between child and parent links of an IAB node", 3GPP TSG RAN WG1 #104-e, e-Meeting, Jan. 25-Feb. 5, 2021, R1-2101628, total 10 pages.
(Continued)

*Primary Examiner* — Dady Chery
(74) *Attorney, Agent, or Firm* — HAUPTMAN HAM, LLP

(57) ABSTRACT

This application provides a wireless communication method and apparatus. The wireless communication method includes: receiving indication information of a first pattern, where the first pattern is one of a plurality of patterns, each of the plurality of patterns indicates distribution of at least one resource in frequency domain, and the at least one resource includes at least one of a first resource, a second resource, and a third resource, where the first resource is a definitely available resource, the second resource is an unavailable resource, and availability of the third resource depends on a further indication of an upper-level node; and communicating with a second network device and/or a terminal device based on the first pattern.

20 Claims, 13 Drawing Sheets

(58) Field of Classification Search
CPC ................ H04W 72/23; H04W 84/047; H04B
7/15542; H04L 5/0062; H04L 5/1469;
H04L 5/0007; H04L 5/0053; H04L
5/0058; H04L 5/0094
See application file for complete search history.

(56) References Cited

U.S. PATENT DOCUMENTS

2016/0353418 A1 * 12/2016 Golitschek Edler von Elbwart ...
H04L 5/0044
2020/0092866 A1 3/2020 Xue et al.

OTHER PUBLICATIONS

Japanese Office Action issued in corresponding Japanese Patent
Application No. 2023-560649, dated Dec. 10, 2024, pp. 1-10.
Extended European Search Report issued in corresponding Euro-
pean Application No. 22779182.9, dated Sep. 16, 2024, pp. 1-11.
India Office Action issued in corresponding India Application No.
202337067506, dated Apr. 2, 2025, pp. 1-5.

* cited by examiner

Integrated access and backhaul
IAB node

Distributed
unit DU

Mobile
terminal
MT

Access link

Backhaul link

Donor base
station

UE 1

IAB node 1

Backhaul link

Access link

IAB node 2

UE 2

Mobile terminal MT
(frequency domain resource
occupied to communicate
with an upper-level node)

Guard band

Distributed unit DU
(frequency domain resource
occupied to provide access
for UE or a lower-level IAB)

Frequency

Time

Mobile terminal MT 1
(frequency domain resource
occupied to communicate
with an upper-level node #1)

Guard band

Mobile terminal MT 2
(frequency domain resource
occupied to communicate
with an upper-level node #2)

Distributed unit DU
(frequency domain resource
occupied to provide access
for UE or a lower-level IAB)

Frequency

Time

Frequency domain NA overrides time domain H

1500

Donor base station

First IAB node

S1510. Configure a time domain H/S/NA

S1520. Configure some slots as non-TDM slots

S1530. Configuration information of frequency domain resource segmentation

S1540. Send DCI indicating availability of each frequency domain resource segment in each slot Non time division multiplexing slot Frequency domain NA
Not available Frequency domain S
Availability depends on a
further indication of an
upper-level node Frequency domain H
Available Time domain S Network device Transceiver unit 11

Processing unit 12

— 10

Terminal device

Network device

Terminal device

2400

WIRELESS COMMUNICATION METHOD AND APPARATUS

CROSS-REFERENCE TO RELATED APPLICATIONS

This application is a continuation of International Application No. PCT/CN2022/085193, filed on Apr. 2, 2022, which claims priority to Chinese Patent Application No. 202110363709.8, filed on Apr. 2, 2021. The disclosures of the aforementioned applications are hereby incorporated by reference in their entireties.

TECHNICAL FIELD

This application relates to the communication field, and in particular, to a wireless communication method and apparatus.

BACKGROUND

With continuous development of mobile communication technologies, spectrum resources are increasingly insufficient. Access network devices are deployed more densely in the future to improve spectrum utilization. In a conventional cellular network architecture, an access network device connects a terminal device to a core network through an optical fiber. However, optical fiber deployment is costly in many scenarios. Therefore, a wireless backhaul link between a relay device and the access network device may be used to implement a connection to the core network by using an integrated access and backhaul (integrated access and backhaul node, IAB) technology, to avoid high costs caused by deployment of a large quantity of optical fibers.

However, in a new radio (new radio, NR) system, a resource configuration of a relay node is redundant and complex, and configuration overheads and overheads for dynamically indicating resources are excessively high. Therefore, how to configure resources of the relay node to reduce configuration complexity and signaling overheads is an urgent problem that needs to be resolved currently.

SUMMARY

This application provides a wireless communication method and apparatus, to configure resources of a relay node and reduce resource configuration complexity while reducing signaling overheads.

According to a first aspect, a wireless communication method is provided. The method includes: receiving first information, where the first information includes indication information of a first pattern, the first pattern is one of a plurality of patterns, each of the plurality of patterns indicates distribution of at least one resource in frequency domain, and the at least one resource includes at least one of the following resources: a first resource, a second resource, and a third resource, where the first resource is a definitely available resource, the second resource is an unavailable resource, availability of the third resource is determined by first indication information, the first indication information is sent by a first network device, and resource distribution indicated by any two patterns is different; and communicating with a second network device and/or a terminal device based on the first pattern.

For example, for availability of the third resource, when the first network device does not send the first indication information, the third resource is unavailable to a DU cell by default.

It should be understood that this application is applicable to a wireless communication system including a relay node. The relay node may be an IAB node, or may be a terminal device, that is, a terminal device having a wireless relay function. Availability of the first resource, the second resource, and the third resource may be configured for a cell of a distributed unit (distributed unit, DU) of a first node, or configured for a bandwidth part (bandwidth part, BWP) of a distributed unit of a first node, or configured for some frequency domain resources of a distributed unit DU of a first node, for example, a frequency domain resource block group (resource block group, RBG). The first network device is an upper-level node of the first node, and the second network device is a lower-level node of the first node.

It should be noted that the first resource may be an H (hard) frequency domain resource, indicating a frequency domain resource definitely available to the DU cell; the second resource may be an NA (not available) frequency domain resource, indicating a resource unavailable to the DU cell, and indicating that the resource is available to a mobile terminal (mobile-termination, MT); and the third resource may be an S (soft) frequency domain resource, indicating that availability of the resource to the DU cell needs to be determined based on indication information sent by the upper-level node.

In this embodiment of this application, after being further indicated, availability of the S resource may be determined as "available" or "unavailable", or may be determined as "available" or "no indication of availability". The indication of availability may be configured for one or more of three TDD transmission direction configurations: uplink, downlink, and flexible. For example, signaling indicates that an S uplink resource is indicated available, and indicate no indication of availability for an S downlink resource and an S flexible resource.

For example, when the at least one resource is the first resource, the first node can communicate with the terminal device and/or the lower-level relay node; when the at least one resource is the second resource, the first node cannot communicate with the terminal device, but the first node can communicate with the first network device; or when the at least one resource is the third resource, the first node needs to determine, based on the indication of the first network device, whether the third resource can be used to communicate with the terminal device and/or the lower-level relay node.

It should be noted that the communicating with a second network device and/or a terminal device based on the first pattern includes: determining, based on the first pattern, a resource for communication between the first node and the second network device and/or the terminal device, where the first node is a relay node.

According to the solution provided in this application, a plurality of frequency domain resource patterns are configured and defined. A resource type included in each pattern includes at least one of "definitely available", "unavailable", and "availability depends on a further indication of the upper-level node". The first pattern is indicated by using the first information, and the first pattern is used to implement communication between the network device and the first node and/or the terminal device. A constraint is imposed on allocation of frequency division multiplexing resources, so that a network (for example, a donor base station and the IAB node) can perform at least frequency division or no frequency division on an available bandwidth of the DU cell, and semi-statically configure corresponding signal and channel resources or the like in several bandwidths for the terminal device (for example, UE). This avoids excessively high signaling overheads caused by excessive complexity of a frequency division resource configuration, and avoids a burden caused by a possibility that the UE does not support storage of excessive resource configurations. Therefore, the frequency division resource configuration is not excessively flexible, signaling overheads can be reduced, and system performance can be improved.

It should be understood that a guard band (guard band) between the MT and the DU needs to be considered, irrespective of a solution to configuring a frequency division pattern in this application, or a solution to semi-statically configuring frequency domain resource segmentation in the foregoing possible implementation, or a solution to configuring a plurality of frequency domain resource block groups RBGs in the current technology.

For example, a constraint condition for determining a size of a guard band in a frequency division (or frequency division pattern) configuration may be defined in a protocol, or may be reported to the donor base station by the IAB. The constraint condition includes a relationship between the guard band and a bandwidth of the DU or the MT, a relationship between the guard band and a transmission timing mode, or a relationship between the guard band and a synchronization status.

It should be noted that the reporting to the donor base station by the IAB may occur before the donor base station sends the frequency division configuration to the IAB, or may occur after the donor base station sends the frequency division configuration to the IAB.

If the reporting occurs after the donor base station sends the frequency division configuration to the IAB, it may be understood that the donor base station first configures the configuration for the IAB, but after the IAB receives the configuration, the IAB finds that the configuration does not meet a guard band requirement or a hardware capability of the IAB, and therefore, the IAB is triggered to report these constraint conditions.

It should be further understood that for different transmission modes, different transmission timing schemes are defined in a protocol standard, including a case #1, a case #6, and a case #7. A case #1 timing mode requires that a sending time of a DU of the IAB node should be the same as that of another node including a donor node, to meet an inter-site synchronization requirement of a TDD system. A case #6 timing mode is used for space division sending. A case #7 timing mode is used for space division receiving, and may also be used for uplink full duplex.

The foregoing three timing types specify a rule for determining an uplink transmission timing of an MT of the IAB node. In both the timing type 2 and the timing type 3, the uplink transmission timing of the MT is related to a downlink transmission timing of the DU. It should be understood that in this embodiment of this application, the downlink transmission timing of the DU may be determined according to any method. For example, with reference to the timing type 1, the downlink transmission timing of the DU may be aligned with a downlink transmission timing of an IAB donor node. Specifically, the downlink transmission timing of the DU may be indicated and adjusted by the upper-level node based on over-the-air synchronization (over-the-air synchronization, OTA synchronization) signaling, or the downlink transmission timing of the DU may be obtained based on a global positioning system (global positioning system, GPS) or may be obtained based on another system that supports timing acquisition, such as a global navigation satellite system (global navigation satellite system, GNSS) or BeiDou.

It should be noted that different timing modes implicitly represent transmission modes, and that sizes of guard bands required by the transmission modes may be different. For example, full duplex generally requires more guard bands than space division multiplexing. Generally, during space division sending or space division receiving, frequency division multiplexing is used to increase isolation between the MT and the DU.

For example, it is generally considered that frequency division multiplexing may be performed when the timing mode case and the timing mode case are used.

In this application, a constraint condition of the frequency division (or frequency division pattern) configuration may be defined in a protocol or reported to the donor base station by the IAB. For example, a resource block (resource block, RB) of a lowest frequency of the DU cell, an RB of a highest frequency of the DU cell, at least an initial bandwidth part (initial BWP) included in the DU cell after frequency division, absence of discontinuous frequency domain resources of the DU cell after frequency division, a maximum of X continuous frequency domain resource segments of the DU cell after frequency division, X continuous RBs starting from the lowest frequency of the DU cell, and X continuous RBs starting from the highest frequency of the DU cell.

With reference to the first aspect, in some implementations of the first aspect, communicating with the second network device and/or the terminal device on a first time domain resource based on the first pattern.

With reference to the first aspect, in some implementations of the first aspect, before the receiving first information, the method further includes: receiving configuration information.

The configuration information may be configuration information described in the following twelfth aspect or thirteenth aspect.

It should be understood that the first time domain resource herein may be understood as a time resource set. The first time domain resource may include one or more slots. The plurality of slots may be continuous slots or discontinuous slots. The first pattern is mapped to the one or more slots, and is used for communication between the first node and the second network device and/or the terminal device.

Optionally, different frequency domain resource patterns may be mapped to the one or more slots of the first time domain resource.

Optionally, the first time domain resource may alternatively include one or more symbols, and a time granularity is not limited in this application.

With reference to the first aspect, in some implementations of the first aspect, the method includes: receiving second information, where the second information indicates the first time domain resource.

With reference to the first aspect, in some implementations of the first aspect, the plurality of patterns are configured by a donor (donor) network device, that is, configuration information of one or more patterns sent by the donor network device is received. The configuration information of the one or more patterns may be configured by the donor network device at one or more times. This is not specifically limited in this application.

With reference to the first aspect, in some implementations of the first aspect, before the donor network device configures the plurality of patterns, the donor network device receives frequency division multiplexing configuration information sent by the first node, where the frequency division multiplexing configuration information includes a restrictive condition configured for the plurality of patterns.

For example, the plurality of patterns may alternatively be predefined in a protocol. This is not limited in this application.

With reference to the first aspect, in some implementations of the first aspect, a configuration of each pattern includes a frequency domain resource bandwidth of the at least one resource, each pattern has corresponding pattern identification information, and identification information of any two patterns is different.

With reference to the first aspect, in some implementations of the first aspect, the configuration of each pattern further includes a frequency domain resource attribute of the at least one resource, and each frequency domain resource attribute is one of the first resource, the second resource, and the third resource.

It should be understood that a pattern of a frequency domain resource defined in a protocol may indicate attributes H/S/NA of a plurality of frequency domain resource segments, and/or that a protocol defines a pattern of frequency domain resources of a plurality of lengths.

For example, when a frequency domain resource of the cell of the distributed unit DU of the first node is divided into three segments, that is, three frequency domain resource sets, and each set includes continuous frequency domain resources, a pattern for dividing the corresponding frequency domain resource into three segments may be selected for mapping.

Optionally, when a protocol defines a pattern of a frequency domain resource of one length only, for example, a pattern for dividing the frequency domain into five segments, only resources with first three resource attributes in each pattern need to be mapped, that is, the first three resource attributes of each pattern correspond to availability of each resource segment.

With reference to the first aspect, in some implementations of the first aspect, a configuration of the frequency domain resource bandwidth includes a start resource block number of the at least one resource and a quantity of resource blocks of the at least one resource.

For example, the frequency domain resource bandwidth is configured by the donor network device, or the frequency domain resource bandwidth is predefined in a protocol. For example, the DU calculates an actually indicated bandwidth based on a bandwidth actually used by the cell. This is not limited in this application.

For example, each pattern has corresponding pattern identification information, and a frequency domain size of each resource segment in a corresponding frequency domain resource pattern and a frequency domain attribute corresponding to each resource segment may be determined by using an identifier of the pattern.

For example, based on a start and length indicator value SLIV of a frequency domain resource, and a start and duration of a frequency domain bandwidth resource predefined in a protocol, a start frequency domain resource index and an end frequency domain resource index of the scheduled frequency domain resource are mapped. In other words, the network device may determine a start resource block number and a quantity of resource blocks of the corresponding frequency domain resource by using the index values, to configure a frequency domain length of the frequency domain H//S/NA.

With reference to the first aspect, in some implementations of the first aspect, the first information includes identification information of at least one pattern set, the identification information of the at least one pattern set is used to determine at least one target pattern set, the at least one target pattern set includes the first pattern, a configuration of each pattern set includes at least one of the plurality of patterns, each pattern set has corresponding pattern set identification information, and identification information of any two pattern sets is different.

With reference to the first aspect, in some implementations of the first aspect, the method includes: receiving third information, where the third information is used to configure at least one first slot; and mapping at least one first pattern to the at least one first slot.

With reference to the first aspect, in some implementations of the first aspect, the first slot is a slot in a first time domain periodicity, or the first slot is a slot corresponding to a time domain resource being a fourth resource in a first time domain periodicity, where the first time domain periodicity corresponds to a configuration periodicity of the first time domain resource, availability of the fourth resource is determined by second indication information, and the second indication information is sent by the first network device.

Optionally, the first slots may alternatively be all slots in the first time domain periodicity.

It should be understood that the first slot herein may be a non-TDM slot, or may be directly referred to as an FDM slot. A specific name of the first slot is not limited in this application. The first slot supports only one function, that is, a frequency division resource configuration is allowed to be configured for some slots. In addition, a quantity of first slots supporting the function is not limited in this application either.

It should be noted that the first slot is only an implementation of a time granularity. Alternatively, a first symbol or the like may be determined in a first time segment. A specific time granularity is not limited in this application.

For example, the first periodicity may correspond to a configuration periodicity of an H/S/NA time domain resource in the first time segment, or a periodicity may be separately configured in units of slots or absolute time, or one system frame may be used as a periodicity. A manner of determining the first periodicity is not limited in this application.

With reference to the first aspect, in some implementations of the first aspect, the first time segment and/or a total quantity of slots in the first periodicity are/is determined based on a subcarrier spacing; and a quantity of slots corresponding to the first slot is determined based on a number of the first slot and/or a number set of the first slot.

For example, the DU calculates the quantity of slots in the first periodicity based on the configuration periodicity of the H/S/NA time domain resource and the configured subcarrier spacing, and determines, based on the number of the first slot, which slots are non-TDM slots.

For example, a total quantity of slots in a periodicity is determined with reference to a subcarrier spacing of an initial bandwidth part BWP of the cell of the DU, because in a given subcarrier spacing, a total quantity of slots in a system frame is fixed.

Optionally, the reference subcarrier spacing may be separately configured, or may refer to a configured subcarrier spacing that already exists in other signaling or another application scenario in another current protocol. This is not limited in this application.

With reference to the first aspect, in some implementations of the first aspect, a quantity of the at least one pattern is the same as a quantity of first slots, or a quantity of the at least one pattern is a positive integer multiple of a quantity of first slots, or a quantity of the at least one pattern is less than a quantity of first slots.

Optionally, when the H/S/NA frequency domain resource is mapped to the first slot, different frequency domain resource patterns may be mapped to the first slot. For example, the H frequency domain resource is mapped to the first slot, or the NA frequency domain resource is mapped to the first slot based on this resource configuration. In this case, the NA frequency domain resource overrides the H frequency domain resource, that is, availability of the frequency domain resource of the DU of the first node in the first slot is changed from a definitely available resource to an unavailable resource. To be specific, in a mapping of frequency domain resources to time domain resources, the H, S, and NA resources may be randomly combined, specifically depending on a requirement for communication between the network device and the first node and/or the terminal device. This is not limited in this application.

Optionally, any one of the H/S/NA frequency domain resources may be mapped to the first slot; or S+NA, that is, the S frequency domain resource is first mapped to the first slot, and then the NA frequency domain resource is mapped to the S resource based on further indication information; or S+H, H+NA, S+H+NA, or the like. A resource mapping manner is not limited in this application.

Optionally, a same frequency domain resource, for example, the H frequency domain resource, may be mapped to different time domain resources, for example, S and NA time domain resources. This is not limited in this application.

With reference to the first aspect, in some implementations of the first aspect, the method includes: receiving fourth information, where the fourth information indicates resource availability of the third resource, for example, indicates resource availability of the S time domain resource and the S frequency domain resource.

With reference to the first aspect, in some implementations of the first aspect, the fourth information further indicates resource availability of the fourth resource, that is, a resource whose time domain resource attribute is S.

With reference to the first aspect, in some implementations of the first aspect, the method includes: receiving fifth information, where the fifth information indicates grouping information of a frequency domain resource corresponding to the first slot; and receiving sixth information, where the sixth information indicates a resource attribute of at least one frequency domain resource group.

It should be noted that a granularity and a manner of frequency domain resource division may be an RBG, a quantity of RBs, a bandwidth part BWP, or the like. This is not specifically limited in this application.

With reference to the first aspect, in some implementations of the first aspect, the method includes: obtaining a first relationship and/or a second relationship, where the first relationship is a correspondence between a first parameter and indication information of availability of the first resource, the first relationship indicates resource availability of the first slot, the second relationship is a correspondence between a second parameter and indication information of availability of the second resource, and the second relationship indicates resource availability of the frequency domain resource of the first slot; and determining the first pattern based on the first relationship and/or the second relationship.

It should be understood that the first relationship and the second relationship may indicate availability of all time domain resources and availability of all frequency domain resources, and/or may indicate resource availability of the first slot, that is, a slot that requires frequency division multiplexing, and/or may indicate availability of the frequency domain resource of the first slot. This is not limited in this application.

With reference to the first aspect, in some implementations of the first aspect, the method includes: receiving seventh information, where the seventh information includes identification information of at least one indication set, the identification information of the at least one indication set is used to determine at least one target indication set, the at least one target indication set includes the first parameter and/or the second parameter, and identification information of any two indication sets is different; and determining resource attributes of one or more frequency domain resources of the at least one first slot based on the at least one target indication set.

In this application, the indication information, the configuration information, or the like in this application may be carried, without limitation, in one of radio resource control signaling, media access control MAC layer signaling, and physical layer PHY signaling, or a combination of at least two thereof. The radio resource control signaling includes radio resource control RRC signaling. The MAC layer signaling includes a MAC control element (control element, CE). The physical layer signaling includes downlink control information (downlink control information, DCI) or the like.

According to a second aspect, a wireless communication method is provided. The method includes: sending first information, where the first information includes indication information of a first pattern, the first pattern is one of a plurality of patterns, each of the plurality of patterns indicates distribution of at least one resource in frequency domain, and the at least one resource includes at least one of the following resources: a first resource, a second resource, and a third resource, where the first resource is a definitely available resource, the second resource is an unavailable resource, availability of the third resource is determined by first indication information, the first indication information is sent by a first network device, and resource distribution indicated by any two patterns is different; and communicating with a first node and/or a terminal device based on the first pattern, where the first node is a relay node.

For example, for availability of the third resource, when the first network device does not send the first indication information, the third resource is unavailable to a DU cell by default.

It should be understood that this application is applicable to a wireless communication system including a relay node. The relay node may be an IAB node, or may be a terminal device, that is, a terminal device having a wireless relay function. Availability of the first resource, the second resource, and the third resource may be configured for a cell of a distributed unit DU of the first node, or configured for a bandwidth part BWP of a distributed unit of the first node, or configured for some frequency domain resources of a distributed unit DU of the first node, for example, an RBG. The first network device is an upper-level node of the first node, and a second network device is a lower-level node of the first node.

It should be noted that the first resource may be an H (hard) frequency domain resource, indicating a frequency domain resource definitely available to the DU cell; the second resource may be an NA (not available) frequency domain resource, indicating a resource unavailable to the DU cell, and indicating that the resource is available to a mobile terminal MT; and the third resource may be an S (soft) frequency domain resource, indicating that availability of the resource to the DU cell needs to be determined based on indication information sent by the upper-level node.

In this embodiment of this application, after being further indicated, availability of the S resource may be determined as "available" or "unavailable", or may be determined as "available" or "no indication of availability". The indication of availability may be configured for one or more of three TDD transmission direction configurations: uplink, downlink, and flexible. For example, signaling indicates that an S uplink resource is indicated available, and indicate no indication of availability for an S downlink resource and an S flexible resource.

For example, when the at least one resource is the first resource, the first node can communicate with the terminal device and/or the lower-level node; when the at least one resource is the second resource, the first node cannot communicate with the terminal device, but the first node can communicate with the first network device; or when the at least one resource is the third resource, the first node needs to determine, based on the indication of the first network device, whether the third resource can be used to communicate with the terminal device and/or the lower-level relay node.

It should be noted that the communicating with a first node and/or a terminal device based on the first pattern includes: determining, based on the first pattern, a resource for communication between the network device and the first node and/or the terminal device, where the first node is a relay node.

According to the solution provided in this application, a plurality of frequency domain resource patterns are configured and defined. A resource type included in each pattern includes at least one of "definitely available", "unavailable", and "availability depends on a further indication of the upper-level node". The first pattern is indicated by using the first information, and the first pattern is used to implement communication between the network device and the first node and/or the terminal device. A constraint is imposed on allocation of frequency division multiplexing resources, so that a network (for example, a donor base station and the IAB node) can perform at least frequency division or no frequency division on an available bandwidth of the DU cell, and semi-statically configure corresponding signal and channel resources or the like in several bandwidths for the terminal device (for example, UE). This avoids excessively high signaling overheads caused by excessive complexity of a frequency division resource configuration, and avoids a burden caused by a possibility that the UE does not support storage of excessive resource configurations. Therefore, the frequency division resource configuration is not excessively flexible, signaling overheads can be reduced, and system performance can be improved.

It should be understood that a guard band (guard band) between the MT and the DU needs to be considered, irrespective of a solution to configuring a frequency division pattern in this application, or a solution to semi-statically configuring frequency domain resource segmentation in the foregoing possible implementation, or a solution to configuring a plurality of frequency domain resource block groups RBGs in the current technology.

For example, a constraint condition for determining a size of a guard band in a frequency division (or frequency division pattern) configuration may be defined in a protocol, or may be reported to the donor base station by the IAB. The constraint condition includes a relationship between the guard band and a bandwidth of the DU or the MT, a relationship between the guard band and a transmission timing mode, or a relationship between the guard band and a synchronization status.

It should be noted that the reporting to the donor base station by the IAB may occur before the donor base station sends the frequency division configuration to the IAB, or may occur after the donor base station sends the frequency division configuration to the IAB.

If the reporting occurs after the donor base station sends the frequency division configuration to the IAB, it may be understood that the donor base station first configures the configuration for the IAB, but after the IAB receives the configuration, the IAB finds that the configuration does not meet a guard band requirement or a hardware capability of the IAB, and therefore, the IAB is triggered to report these constraint conditions.

It should be further understood that for different transmission modes, different transmission timing schemes are defined in a protocol standard, including a case #1, a case #6, and a case #7. A case #1 timing mode requires that a sending time of a DU of the IAB node should be the same as that of another node including a donor node, to meet an inter-site synchronization requirement of a TDD system. A case #6 timing mode is used for space division sending. A case #7 timing mode is used for space division receiving, and may also be used for uplink full duplex.

The foregoing three timing types specify a rule for determining an uplink transmission timing of an MT of the IAB node. In both the timing type 2 and the timing type 3, the uplink transmission timing of the MT is related to a downlink transmission timing of the DU. It should be understood that in this embodiment of this application, the downlink transmission timing of the DU may be determined according to any method. For example, with reference to the timing type 1, the downlink transmission timing of the DU may be aligned with a downlink transmission timing of an IAB donor node. Specifically, the downlink transmission timing of the DU may be indicated and adjusted by the upper-level node based on over-the-air synchronization (OTA synchronization) signaling, or the downlink transmission timing of the DU may be obtained based on a global positioning system GPS or may be obtained based on another system that supports timing acquisition, such as a global navigation satellite system GNSS or BeiDou.

It should be noted that different timing modes implicitly represent transmission modes, and that sizes of guard bands required by the transmission modes may be different. For example, full duplex generally requires more guard bands than space division multiplexing. Generally, during space division sending or space division receiving, frequency division multiplexing is used to increase isolation between the MT and the DU.

For example, it is generally considered that frequency division multiplexing may be performed when the timing mode case and the timing mode case are used.

In this application, a constraint condition of the frequency division (or frequency division pattern) configuration may be defined in a protocol or reported to the donor base station by the IAB. For example, an RB of a lowest frequency of the DU cell, an RB of a highest frequency of the DU cell, at least an initial bandwidth part included in the DU cell after frequency division, absence of discontinuous frequency domain resources of the DU cell after frequency division, a maximum of X continuous frequency domain resource segments of the DU cell after frequency division, X continuous RBs starting from the lowest frequency of the DU cell, and X continuous RBs starting from the highest frequency of the DU cell.

With reference to the second aspect, in some implementations of the second aspect, the communicating with a first node and/or a terminal device based on the first pattern includes: communicating with the first node and/or the terminal device on a first time domain resource based on the first pattern.

It should be understood that the first time domain resource herein may be understood as a time resource set. The first time domain resource may include one or more slots. The plurality of slots may be continuous slots or discontinuous slots. The first pattern is mapped to the one or more slots, and is used for communication between the first node and the second network device and/or the terminal device.

Optionally, different frequency domain resource patterns may be mapped to the one or more slots of the first time domain resource.

Optionally, the first time domain resource may alternatively include one or more symbols, and a time granularity is not limited in this application.

With reference to the second aspect, in some implementations of the second aspect, the method includes: sending second information, where the second information indicates the first time domain resource.

With reference to the second aspect, in some implementations of the second aspect, the plurality of patterns are configured by a donor (donor) network device, that is, configuration information of one or more patterns sent by the donor network device is received. The configuration information of the one or more patterns may be configured by the donor network device at one or more times. This is not specifically limited in this application.

With reference to the second aspect, in some implementations of the second aspect, before the donor network device configures the plurality of patterns, the donor network device receives frequency division multiplexing configuration information sent by the first node, where the frequency division multiplexing configuration information includes a restrictive condition configured for the plurality of patterns.

For example, the plurality of patterns may alternatively be predefined in a protocol. This is not limited in this application.

With reference to the second aspect, in some implementations of the second aspect, a configuration of each pattern includes a frequency domain resource bandwidth of the at least one resource, each pattern has corresponding pattern identification information, and identification information of any two patterns is different.

With reference to the second aspect, in some implementations of the second aspect, the configuration of each pattern further includes a frequency domain resource attribute of the at least one resource, and each frequency domain resource attribute is one of the first resource, the second resource, and the third resource.

It should be understood that a pattern of a frequency domain resource defined in a protocol may indicate attributes H/S/NA of a plurality of frequency domain resource segments, and/or that a protocol defines a pattern of frequency domain resources of a plurality of lengths.

For example, when a frequency domain resource of the cell of the distributed unit DU of the first node is divided into three segments, that is, three frequency domain resource sets, and each set includes continuous frequency domain resources, a pattern for dividing the corresponding frequency domain resource into three segments may be selected for mapping.

Optionally, when a protocol defines a pattern of a frequency domain resource of one length only, for example, a pattern for dividing the frequency domain into five segments, only resources with first three resource attributes in each pattern need to be mapped, that is, the first three resource attributes of each pattern correspond to availability of each resource segment.

With reference to the second aspect, in some implementations of the second aspect, a configuration of the frequency domain resource bandwidth includes a start resource block number of the at least one resource and a quantity of resource blocks of the at least one resource.

For example, the frequency domain resource bandwidth is configured by the donor network device, or the frequency domain resource bandwidth is predefined in a protocol. For example, the DU calculates an actually indicated bandwidth based on a bandwidth actually used by the cell. This is not limited in this application.

For example, each pattern has corresponding pattern identification information, and a frequency domain size of each resource segment in a corresponding frequency domain resource pattern and a frequency domain attribute corresponding to each resource segment may be determined by using an identifier of the pattern.

For example, based on a start and length indicator value SLIV of a frequency domain resource, and a start and duration of a frequency domain bandwidth resource predefined in a protocol, a start frequency domain resource index and an end frequency domain resource index of the scheduled frequency domain resource are mapped. In other words, the network device may determine a start resource block number and a quantity of resource blocks of the corresponding frequency domain resource by using the index values, to configure a frequency domain length of the frequency domain H//S/NA.

With reference to the second aspect, in some implementations of the second aspect, the first information includes identification information of at least one pattern set, the identification information of the at least one pattern set is used to determine at least one target pattern set, the at least one target pattern set includes the first pattern, a configuration of each pattern set includes at least one of the plurality of patterns, each pattern set has corresponding pattern set identification information, and identification information of any two pattern sets is different.

With reference to the second aspect, in some implementations of the second aspect, the method includes: sending third information, where the third information is used to configure at least one first slot; and mapping at least one first pattern to the at least one first slot.

With reference to the second aspect, in some implementations of the second aspect, the first slot is a slot in a first time domain periodicity, or the first slot is a slot corresponding to a time domain resource being a fourth resource in a first time domain periodicity, where the first time domain periodicity corresponds to a configuration periodicity of the first time domain resource, availability of the fourth resource is determined by second indication information, and the second indication information is sent by the first network device.

Optionally, the first slots may alternatively be all slots in the first time domain periodicity.

It should be understood that the first slot herein may be a non-TDM slot, or may be directly referred to as an FDM slot. A specific name of the first slot is not limited in this application. The first slot supports only one function, that is, a frequency division resource configuration is allowed to be configured for some slots. In addition, a quantity of first slots supporting the function is not limited in this application either.

It should be noted that the first slot is only an implementation of a time granularity. Alternatively, a first symbol or the like may be determined in a first time segment. A specific time granularity is not limited in this application.

For example, the first periodicity may correspond to a configuration periodicity of an H/S/NA time domain resource in the first time segment, or a periodicity may be separately configured in units of slots or absolute time, or one system frame may be used as a periodicity. A manner of determining the first periodicity is not limited in this application.

With reference to the second aspect, in some implementations of the second aspect, the first time segment and/or a total quantity of slots in the first periodicity are/is determined based on a subcarrier spacing; and a quantity of slots corresponding to the first slot is determined based on a number of the first slot and/or a number set of the first slot.

For example, the DU calculates the quantity of slots in the first periodicity based on the configuration periodicity of the H/S/NA time domain resource and the configured subcarrier spacing, and determines, based on the number of the first slot, which slots are non-TDM slots.

For example, a total quantity of slots in a periodicity is determined with reference to a subcarrier spacing of an initial bandwidth part BWP of the cell of the DU, because in a given subcarrier spacing, a total quantity of slots in a system frame is fixed.

Optionally, the reference subcarrier spacing may be separately configured, or may refer to a configured subcarrier spacing that already exists in other signaling or another application scenario in another current protocol. This is not limited in this application.

With reference to the second aspect, in some implementations of the second aspect, a quantity of the at least one pattern is the same as a quantity of first slots, or a quantity of the at least one pattern is a positive integer multiple of a quantity of first slots, or a quantity of the at least one pattern is less than a quantity of first slots.

Optionally, when the H/S/NA frequency domain resource is mapped to the first slot, different frequency domain resource patterns may be mapped to the first slot. For example, the H frequency domain resource is mapped to the first slot, or the NA frequency domain resource is mapped to the first slot based on this resource configuration. In this case, the NA frequency domain resource overrides the H frequency domain resource, that is, availability of the frequency domain resource of the DU of the first node in the first slot is changed from a definitely available resource to an unavailable resource. To be specific, in a mapping of frequency domain resources to time domain resources, the H, S, and NA resources may be randomly combined, specifically depending on a requirement for communication between the network device and the first node and/or the terminal device. This is not limited in this application.

Optionally, any one of the H/S/NA frequency domain resources may be mapped to the first slot; or S+NA, that is, the S frequency domain resource is first mapped to the first slot, and then the NA frequency domain resource is mapped to the S resource based on further indication information; or S+H, H+NA, S+H+NA, or the like. A resource mapping manner is not limited in this application.

Optionally, a same frequency domain resource, for example, the H frequency domain resource, may be mapped to different time domain resources, for example, S and NA time domain resources. This is not limited in this application.

With reference to the second aspect, in some implementations of the second aspect, the method includes: sending fourth information, where the fourth information indicates resource availability of the third resource, for example, indicates resource availability of the S time domain resource and the S frequency domain resource.

With reference to the second aspect, in some implementations of the second aspect, the fourth information further indicates resource availability of the fourth resource, that is, a resource whose time domain resource attribute is S.

With reference to the second aspect, in some implementations of the second aspect, the method includes: sending fifth information, where the fifth information indicates grouping information of a frequency domain resource corresponding to the first slot; and sending sixth information, where the sixth information indicates a resource attribute of at least one frequency domain resource group.

It should be noted that a granularity and a manner of frequency domain resource division may be an RBG, a quantity of RBs, a bandwidth part BWP, or the like. This is not specifically limited in this application.

With reference to the second aspect, in some implementations of the second aspect, the method includes: obtaining a first relationship and/or a second relationship, where the first relationship is a correspondence between a first parameter and indication information of availability of the first resource, the first relationship indicates resource availability of the first slot, the second relationship is a correspondence between a second parameter and indication information of availability of the second resource, and the second relationship indicates resource availability of the frequency domain resource of the first slot; and determining the first pattern based on the first relationship and/or the second relationship.

It should be understood that the first relationship and the second relationship may indicate availability of all time domain resources and availability of all frequency domain resources, and/or may indicate resource availability of the first slot, that is, a slot that requires frequency division multiplexing, and/or may indicate availability of the frequency domain resource of the first slot. This is not limited in this application.

With reference to the second aspect, in some implementations of the second aspect, the method includes: sending seventh information, where the seventh information includes identification information of at least one indication set, the identification information of the at least one indication set is used to determine at least one target indication set, the at least one target indication set includes the first parameter and/or the second parameter, and identification information of any two indication sets is different; and determining resource attributes of one or more frequency domain resources of the at least one first slot based on the at least one target indication set.

In this application, the indication information, the configuration information, or the like in this application may be carried, without limitation, in one of radio resource control signaling, media access control MAC layer signaling, and physical layer PHY signaling, or a combination of at least two thereof. The radio resource control signaling includes radio resource control RRC signaling. The MAC layer signaling includes a MAC control element CE. The physical layer signaling includes downlink control information DCI or the like.

According to a third aspect, a wireless communication apparatus is provided. The apparatus includes: a transceiver unit, configured to receive first information, where the first information includes indication information of a first pattern, the first pattern is one of a plurality of patterns, each of the plurality of patterns indicates distribution of at least one resource in frequency domain, and the at least one resource includes at least one of the following resources: a first resource, a second resource, and a third resource, where the first resource is a definitely available resource, the second resource is an unavailable resource, availability of the third resource is determined by first indication information, the first indication information is sent by a first network device, and resource distribution indicated by any two patterns is different; and a processing unit, configured to determine, based on the first pattern, a resource for communicating with a second network device and/or a terminal device, where the transceiver unit is further configured for a first node to communicate with the second network device and/or the terminal device.

For example, for availability of the third resource, when the first network device does not send the first indication information, the third resource is unavailable to a DU cell by default.

It should be understood that this application is applicable to a wireless communication system including a relay node. The relay node may be an IAB node, or may be a terminal device, that is, a terminal device having a wireless relay function. Availability of the first resource, the second resource, and the third resource may be configured for a cell of a distributed unit DU of the first node, or configured for a bandwidth part BWP of a distributed unit of the first node, or configured for some frequency domain resources of a distributed unit DU of the first node, for example, an RBG. The first network device is an upper-level node of the first node, and the second network device is a lower-level node of the first node.

It should be noted that the first resource may be an H (hard) frequency domain resource, indicating a frequency domain resource definitely available to the DU cell; the second resource may be an NA (not available) frequency domain resource, indicating a resource unavailable to the DU cell, and indicating that the resource is available to a mobile terminal MT; and the third resource may be an S (soft) frequency domain resource, indicating that availability of the resource to the DU cell needs to be determined based on indication information sent by the upper-level node.

In this embodiment of this application, after being further indicated, availability of the S resource may be determined as "available" or "unavailable", or may be determined as "available" or "no indication of availability". The indication of availability may be configured for one or more of three TDD transmission direction configurations: uplink, downlink, and flexible. For example, signaling indicates that an S uplink resource is indicated available, and indicate no indication of availability for an S downlink resource and an S flexible resource.

For example, when the at least one resource is the first resource, the first node can communicate with the terminal device and/or the lower-level relay node; when the at least one resource is the second resource, the first node cannot communicate with the terminal device, but the first node can communicate with the first network device; or when the at least one resource is the third resource, the first node needs to determine, based on the indication of the first network device, whether the third resource can be used to communicate with the terminal device and/or the lower-level relay node.

It should be noted that the communicating with the second network device and/or the terminal device based on the first pattern includes: determining, based on the first pattern, a resource for communication between the first node and the second network device and/or the terminal device, where the first node is a relay node.

It should be understood that a guard band (guard band) between the MT and the DU needs to be considered, irrespective of a solution to configuring a frequency division pattern in this application, or a solution to semi-statically configuring frequency domain resource segmentation in the foregoing possible implementation, or a solution to configuring a plurality of frequency domain resource block groups RBGs in the current technology.

For example, a constraint condition for determining a size of a guard band in a frequency division (or frequency division pattern) configuration may be defined in a protocol, or may be reported to a donor base station by the IAB. The constraint condition includes a relationship between the guard band and a bandwidth of the DU or the MT, a relationship between the guard band and a transmission timing mode, or a relationship between the guard band and a synchronization status.

It should be noted that the reporting to the donor base station by the IAB may occur before the donor base station sends the frequency division configuration to the IAB, or may occur after the donor base station sends the frequency division configuration to the IAB.

If the reporting occurs after the donor base station sends the frequency division configuration to the IAB, it may be understood that the donor base station first configures the configuration for the IAB, but after the IAB receives the configuration, the IAB finds that the configuration does not meet a guard band requirement or a hardware capability of the IAB, and therefore, the IAB is triggered to report these constraint conditions.

It should be further understood that for different transmission modes, different transmission timing schemes are defined in a protocol standard, including a case #1, a case #6, and a case #7. A case #1 timing mode requires that a sending time of a DU of the IAB node should be the same as that of another node including a donor node, to meet an inter-site synchronization requirement of a TDD system. A case #6 timing mode is used for space division sending. A case #7 timing mode is used for space division receiving, and may also be used for uplink full duplex.

The foregoing three timing types specify a rule for determining an uplink transmission timing of an MT of the IAB node. In both the timing type 2 and the timing type 3, the uplink transmission timing of the MT is related to a downlink transmission timing of the DU. It should be understood that in this embodiment of this application, the downlink transmission timing of the DU may be determined according to any method. For example, with reference to the timing type 1, the downlink transmission timing of the DU may be aligned with a downlink transmission timing of an IAB donor node. Specifically, the downlink transmission timing of the DU may be indicated and adjusted by the upper-level node based on over-the-air synchronization (OTA synchronization) signaling, or the downlink transmission timing of the DU may be obtained based on a global positioning system GPS or may be obtained based on another system that supports timing acquisition, such as a global navigation satellite system GNSS or BeiDou.

It should be noted that different timing modes implicitly represent transmission modes, and that sizes of guard bands required by the transmission modes may be different. For example, full duplex generally requires more guard bands than space division multiplexing. Generally, during space division sending or space division receiving, frequency division multiplexing is used to increase isolation between the MT and the DU.

For example, it is generally considered that frequency division multiplexing may be performed when the timing mode case and the timing mode case are used.

In this application, a constraint condition of the frequency division (or frequency division pattern) configuration may be defined in a protocol or reported to the donor base station by the IAB. For example, an RB of a lowest frequency of the DU cell, an RB of a highest frequency of the DU cell, at least an initial bandwidth part included in the DU cell after frequency division, absence of discontinuous frequency domain resources of the DU cell after frequency division, a maximum of X continuous frequency domain resource segments of the DU cell after frequency division, X continuous RBs starting from the lowest frequency of the DU cell, and X continuous RBs starting from the highest frequency of the DU cell.

With reference to the third aspect, in some implementations of the third aspect, the processing unit is further configured to determine, on a first time domain resource based on the first pattern, the resource for communicating with the second network device and/or the terminal device; and the transceiver unit is further configured for the first node to communicate with the second network device and/or the terminal device on the first time domain resource.

It should be understood that the first time domain resource herein may be understood as a time resource set. The first time domain resource may include one or more slots. The plurality of slots may be continuous slots or discontinuous slots. The first pattern is mapped to the one or more slots, and is used for communication between the first node and the second network device and/or the terminal device.

Optionally, different frequency domain resource patterns may be mapped to the one or more slots of the first time domain resource.

Optionally, the first time domain resource may alternatively include one or more symbols, and a time granularity is not limited in this application.

With reference to the third aspect, in some implementations of the third aspect, the transceiver unit is further configured to receive second information, where the second information indicates the first time domain resource.

With reference to the third aspect, in some implementations of the third aspect, the plurality of patterns are configured by a donor (donor) network device, that is, the transceiver unit is further configured to receive configuration information of one or more patterns sent by the donor network device. The configuration information of the one or more patterns may be configured by the donor network device at one or more times. This is not specifically limited in this application.

With reference to the third aspect, in some implementations of the third aspect, before the donor network device configures the plurality of patterns, the transceiver unit is further configured to send frequency division multiplexing configuration information to the donor network device, where the frequency division multiplexing configuration information includes a restrictive condition configured for the plurality of patterns.

For example, the plurality of patterns may alternatively be predefined in a protocol. This is not limited in this application.

With reference to the third aspect, in some implementations of the third aspect, a configuration of each pattern includes a frequency domain resource bandwidth of the at least one resource, each pattern has corresponding pattern identification information, and identification information of any two patterns is different.

With reference to the third aspect, in some implementations of the third aspect, the configuration of each pattern further includes a frequency domain resource attribute of the at least one resource, and each frequency domain resource attribute is one of the first resource, the second resource, and the third resource.

It should be understood that a pattern of a frequency domain resource defined in a protocol may indicate attributes H/S/NA of a plurality of frequency domain resource segments, and/or that a protocol defines a pattern of frequency domain resources of a plurality of lengths.

For example, when a frequency domain resource of the cell of the distributed unit DU of the first node is divided into three segments, that is, three frequency domain resource sets, and each set includes continuous frequency domain resources, a pattern for dividing the corresponding frequency domain resource into three segments may be selected for mapping.

Optionally, when a protocol defines a pattern of a frequency domain resource of one length only, for example, a pattern for dividing the frequency domain into five segments, only resources with first three resource attributes in each pattern need to be mapped, that is, the first three resource attributes of each pattern correspond to availability of each resource segment.

With reference to the third aspect, in some implementations of the third aspect, a configuration of the frequency domain resource bandwidth includes a start resource block number of the at least one resource and a quantity of resource blocks of the at least one resource.

For example, the frequency domain resource bandwidth is configured by the donor network device, or the frequency domain resource bandwidth is predefined in a protocol. For example, the DU calculates an actually indicated bandwidth based on a bandwidth actually used by the cell. This is not limited in this application.

For example, each pattern has corresponding pattern identification information, and a frequency domain size of each resource segment in a corresponding frequency domain resource pattern and a frequency domain attribute corresponding to each resource segment may be determined by using an identifier of the pattern.

For example, based on a start and length indicator value SLIV of a frequency domain resource, and a start and duration of a frequency domain bandwidth resource predefined in a protocol, a start frequency domain resource index and an end frequency domain resource index of the scheduled frequency domain resource are mapped. In other words, the network device may determine a start resource block number and a quantity of resource blocks of the corresponding frequency domain resource by using the index values, to configure a frequency domain length of the frequency domain H//S/NA.

With reference to the third aspect, in some implementations of the third aspect, the first information includes identification information of at least one pattern set, the identification information of the at least one pattern set is used to determine at least one target pattern set, the at least one target pattern set includes the first pattern, a configuration of each pattern set includes at least one of the plurality of patterns, each pattern set has corresponding pattern set identification information, and identification information of any two pattern sets is different.

With reference to the third aspect, in some implementations of the third aspect, the transceiver unit is further configured to receive third information, where the third information is used to configure at least one first slot; and the processing unit is further configured to map at least one first pattern to the at least one first slot.

With reference to the third aspect, in some implementations of the third aspect, the first slot is a slot in a first time domain periodicity, or the first slot is a slot corresponding to a time domain resource being a fourth resource in a first time domain periodicity, where the first time domain periodicity corresponds to a configuration periodicity of the first time domain resource, availability of the fourth resource is determined by second indication information, and the second indication information is sent by the first network device.

Optionally, the first slots may alternatively be all slots in the first time domain periodicity.

It should be understood that the first slot herein may be a non-TDM slot, or may be directly referred to as an FDM slot. A specific name of the first slot is not limited in this application. The first slot supports only one function, that is, a frequency division resource configuration is allowed to be configured for some slots. In addition, a quantity of first slots supporting the function is not limited in this application either.

It should be noted that the first slot is only an implementation of a time granularity. Alternatively, a first symbol or the like may be determined in a first time segment. A specific time granularity is not limited in this application.

For example, the first periodicity may correspond to a configuration periodicity of an H/S/NA time domain resource in the first time segment, or a periodicity may be separately configured in units of slots or absolute time, or one system frame may be used as a periodicity. A manner of determining the first periodicity is not limited in this application.

With reference to the third aspect, in some implementations of the third aspect, the processing unit is further configured to determine the first time segment and/or a total quantity of slots in the first periodicity based on a subcarrier spacing; and the processing unit is further configured to determine, based on a number of the first slot and/or a number set of the first slot, a quantity of slots corresponding to the first slot.

For example, the DU calculates the quantity of slots in the first periodicity based on the configuration periodicity of the H/S/NA time domain resource and the configured subcarrier spacing, and determines, based on the number of the first slot, which slots are non-TDM slots.

For example, a total quantity of slots in a periodicity is determined with reference to a subcarrier spacing of an initial bandwidth part BWP of the cell of the DU, because in a given subcarrier spacing, a total quantity of slots in a system frame is fixed.

Optionally, the reference subcarrier spacing may be separately configured, or may refer to a configured subcarrier spacing that already exists in other signaling or another application scenario in another current protocol. This is not limited in this application.

With reference to the third aspect, in some implementations of the third aspect, a quantity of the at least one pattern is the same as a quantity of first slots, or a quantity of the at least one pattern is a positive integer multiple of a quantity of first slots, or a quantity of the at least one pattern is less than a quantity of first slots.

Optionally, when the H/S/NA frequency domain resource is mapped to the first slot, different frequency domain resource patterns may be mapped to the first slot. For example, the H frequency domain resource is mapped to the first slot, or the NA frequency domain resource is mapped to the first slot based on this resource configuration. In this case, the NA frequency domain resource overrides the H frequency domain resource, that is, availability of the frequency domain resource of the DU of the first node in the first slot is changed from a definitely available resource to an unavailable resource. To be specific, in a mapping of frequency domain resources to time domain resources, the H, S, and NA resources may be randomly combined, specifically depending on a requirement for communication between the network device and the first node and/or the terminal device. This is not limited in this application.

Optionally, any one of the H/S/NA frequency domain resources may be mapped to the first slot; or S+NA, that is, the S frequency domain resource is first mapped to the first slot, and then the NA frequency domain resource is mapped to the S resource based on further indication information; or S+H, H+NA, S+H+NA, or the like. A resource mapping manner is not limited in this application.

Optionally, a same frequency domain resource, for example, the H frequency domain resource, may be mapped to different time domain resources, for example, S and NA time domain resources. This is not limited in this application.

With reference to the third aspect, in some implementations of the third aspect, the transceiver unit is further configured to receive fourth information, where the fourth information indicates resource availability of the third resource, for example, indicates resource availability of the S time domain resource and the S frequency domain resource.

With reference to the third aspect, in some implementations of the third aspect, the fourth information further indicates resource availability of the fourth resource, that is, a resource whose time domain resource attribute is S.

With reference to the third aspect, in some implementations of the third aspect, the transceiver unit is further configured to receive fifth information, where the fifth information indicates grouping information of a frequency domain resource corresponding to the first slot; and the transceiver unit is further configured to receive sixth information, where the sixth information indicates a resource attribute of at least one frequency domain resource group.

It should be noted that a granularity and a manner of frequency domain resource division may be an RBG, a quantity of RBs, a bandwidth part BWP, or the like. This is not specifically limited in this application.

With reference to the third aspect, in some implementations of the third aspect, the processing unit is further configured to obtain a first relationship and/or a second relationship, where the first relationship is a correspondence between a first parameter and indication information of availability of the first resource, the first relationship indicates resource availability of the first slot, the second relationship is a correspondence between a second parameter and indication information of availability of the second resource, and the second relationship indicates resource availability of the frequency domain resource of the first slot; and the processing unit is further configured to determine the first pattern based on the first relationship and/or the second relationship.

It should be understood that the first relationship and the second relationship may indicate availability of all time domain resources and availability of all frequency domain resources, and/or may indicate resource availability of the first slot, that is, a slot that requires frequency division multiplexing, and/or may indicate availability of the frequency domain resource of the first slot. This is not limited in this application.

With reference to the third aspect, in some implementations of the third aspect, the transceiver unit is further configured to receive seventh information, where the seventh information includes identification information of at least one indication set, the identification information of the at least one indication set is used to determine at least one target indication set, the at least one target indication set includes the first parameter and/or the second parameter, and identification information of any two indication sets is different; and the processing unit is further configured to determine resource attributes of one or more frequency domain resources of the at least one first slot based on the at least one target indication set.

In this application, the indication information, the configuration information, or the like in this application may be carried, without limitation, in one of radio resource control signaling, media access control MAC layer signaling, and physical layer PHY signaling, or a combination of at least two thereof. The radio resource control signaling includes radio resource control RRC signaling. The MAC layer signaling includes a MAC control element CE. The physical layer signaling includes downlink control information DCI or the like.

According to a fourth aspect, a wireless communication apparatus is provided. The apparatus includes: a transceiver unit, configured to send first information, where the first information includes indication information of a first pattern, the first pattern is one of a plurality of patterns, each of the plurality of patterns indicates distribution of at least one resource in frequency domain, and the at least one resource includes at least one of the following resources: a first resource, a second resource, and a third resource, where the first resource is a definitely available resource, the second resource is an unavailable resource, availability of the third resource is determined by first indication information, the first indication information is sent by a first network device, and resource distribution indicated by any two patterns is different; and a processing unit, configured to determine, based on the first pattern, a resource for communicating with a first node and/or a terminal device based on the first pattern, where the first node is a relay node, and the transceiver unit is further configured for a network device to communicate with the first node and/or the terminal device.

For example, for availability of the third resource, when the first network device does not send the first indication information, the third resource is unavailable to a DU cell by default.

It should be understood that this application is applicable to a wireless communication system including a relay node. The relay node may be an IAB node, or may be a terminal device, that is, a terminal device having a wireless relay function. Availability of the first resource, the second resource, and the third resource may be configured for a cell of a distributed unit DU of the first node, or configured for a bandwidth part (bandwidth part, BWP) of a distributed unit of the first node, or configured for some frequency domain resources of a distributed unit DU of the first node, for example, an RBG. The first network device is an upper-level node of the first node, and a second network device is a lower-level node of the first node.

It should be noted that the first resource may be an H (hard) frequency domain resource, indicating a frequency domain resource definitely available to the DU cell; the second resource may be an NA (not available) frequency domain resource, indicating a resource unavailable to the DU cell, and indicating that the resource is available to a mobile terminal MT; and the third resource may be an S (soft) frequency domain resource, indicating that availability of the resource to the DU cell needs to be determined based on indication information sent by the upper-level node.

In this embodiment of this application, after being further indicated, availability of the S resource may be determined as "available" or "unavailable", or may be determined as "available" or "no indication of availability". The indication of availability may be configured for one or more of three TDD transmission direction configurations: uplink, downlink, and flexible. For example, signaling indicates that an S uplink resource is indicated available, and indicate no indication of availability for an S downlink resource and an S flexible resource.

For example, when the at least one resource is the first resource, the first node can communicate with the terminal device and/or the lower-level relay node; when the at least one resource is the second resource, the first node cannot communicate with the terminal device, but the first node can communicate with the first network device; or when the at least one resource is the third resource, the first node needs to determine, based on the indication of the first network device, whether the third resource can be used to communicate with the terminal device and/or the lower-level relay node.

It should be noted that the communicating with a first node and/or a terminal device based on the first pattern includes: determining, based on the first pattern, a resource for communication between the network device and the first node and/or the terminal device, where the first node is a relay node.

According to the solution provided in this application, a plurality of frequency domain resource patterns are configured and defined. A resource type included in each pattern includes at least one of "definitely available", "unavailable", and "availability depends on a further indication of the upper-level node". The first pattern in the plurality of patterns is indicated by using the first information, and communication between the network device and the first node and/or the terminal device is implemented based on the first pattern.

It should be understood that a guard band (guard band) between the MT and the DU needs to be considered, irrespective of a solution to configuring a frequency division pattern in this application, or a solution to semi-statically configuring frequency domain resource segmentation in the foregoing possible implementation, or a solution to configuring a plurality of frequency domain resource block groups RBGs in the current technology.

For example, a constraint condition for determining a size of a guard band in a frequency division (or frequency division pattern) configuration may be defined in a protocol, or may be reported to a donor base station by the IAB. The constraint condition includes a relationship between the guard band and a bandwidth of the DU or the MT, a relationship between the guard band and a transmission timing mode, or a relationship between the guard band and a synchronization status.

It should be noted that the reporting to the donor base station by the IAB may occur before the donor base station sends the frequency division configuration to the IAB, or may occur after the donor base station sends the frequency division configuration to the IAB.

If the reporting occurs after the donor base station sends the frequency division configuration to the IAB, it may be understood that the donor base station first configures the configuration for the IAB, but after the IAB receives the configuration, the IAB finds that the configuration does not meet a guard band requirement or a hardware capability of the IAB, and therefore, the IAB is triggered to report these constraint conditions.

It should be further understood that for different transmission modes, different transmission timing schemes are defined in a protocol standard, including a case #1, a case #6, and a case #7. A case #1 timing mode requires that a sending time of a DU of the IAB node should be the same as that of another node including a donor node, to meet an inter-site synchronization requirement of a TDD system. A case #6 timing mode is used for space division sending. A case #7 timing mode is used for space division receiving, and may also be used for uplink full duplex.

The foregoing three timing types specify a rule for determining an uplink transmission timing of an MT of the IAB node. In both the timing type 2 and the timing type 3, the uplink transmission timing of the MT is related to a downlink transmission timing of the DU. It should be understood that in this embodiment of this application, the downlink transmission timing of the DU may be determined according to any method. For example, with reference to the timing type 1, the downlink transmission timing of the DU may be aligned with a downlink transmission timing of an IAB donor node. Specifically, the downlink transmission timing of the DU may be indicated and adjusted by the upper-level node based on over-the-air synchronization (OTA synchronization) signaling, or the downlink transmission timing of the DU may be obtained based on a global positioning system GPS or may be obtained based on another system that supports timing acquisition, such as a global navigation satellite system GNSS or BeiDou.

It should be noted that different timing modes implicitly represent transmission modes, and that sizes of guard bands required by the transmission modes may be different. For example, full duplex generally requires more guard bands than space division multiplexing. Generally, during space division sending or space division receiving, frequency division multiplexing is used to increase isolation between the MT and the DU.

For example, it is generally considered that frequency division multiplexing may be performed when the timing mode case and the timing mode case are used.

In this application, a constraint condition of the frequency division (or frequency division pattern) configuration may be defined in a protocol or reported to the donor base station by the IAB. For example, an RB of a lowest frequency of the DU cell, an RB of a highest frequency of the DU cell, at least an initial bandwidth part included in the DU cell after frequency division, absence of discontinuous frequency domain resources of the DU cell after frequency division, a maximum of X continuous frequency domain resource segments of the DU cell after frequency division, X continuous RBs starting from the lowest frequency of the DU cell, and X continuous RBs starting from the highest frequency of the DU cell.

With reference to the fourth aspect, in some implementations of the fourth aspect, the processing unit is further configured to determine, on a first time domain resource based on the first pattern, the resource for communicating with the first node and/or the terminal device; and the transceiver unit is further configured for the network device to communicate with the first node and/or the terminal device on the first time domain resource.

It should be understood that the first time domain resource herein may be understood as a time resource set. The first time domain resource may include one or more slots. The plurality of slots may be continuous slots or discontinuous slots. The first pattern is mapped to the one or more slots, and is used for communication between the first node and the second network device and/or the terminal device.

Optionally, different frequency domain resource patterns may be mapped to the one or more slots of the first time domain resource.

Optionally, the first time domain resource may alternatively include one or more symbols, and a time granularity is not limited in this application.

With reference to the fourth aspect, in some implementations of the fourth aspect, the transceiver unit is further configured to send second information, where the second information indicates the first time domain resource.

With reference to the fourth aspect, in some implementations of the fourth aspect, the plurality of patterns are configured by a donor (donor) network device, that is, the transceiver unit is further configured for the donor network device to send configuration information of one or more patterns. The configuration information of the one or more patterns may be configured by the donor network device at one or more times. This is not specifically limited in this application.

With reference to the fourth aspect, in some implementations of the fourth aspect, before the donor network device configures the plurality of patterns, the transceiver unit is further configured for the donor network device to receive frequency division multiplexing configuration information from the first node, where the frequency division multiplexing configuration information includes a restrictive condition configured for the plurality of patterns.

For example, the plurality of patterns may alternatively be predefined in a protocol. This is not limited in this application.

With reference to the fourth aspect, in some implementations of the fourth aspect, a configuration of each pattern includes a frequency domain resource bandwidth of the at least one resource, each pattern has corresponding pattern identification information, and identification information of any two patterns is different.

With reference to the fourth aspect, in some implementations of the fourth aspect, the configuration of each pattern further includes a frequency domain resource attribute of the at least one resource, and each frequency domain resource attribute is one of the first resource, the second resource, and the third resource.

It should be understood that a pattern of a frequency domain resource defined in a protocol may indicate attributes H/S/NA of a plurality of frequency domain resource segments, and/or that a protocol defines a pattern of frequency domain resources of a plurality of lengths.

For example, when a frequency domain resource of the cell of the distributed unit DU of the first node is divided into three segments, that is, three frequency domain resource sets, and each set includes continuous frequency domain resources, a pattern for dividing the corresponding frequency domain resource into three segments may be selected for mapping.

Optionally, when a protocol defines a pattern of a frequency domain resource of one length only, for example, a pattern for dividing the frequency domain into five segments, only resources with first three resource attributes in each pattern need to be mapped, that is, the first three resource attributes of each pattern correspond to availability of each resource segment.

With reference to the fourth aspect, in some implementations of the fourth aspect, a configuration of the frequency domain resource bandwidth includes a start resource block number of the at least one resource and a quantity of resource blocks of the at least one resource.

For example, the frequency domain resource bandwidth is configured by the donor network device, or the frequency domain resource bandwidth is predefined in a protocol. For example, the DU calculates an actually indicated bandwidth based on a bandwidth actually used by the cell. This is not limited in this application.

For example, each pattern has corresponding pattern identification information, and a frequency domain size of each resource segment in a corresponding frequency domain resource pattern and a frequency domain attribute corresponding to each resource segment may be determined by using an identifier of the pattern.

For example, based on a start and length indicator value SLIV of a frequency domain resource, and a start and duration of a frequency domain bandwidth resource predefined in a protocol, a start frequency domain resource index and an end frequency domain resource index of the scheduled frequency domain resource are mapped. In other words, the network device may determine a start resource block number and a quantity of resource blocks of the corresponding frequency domain resource by using the index values, to configure a frequency domain length of the frequency domain H//S/NA.

With reference to the fourth aspect, in some implementations of the fourth aspect, the first information includes identification information of at least one pattern set, the identification information of the at least one pattern set is used to determine at least one target pattern set, the at least one target pattern set includes the first pattern, a configuration of each pattern set includes at least one of the plurality of patterns, each pattern set has corresponding pattern set identification information, and identification information of any two pattern sets is different.

With reference to the fourth aspect, in some implementations of the fourth aspect, the transceiver unit is further configured to send third information, where the third information is used to configure at least one first slot; and the processing unit is further configured to map at least one first pattern to the at least one first slot.

With reference to the fourth aspect, in some implementations of the fourth aspect, the first slot is a slot in a first time domain periodicity, or the first slot is a slot corresponding to a time domain resource being a fourth resource in a first time domain periodicity, where the first time domain periodicity corresponds to a configuration periodicity of the first time domain resource, availability of the fourth resource is determined by second indication information, and the second indication information is sent by the first network device.

Optionally, the first slots may alternatively be all slots in the first time domain periodicity.

It should be understood that the first slot herein may be a non-TDM slot, or may be directly referred to as an FDM slot. A specific name of the first slot is not limited in this application. The first slot supports only one function, that is, a frequency division resource configuration is allowed to be configured for some slots. In addition, a quantity of first slots supporting the function is not limited in this application either.

It should be noted that the first slot is only an implementation of a time granularity. Alternatively, a first symbol or the like may be determined in a first time segment. A specific time granularity is not limited in this application.

For example, the first periodicity may correspond to a configuration periodicity of an H/S/NA time domain resource in the first time segment, or a periodicity may be separately configured in units of slots or absolute time, or one system frame may be used as a periodicity. A manner of determining the first periodicity is not limited in this application.

With reference to the fourth aspect, in some implementations of the fourth aspect, the processing unit is further configured to determine the first time segment and/or a total quantity of slots in the first periodicity based on a subcarrier spacing; and the processing unit is further configured to determine, based on a number of the first slot and/or a number set of the first slot, a quantity of slots corresponding to the first slot.

For example, the DU calculates the quantity of slots in the first periodicity based on the configuration periodicity of the H/S/NA time domain resource and the configured subcarrier spacing, and determines, based on the number of the first slot, which slots are non-TDM slots.

For example, a total quantity of slots in a periodicity is determined with reference to a subcarrier spacing of an initial bandwidth part BWP of the cell of the DU, because in a given subcarrier spacing, a total quantity of slots in a system frame is fixed.

Optionally, the reference subcarrier spacing may be separately configured, or may refer to a configured subcarrier spacing that already exists in other signaling or another application scenario in another current protocol. This is not limited in this application.

With reference to the fourth aspect, in some implementations of the fourth aspect, a quantity of the at least one pattern is the same as a quantity of first slots, or a quantity of the at least one pattern is a positive integer multiple of a quantity of first slots, or a quantity of the at least one pattern is less than a quantity of first slots.

Optionally, when the H/S/NA frequency domain resource is mapped to the first slot, different frequency domain resource patterns may be mapped to the first slot. For example, the H frequency domain resource is mapped to the first slot, or the NA frequency domain resource is mapped to the first slot based on this resource configuration. In this case, the NA frequency domain resource overrides the H frequency domain resource, that is, availability of the frequency domain resource of the DU of the first node in the first slot is changed from a definitely available resource to an unavailable resource. To be specific, in a mapping of frequency domain resources to time domain resources, the H, S, and NA resources may be randomly combined, specifically depending on a requirement for communication between the network device and the first node and/or the terminal device. This is not limited in this application.

Optionally, any one of the H/S/NA frequency domain resources may be mapped to the first slot; or S+NA, that is, the S frequency domain resource is first mapped to the first slot, and then the NA frequency domain resource is mapped to the S resource based on further indication information; or S+H, H+NA, S+H+NA, or the like. A resource mapping manner is not limited in this application.

Optionally, a same frequency domain resource, for example, the H frequency domain resource, may be mapped to different time domain resources, for example, S and NA time domain resources. This is not limited in this application.

With reference to the fourth aspect, in some implementations of the fourth aspect, the transceiver unit is further configured to send fourth information, where the fourth information indicates resource availability of the third resource, for example, indicates resource availability of the S time domain resource and the S frequency domain resource.

With reference to the fourth aspect, in some implementations of the fourth aspect, the fourth information further indicates resource availability of the fourth resource, that is, a resource whose time domain resource attribute is S.

With reference to the fourth aspect, in some implementations of the fourth aspect, the transceiver unit is further configured to: send fifth information, where the fifth information indicates grouping information of a frequency domain resource corresponding to the first slot; and send sixth information, where the sixth information indicates a resource attribute of at least one frequency domain resource group.

It should be noted that a granularity and a manner of frequency domain resource division may be an RBG, a quantity of RBs, a bandwidth part BWP, or the like. This is not specifically limited in this application.

With reference to the fourth aspect, in some implementations of the fourth aspect, the processing unit is further configured to obtain a first relationship and/or a second relationship, where the first relationship is a correspondence between a first parameter and indication information of availability of the first resource, the first relationship indicates resource availability of the first slot, the second relationship is a correspondence between a second parameter and indication information of availability of the second resource, and the second relationship indicates resource availability of the frequency domain resource of the first slot; and the processing unit is further configured to determine the first pattern based on the first relationship and/or the second relationship.

It should be understood that the first relationship and the second relationship may indicate availability of all time domain resources and availability of all frequency domain resources, and/or may indicate resource availability of the first slot, that is, a slot that requires frequency division multiplexing, and/or may indicate availability of the frequency domain resource of the first slot. This is not limited in this application.

With reference to the fourth aspect, in some implementations of the fourth aspect, the transceiver unit is further configured to send seventh information, where the seventh information includes identification information of at least one indication set, the identification information of the at least one indication set is used to determine at least one target indication set, the at least one target indication set includes the first parameter and/or the second parameter, and identification information of any two indication sets is different; and the processing unit is further configured to determine resource attributes of one or more frequency domain resources of the at least one first slot based on the at least one target indication set.

In this application, the indication information, the configuration information, or the like in this application may be carried, without limitation, in one of radio resource control signaling, media access control MAC layer signaling, and physical layer PHY signaling, or a combination of at least two thereof. The radio resource control signaling includes radio resource control RRC signaling. The MAC layer signaling includes a MAC control element CE. The physical layer signaling includes downlink control information DCI or the like.

According to a fifth aspect, a first node and/or a terminal device are/is provided, including a processor, and optionally, further including a memory. The processor is configured to control a transceiver to receive and send signals. The memory is configured to store a computer program. The processor is configured to invoke the computer program from the memory and run the computer program, so that the first node and/or the terminal device perform/performs the method in any one of the first aspect or the possible implementations of the first aspect.

Optionally, there are one or more processors, and there are one or more memories.

Optionally, the memory may be integrated with the processor, or the memory and the processor are separately disposed.

Optionally, the first node and/or the terminal device further include/includes the transceiver, and the transceiver may be specifically a transmitter (transmitter) and a receiver (receiver).

According to a sixth aspect, a network device is provided, including a processor, and optionally, further including a memory. The processor is configured to control a transceiver to receive and send signals. The memory is configured to store a computer program. The processor is configured to invoke the computer program from the memory and run the computer program, so that the network device performs the method in any one of the second aspect or the possible implementations of the second aspect.

Optionally, there are one or more processors, and there are one or more memories.

Optionally, the memory may be integrated with the processor, or the memory and the processor are separately disposed.

Optionally, the network device further includes the transceiver, and the transceiver may be specifically a transmitter (transmitter) and a receiver (receiver).

According to a seventh aspect, a communication apparatus is provided, including modules or units configured to implement the method in any one of the first aspect or the possible implementations of the first aspect, or modules or units configured to implement the method in any one of the second aspect or the possible implementations of the second aspect.

According to an eighth aspect, a communication system is provided, including: a first node and/or a terminal device, configured to perform the method in any one of the first aspect or the possible implementations of the first aspect; and a network device, configured to perform the method in any one of the second aspect or the possible implementations of the second aspect.

According to a ninth aspect, a computer-readable storage medium is provided. The computer-readable storage medium stores a computer program or code. When the computer program or code is run on a computer, the computer is enabled to perform the method in any one of the first aspect or the possible implementations of the first aspect, or the method in any one of the second aspect or the possible implementations of the second aspect.

According to a tenth aspect, a chip is provided, including at least one processor. The at least one processor is coupled to a memory. The memory is configured to store a computer program. The processor is configured to invoke the computer program from the memory and run the computer program, so that a first node and/or a terminal device on which the chip system is installed perform/performs the method in any one of the first aspect or the possible implementations of the first aspect, and that a network device on which the chip system is installed performs the method in any one of the second aspect or the possible implementations of the second aspect.

The chip may include an input circuit or interface configured to send information or data, and an output circuit or interface configured to receive information or data.

According to an eleventh aspect, a computer program product is provided. The computer program product includes computer program code. When the computer program code is run by a network device, the first node and/or the terminal device are/is enabled to perform the method in any one of the first aspect or the possible implementations of the first aspect, and the network device is enabled to perform the method in any one of the second aspect or the possible implementations of the second aspect.

According to a twelfth aspect, a wireless communication method is provided. The method includes: receiving configuration information, where the configuration information indicates resource availability, the configuration information includes identification information of a plurality of indication sets, and each indication set includes availability indications of a plurality of time domain resources and/or frequency domain resources; and determining availability of the frequency domain resource and/or the time domain resource based on the configuration information.

According to a thirteenth aspect, a wireless communication method is provided. The method includes: sending configuration information, where the configuration information indicates resource availability, the configuration information includes identification information of a plurality of indication sets, and each indication set includes availability indications of a plurality of time domain resources and/or frequency domain resources; and determining availability of the frequency domain resource and/or the time domain resource based on the configuration information.

With reference to the twelfth aspect or the thirteenth aspect, in some implementations, after the receiving configuration information, the method further includes: receiving first information. The first information may be the first information in the first aspect or the second aspect.

With reference to the twelfth aspect or the thirteenth aspect, in some implementations, the availability indication of the frequency domain resource includes a resource availability indication of at least one RB set group, and each RB set group includes a resource availability indication of an RB set group of at least one slot.

With reference to the twelfth aspect or the thirteenth aspect, in some implementations, the availability indication of the frequency domain resource includes a resource availability indication of at least one slot, the at least one slot includes a first slot, and the first slot further includes a resource availability indication of at least one RB set group.

With reference to the twelfth aspect or the thirteenth aspect, in some implementations, the plurality of indication sets include a first indication set and a second indication set, the first indication set corresponds to the time domain resource, the second indication set corresponds to the availability indication of the frequency domain resource, and identification information of the first indication set is different from identification information of the second indication set.

According to the solutions in the embodiments of this application, a wireless communication method and apparatus are provided. A frequency division resource pattern is predefined and configured, and then mapped to a time domain resource that requires frequency division multiplexing; and further, availability of some or all resources in each frequency division slot is indicated by using signaling, so that resources of a relay node can be configured. A constraint is imposed on allocation of frequency division multiplexing resources, to make a frequency division configuration not excessively flexible, so that a network (for example, a donor base station and an IAB node) can process an available bandwidth of a DU cell in at least two manners: frequency division and no frequency division, and semi-statically configure corresponding signal and channel resources or the like in several bandwidths for UE. This further reduces signaling overheads and improves system performance. Particularly, for a problem of coexistence of a frequency domain configuration indication and a time domain configuration indication set, a plurality of possible resource availability indication configurations are provided, to avoid confusion and interference between time domain resource availability indications and frequency domain resource availability indications. In addition, availability indication configurations may be configured for time division resources and frequency division resources based on a unified signaling framework.

DESCRIPTION OF EMBODIMENTS

Figure 1:
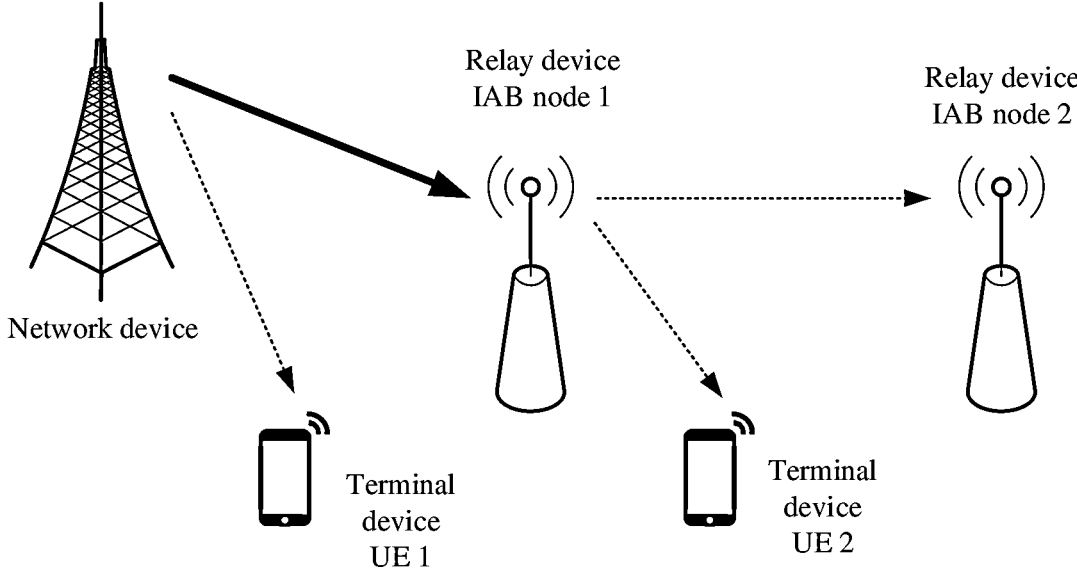
FIG. 1 is a schematic diagram of an example of a network architecture according to this application.

The following describes technical solutions of this application with reference to accompanying drawings.

The technical solutions in the embodiments of this application may be applied to various communication systems, such as a global system for mobile communications (Global System of Mobile communication, GSM), a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, LTE time division duplex (Time Division Duplex, TDD), a universal mobile telecommunication system (Universal Mobile Telecommunication system, UMTS), a worldwide interoperability for microwave access (Worldwide Interoperability for Microwave Access, WiMAX) communication system, and a 5th Generation (5th Generation, 5G) system or new radio (New Radio, NR), and may also be extended to similar wireless communication systems, for example, Wireless Fidelity (Wireless Fidelity, Wi-Fi), and a cellular system related to the 3rd Generation Partnership Project (3rd Generation Partnership Project, 3GPP).

Generally, a conventional communication system supports a limited quantity of connections, and is easy to implement. However, with development of communication technologies, a mobile communication system not only supports conventional communication, but also supports, for example, device to device (device to device, D2D) communication, machine to machine (machine to machine, M2M) communication, machine type communication (machine type communication, MTC), vehicle to everything (vehicle to everything, V2X) communication, for example, vehicle to vehicle (vehicle to vehicle, V2V) communication, vehicle to infrastructure (vehicle to infrastructure, V2I) communication, vehicle to pedestrian (vehicle to pedestrian, V2P) communication, and vehicle to network (vehicle to network, V2N) communication, long term evolution-vehicle (Long Term Evolution-Vehicle, LTE-V), vehicle to everything, machine type communication (machine type communication, MTC), Internet of Things (Internet of Things, IoT), long term evolution-machine (Long Term Evolution-Machine, LTE-M), and machine to machine (Machine to Machine, M2M).

A terminal device in the embodiments of this application may be referred to as user equipment (user equipment, UE), an access terminal, a subscriber unit, a subscriber station, a mobile station, a remote station, a remote terminal, a mobile device, a user terminal, a terminal, a wireless communication device, a user agent or user apparatus, a soft terminal, or the like. The terminal device includes various handheld devices having wireless communication functions, an in-vehicle device, a wearable device, a computing device, or another processing device connected to a wireless modem. The terminal may be a mobile station (Mobile Station, MS), a subscriber unit (subscriber unit), a cellular phone (cellular phone), a smartphone (smartphone), a wireless data card, a personal digital assistant (Personal Digital Assistant, PDA) computer, a tablet computer, a wireless modem (modem), a handheld device (handset), a laptop computer (laptop computer), a machine type communication (Machine Type Communication, MTC) terminal, or the like.

Alternatively, the terminal device in the embodiments of this application may be a mobile phone (mobile phone), a computer with a radio transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld terminal, a notebook computer, a cordless phone (cordless phone) or a wireless local loop (wireless local loop, WLL) station, a terminal device in a future 5G network, a terminal device in a future evolved public land mobile communication network PLMN, or the like.

In addition, the terminal device may alternatively be a terminal device in an Internet of Things (internet of things, IoT) system. The IoT is an important part in future development of information technologies. A main technical feature of the IoT is to connect things to a network by using a communication technology, to implement an intelligent network for human-machine interconnection and thing-thing interconnection. It should be understood that a specific form of the terminal device is not limited in this application.

A network device in the embodiments of this application is an apparatus deployed in a radio access network and configured to provide a wireless communication function for a terminal device. The device includes but is not limited to a radio network controller (Radio Network Controller, RNC), a base station controller (Base Station Controller, BSC), a home base station (for example, a home evolved NodeB or a home NodeB HNB), a baseband unit (BaseBand Unit, BBU), an access point (Access Point, AP) in a Wireless Fidelity system, a wireless relay node, a wireless backhaul node, a transmission point (transmission point, TP), a transmission and reception point (transmission and reception point, TRP), or the like, or may be a gNB or a transmission point (TRP or TP) in a 5G (such as NR) system, or one antenna panel or a group of antenna panels (including a plurality of antenna panels) of a base station in a 5G system, or may be a network node that constitutes a gNB or a transmission point, for example, a baseband unit BBU, or a distributed unit (distributed unit, DU).

The network device in the embodiments of this application may include a macro base station, a micro base station (also referred to as a small cell), a relay station, an access point, and the like in various forms, or may be a base transceiver station (Base Transceiver Station, BTS) in a global system for mobile communications GSM or code division multiple access CDMA system, or may be a NodeB (NodeB, NB) in a wideband code division multiple access WCDMA system, or may be an evolved NodeB (Evolved NodeB, eNB, or eNodeB) in an LTE system, or may be a radio controller in a cloud radio access network (Cloud Radio Access Network, CRAN) scenario. Alternatively, the network device may be a relay station, an access point, a wearable device, an in-vehicle device, a wearable device, a network device in a future 5G network, a network device in a future evolved public land mobile communication network (public land mobile network, PLMN) network, or the like.

In a network structure, a network device may include a central unit (central unit, CU) node or a distributed unit (distributed unit, DU) node, a RAN device including a CU node and a DU node, or a RAN device including a CU control plane node (CU-CP node), a CU user plane node (CU-UP node), and a DU node. The network device serves a cell, and a terminal device communicates with the cell by using a transmission resource (for example, a frequency domain resource) allocated by the network device. The cell may belong to a macro base station, or may belong to a base station corresponding to a small cell (small cell). The small cell herein may include a metro cell (metro cell), a micro cell (micro cell), a pico cell (pico cell), a femto cell (femto cell), or the like. These small cells have characteristics of small coverage and low transmit power, and are applicable to providing a high-rate data transmission service.

FIG. 1 is a schematic diagram of an example of a network architecture according to this application. As shown in FIG. 1, the network architecture includes three types of devices: a network device (for example, a donor base station), a relay device (for example, an IAB node 1 and an IAB node 2), and a terminal device (for example, UE 1 and UE 2). The relay device is outside planned coverage of the network device. A distance between the relay device and the network device is greater than a distance between the terminal device and the network device. A link between the network device and the relay device may be referred to as a "backhaul (backhaul, BH) link", and a link between the relay device and the terminal device may be referred to as an "access (access, AC) link".

It should be noted that the name of the link between the network device and the relay device, the name of the link between the relay device and the network device, and the name of the link between the relay device and the terminal device are not limited in this application. The network device may also be referred to as a "donor network device", a "donor network device", a "donor base station", or a "relay device". The donor base station may be an access network element having complete base station functions, or may be an access network element in a form of a central unit CU and a distributed unit DU that are separated.

In the embodiments of this application, the network device may be an IAB node or a node used for relay communication. The relay device may be deployed at a place farther from a base station or an access device than the terminal device, and the access device may be another relay device. In addition, a name of the relay device may be a relay node (relay node, RN), a relay transmission reception point (relay transmission reception point, rTRP), or an integrated access and backhaul node (integrated access and backhaul node, IAB node). An upper-level node of the relay node may be a gNB (including a gNB-DU, a gNB-CU, and the like), or may be another relay node.

It should be understood that this application is applicable to a wireless communication system having a relay node. Although FIG. 1 shows that the relay device is directly connected to the network device by using a wireless air interface, an IAB relay system may support multi-level relay. To be specific, an IAB node may establish a wireless backhaul link with one or more upper-level nodes, and access a donor base station by using the one or more upper-level nodes. Similarly, one IAB node may further serve one or more lower-level nodes. The donor base station may communicate with the IAB node 1, or may directly communicate with the user equipment UE 1. Similarly, the IAB node 1 may communicate with the IAB node 2, or may communicate with the user equipment UE 2.

Figure 2:
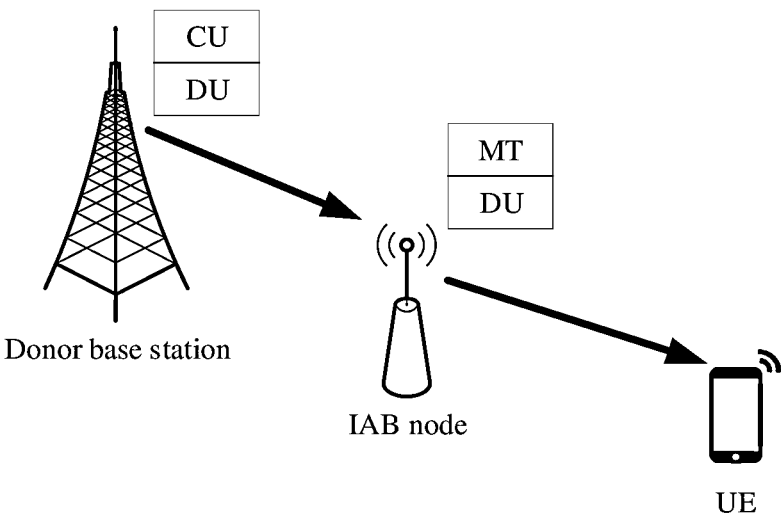
FIG. 2 is a schematic diagram of another example of a network architecture according to this application.

FIG. 2 is a schematic diagram of another example of a network architecture according to this application. As shown in FIG. 2, a donor base station may be further divided into a CU and a DU in terms of functions and logic, and an IAB node may be further divided into a mobile terminal (mobile-termination, MT) module and a distributed unit (distributed unit, DU) module in terms of functions and logic.

An MT function is defined as a component similar to UE. In the IAB, the MT is referred to as a function that resides on the IAB node. Because the MT has a function similar to a function of common UE, it may be understood that the IAB node accesses an upper-level node or a network by using the MT.

A DU function is relative to a CU function. In 5G NR, functions of a base station are divided into two parts. This is referred to as CU-DU separation. From a perspective of a protocol stack, the CU includes a radio resource control (radio resource control, RRC) layer and a packet data convergence protocol (packet data convergence protocol, PDCP) layer of an original LTE base station, and the DU includes a radio link control (radio link control, RLC) layer, a media access control (media access control, MAC) layer, and a physical (physical, PHY) layer. In common 5G base station deployment, the CU and the DU may be physically connected by using an optical fiber. Logically, there is a specially defined F1 interface used for communication between the CU and the DU. From a functional perspective, the CU is mainly responsible for processing a non-real-time protocol and service, such as radio resource control and configuration, inter-cell mobility management, and bearer management; and the DU is mainly responsible for processing a physical layer protocol and a real-time service, such as scheduling, and physical signal generation and sending.

Functions of these protocol layers may be implemented by one node, or may be implemented by a plurality of nodes. For example, in an evolved structure, a RAN device may include a central unit CU and a distributed unit DU, and a plurality of DUs may be centrally controlled by one CU.

For example, downlink transmission is performed between the CU and the DU. An F1-AP data packet generated by the CU is encapsulated into an IP packet, and transmitted between multi-hop nodes (for example, an JAB node 1 and an IAB node 2) over an air interface. After the data packet arrives at a target JAB node, the data packet is processed at an adaptation layer of an MT module of the target IAB, and then forwarded to a DU module of the local JAB for processing. Finally, the F1-AP data packet is obtained through parsing at the DU.

In the foregoing network architecture, signaling generated by the CU may be sent to a terminal device by using the DU, or signaling generated by a terminal device may be sent to the CU by using the DU. The DU may transparently transmit the signaling to the terminal device or the CU by directly encapsulating the signaling at a protocol layer without parsing the signaling.

Figure 3:
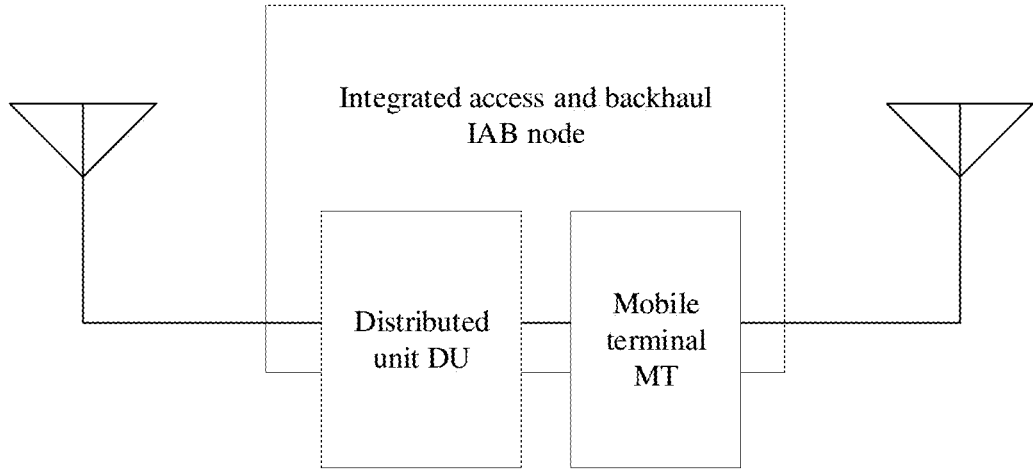
FIG. 3 is a schematic diagram of an example of a structure of an integrated access and backhaul IAB node according to this application.

FIG. 3 is a schematic diagram of an example of a structure of an integrated access and backhaul JAB node according to this application. As shown in FIG. 3, the JAB node may be divided into an MT module and a DU module. The IAB node used to perform a function of a terminal device may be referred to as a mobile terminal MT side or an MT functional module, that is, the IAB node communicates with an upper-level node by using the MT. The JAB node used as an access network device similar to a base station is referred to as a distributed unit DU side or a DU functional module, that is, the IAB node communicates with a lower-level node and ULE by using the DU. Both the MT and the DU of the IAB node have complete transceiver modules, and there is an interface between the MT and the DU.

It should be noted that the MT and the DU are logical modules. Actually, the MT and the DU may share some submodules, for example, may share a transceiver antenna and a baseband processing module.

In a communication process, air interface resources of a backhaul link and an access link of the JAB node need to be configured by a donor base station or the upper-level node. The resource configuration of the JAB node may include an MT resource configuration and a DU resource configuration. The MT resource configuration indicates a resource configuration used when the MT of the JAB node communicates with the upper-level node. MT resources of the JAB node may be configured as three types: uplink (uplink, UL), downlink (downlink, DL), and flexible (flexible, F). The DU resource configuration indicates a resource configuration used when the DU of the IAB node communicates with the lower-level node. DU resources of the JAB node may be configured as three types: uplink (uplink, UL), downlink (downlink, DL), and flexible (flexible, F). The DU resource configuration of the IAB node is indicated by the upper-level node or the donor base station by using interface signaling.

It should be understood that the foregoing communication system and network architecture are merely examples for description, and are intended to describe the technical solutions in the embodiments of this application more clearly, and do not constitute a limitation on the technical solutions provided in the embodiments of this application. A person of ordinary skill in the art may know that with evolution of network architecture and emergence of new service scenarios, the technical solutions provided in the embodiments of this application are also applicable to similar technical problems. For example, the communication system may further include a core network device. The core network device may be connected to a plurality of access network devices, and is configured to control the access network devices. In addition, data received from a network side (for example, the Internet) may be distributed to the access network devices.

A specific structure of an execution body of a method provided in the embodiments of this application is not particularly limited in the embodiments of this application, provided that a program that records code for the method provided in the embodiments of this application can be run to perform communication according to the method provided in the embodiments of this application. For example, the execution body of the method provided in the embodiments of this application may be a terminal device, a network device, a functional module that can invoke and execute the program in a terminal device or a network device, or a component (for example, a chip or a circuit) that may be applied to a terminal device or a network device.

In addition, aspects or features of this application may be implemented as a method, an apparatus, or a product that uses standard programming and/or engineering technologies. The term "product" used in this application covers a computer program that can be accessed from any computer-readable device, carrier, or medium. For example, the computer-readable medium may include but is not limited to: a magnetic storage device (for example, a hard disk, a floppy disk, or a magnetic tape), an optical disc (for example, a compact disc (compact disc, CD) or a digital versatile disc (digital versatile disc, DVD)), a smart card, and a flash memory device (for example, an erasable programmable read-only memory (erasable programmable read-only memory, EPROM), a card, a stick, or a key drive). In addition, various storage media described in this specification may represent one or more devices and/or other machine-readable media that are configured to store information. The term "machine-readable media" may include but is not limited to a radio channel, and various other media that can store, include and/or carry instructions and/or data.

For ease of description, the following first describes terms used in the embodiments of this application.

1. Guard band: The guard band is a bandwidth part resource reserved by the MT and the DU during use of frequency domain resources. In other words, the MT and the DU neither send a signal nor receive a signal on this bandwidth resource. In this way, related interference between the MT and the DU can be avoided.

2. Timing mode: Different transmission timing schemes are defined for different transmission modes in a protocol. There are the following three different timing types.

For example, a timing type 1: case #1 timing in a standard, that is, a sending time of the DU, is used in a time division multiplexing (time division multiplexing, TDM) mode. It should be understood that the MT of the IAB node determines an uplink transmission timing based on timing advance (timing advance, TA) indication information of the upper-level node. A downlink sending timing of the DU of the IAB node is aligned with a downlink sending timing of a DU of another node. In other words, the case #1 timing mode requires that the sending time of the DU of the IAB node should be the same as a sending time of another node including a donor node, to meet an inter-site synchronization requirement of a TDD system.

For example, a timing type 2: case #6 timing mode is used for space division sending. It should be understood that an uplink sending timing of the MT of the IAB node needs to be aligned with the downlink sending timing of the DU of the IAB node.

For example, a timing type 3: case #7 timing mode is used for space division receiving, and may be further used for uplink full duplex. It should be understood that an uplink receiving timing of the MT of the IAB node needs to be aligned with a downlink receiving timing of the DU of the IAB node.

It should be noted that implementation of space division multiplexing by the DU and the MT of the IAB node means that when the DU performs downlink sending, the MT performs uplink sending, and that when the DU performs uplink receiving, the MT performs downlink receiving. In other words, that the MT performs uplink sending when the DU performs downlink sending may be briefly described as a space division multiplexing scenario in which the IAB node performs simultaneous sending; and that the MT performs downlink receiving when the DU performs uplink receiving may be briefly described as a space division multiplexing scenario in which the IAB node performs simultaneous receiving.

Further, the timing type 1 is applicable to a case of time division multiplexing of the MT and the DU of the IAB node; the timing type 2 is applicable to the space division multiplexing scenario in which the IAB node performs simultaneous sending; and the timing type 3 is applicable to the space division multiplexing scenario in which the IAB node performs simultaneous receiving.

In summary, the foregoing three timing types specify a rule for determining an uplink transmission timing of the MT of the IAB node. In both the timing type 2 and the timing type 3, the uplink transmission timing of the MT is related to a downlink transmission timing of the DU. It should be understood that in the embodiments of this application, the downlink transmission timing of the DU may be determined according to any method. For example, with reference to the timing type 1, the downlink transmission timing of the DU may be aligned with a downlink transmission timing of an IAB donor node. Specifically, the downlink transmission timing of the DU may be indicated and adjusted by the upper-level node based on over-the-air synchronization (over-the-air synchronization, OTA synchronization) signaling, or the downlink transmission timing of the DU may be obtained based on a global positioning system (global positioning system, GPS) or may be obtained based on another system that supports timing acquisition, such as a global navigation satellite system (global navigation satellite system, GNSS) or BeiDou.

Therefore, different timing modes implicitly represent transmission modes, and sizes of guard bands required by the transmission modes may be different. For example, full duplex generally requires more guard bands than space division multiplexing.

3. Constrained timing mode of frequency division multiplexing: Generally, during space division sending or space division receiving, frequency division multiplexing is used to increase isolation between the MT and the DU.

For example, it is generally considered that frequency division multiplexing may be performed when the timing mode case #6 timing and the timing mode case #7 timing are used.

4. Upper-level node: The upper-level node is a node that receives data or a signal during uplink transmission, or a node that sends data or a signal during downlink transmission. A node or a network device that provides a wireless backhaul link resource is referred to as an upper-level node of a relay device.

5. Lower-level node: The lower-level node is a node that sends data or a signal during uplink transmission, or a node that receives data or a signal during downlink transmission. A node that uses a backhaul link resource to transmit data to a network or receive data from a network is referred to as a lower-level node. For example, a relay device is referred to as a lower-level node of a network device, and the network is a core network or another network above an access network, such as the Internet or a dedicated network.

6. Access link: The access link is a wireless link used by a node to communicate with a lower-level node of the node, and includes an uplink transmission link and a downlink transmission link. Uplink transmission on the access link is also referred to as uplink transmission of the access link, and downlink transmission on the access link is also referred to as downlink transmission of the access link. The node includes but is not limited to the foregoing IAB node.

7. Backhaul link: The backhaul link is a wireless link used by a node to communicate with an upper-level node and/or a lower-level node of the node, and includes an uplink transmission link and a downlink transmission link. Uplink transmission on the backhaul link is also referred to as uplink transmission of the backhaul link, and downlink transmission on the backhaul link is also referred to as downlink transmission of the backhaul link. The node includes but is not limited to the foregoing IAB node.

8. Space division multiplexing (space division multiplexing, SDM): It may be understood that space division multiplexing allows a same frequency band to be reused in different space and uses a plurality of spatial orthogonal channels to transmit signals simultaneously to achieve capacity expansion. In short, space division multiplexing is to receive signals from a plurality of directions simultaneously. The space division multiplexing scenario is widely used to improve spectral efficiency.

9. Time division multiplexing (time division multiplexing, TDM): It may be understood that time division multiplexing uses different time segments of a same physical connection to transmit different signals to achieve multi-channel transmission. In time division multiplexing, time is used as a parameter for signal segmentation. Therefore, all signals cannot overlap each other along a time axis. In other words, the time provided for an entire channel to transmit information is divided into several slots, and these slots are allocated to each signal source for use.

10. Frequency division multiplexing (frequency division multiplexing, FDM): It may be understood that frequency division multiplexing divides a total bandwidth for channel transmission into several sub-bands (sub-channels), where each sub-channel transmits one signal, and a guard band is set between the sub-channels for isolation, so that transmitted signals do not interfere with each other, and the signals transmitted on the sub-channels work in parallel.

11. Time division resource and frequency division resource: The time division resource means that a same resource type (H/S/NA) is configured for all frequency domain resources of a slot or a symbol of a DU cell. The frequency division resource means that a frequency domain resource of a slot or a symbol of a DU cell is further divided into a plurality of RB sets or RB set groups. A resource type (H/S/NA) may be configured or indicated for each RB set or RB set group.

12. Resource availability indication: The resource availability indication may be configured by the donor base station for the IAB MT, and is used to dynamically indicate availability of a soft resource in time domain. For example, in 3GPP Rel-16, the donor base station carries an AvailabilityCombinationsPerCell information element by using RRC signaling, and configures availability of a soft time domain resource of the IAB MT. A specific implementation is as follows:

AvailabilityCombinationsPerCell information element

```
-- ASN1START
-- TAG-AVAILABILITYCOMBINATIONSPERCELL-START
AvailabilityCombinationsPerCell-r16 ::=          SEQUENCE {
    availabilityCombinationsPerCellIndex-r16
AvailabilityCombinationsPerCellIndex-r16,
    iab-DU-CellIdentity-r16                       CellIdentity,
    positionInDCI-AI-r16                              INTEGER(0..maxAI-DCI-
PayloadSize-1-r16)                        OPTIONAL, -- Need M
    availabilityCombinations-r16                      SEQUENCE (SIZE
(1..maxNrofAvailabilityCombinationsPerSet-r16)) OF AvailabilityCombination-r16,
    ...
}
AvailabilityCombinationsPerCellIndex-r16 ::= INTEGER(0..maxNrofDUCells-r16)
AvailabilityCombination-r16 ::=          SEQUENCE {
    availabilityCombinationId-r16                 AvailabilityCombinationId-r16,
    resourceAvailability-r16                          SEQUENCE (SIZE
(1..maxNrofResourceAvailabilityPerCombination-r16)) OF INTEGER (0..7)
}
AvailabilityCombinationId-r16    ::=                          INTEGER
(0..maxNrofAvailabilityCombinationsPerSet-1-r16)
    -- TAG-AVAILABILITYCOMBINATIONSPERCELL-STOP
    -- ASN1STOP
```

The AvailabilityCombinationsPerCell is used to configure an availability indication of a soft time domain resource of the IAB DU cell. The availabilityCombinationsPerCell includes a DU cell ID and a start position of bits in DCI signaling. For example, if the start position of bits in the DCI signaling is a third position, it indicates that a value indicated by the third bit in DCI 2_5 signaling received by the IAB MT is availability of the soft time domain resource of the DU cell.

Specifically, the AvailabilityCombinationsPerCell further includes a plurality of AvailabilityCombination-r16s, each AvailabilityCombination-r16 includes one ID, and the DCI indicates one or more IDs. Each availabilityCombinationId-r16 corresponds to one resourceAvailability-r16 configuration, each resourceAvailability-r16 includes a sequence of values 0 to 7, and each value represents a resource availability indication of one soft slot. Meanings of values 0 to 7 correspond to a table in the 3GPP standard protocol TS 38.213 v16.8.0. For details, refer to a mapping relationship between a resource availability indication value and an availability type indication of a soft resource in a slot in Table 4.

Figure 4:
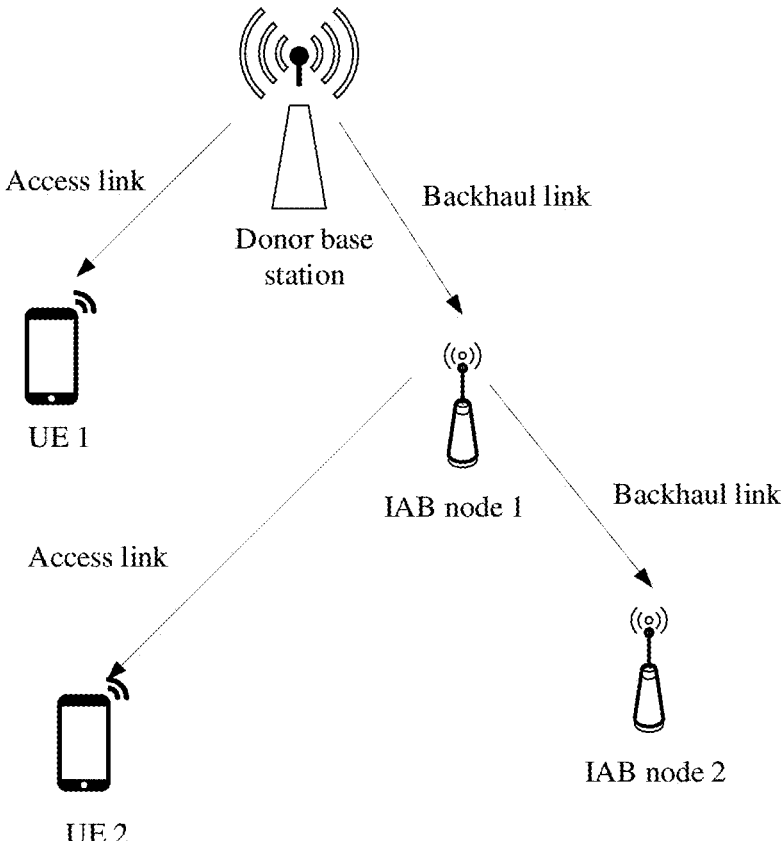
FIG. 4 is a schematic diagram of an example of a space division multiplexing scenario according to this application.

FIG. 4 is a schematic diagram of an example of a space division multiplexing scenario according to this application. An IAB system shown in FIG. 4 includes a donor base station, an IAB node 1, an IAB node 2, UE 1, and UE 2. The IAB node 2 is a child node of the IAB node 1, and the IAB node 2 may include but is not limited to an IAB node and a special terminal device. Optionally, the special terminal device may be a terminal device supporting a specific NR protocol version, for example, a terminal device supporting NR Release 16/17.

In an IAB scenario, a link for communicating with an upper-level node is generally referred to as a backhaul link, and a link for communicating with user equipment UE is generally referred to as an access link. In other words, transmission between nodes may be understood as a backhaul link, and transmission related to user equipment may be understood as an access link. An arrow in the figure represents a space division receiving scenario of the IAB. To be specific, the IAB node 1 may simultaneously receive a downlink signal sent by the donor base station on a backhaul link, receive an uplink/downlink signal sent by the child node IAB node 2, and receive a downlink signal sent by user equipment UE on an access link. It should be understood that all arrow directions reversed in the figure indicate a space division sending scenario of the IAB. To be specific, the JAB node 1 may simultaneously send an uplink signal to the donor base station, send an uplink/downlink signal to the child node JAB node 2, and send a downlink signal to the user equipment UE2.

For example, a link between the donor base station and the JAB node 1, and a link between the IAB node 1 and the IAB node 2 are backhaul links. A link between the UE 1 and the donor base station and a link between the UE 2 and the JAB node 1 are access links.

It should be noted that frequency division multiplexing in the JAB scenario mainly refers to frequency division multiplexing between an MT module of the IAB and a DU module of the IAB. In other words, the JAB MT and the JAB DU use different frequency domain resources. Because the MT and the DU use frequency division resources, mutual impact between signal receiving and sending of the MT and the DU is reduced.

It should be understood that "simultaneous working" of the MT module and the DU module specifically includes: pairwise combinations of receiving and sending by the IAB MT and the JAB DU, four scenarios in total, that is, the MT and the DU may receive signals simultaneously, or send signals simultaneously, or the DU sends a signal when the MT receives a signal, or the DU receives a signal when the MT sends a signal. Whether a specific scenario is supported depends on hardware implementation of a device. "Simultaneous working" herein means that the MT module or the DU module may receive/send signals in two directions simultaneously, and does not mean receiving a first signal and sending a second signal at the same time.

In addition, for the JAB context, frequency division multiplexing may further include frequency division multiplexing in a dual connectivity scenario. For example, the JAB node (MT) establishes connections to two devices at the same time, that is, the JAB has two upper-level nodes for backhaul transmission. When the two upper-level nodes communicate with the JAB by using different frequency domain resources in frequency domain, the communication may also be referred to as frequency division multiplexing.

Figure 5:
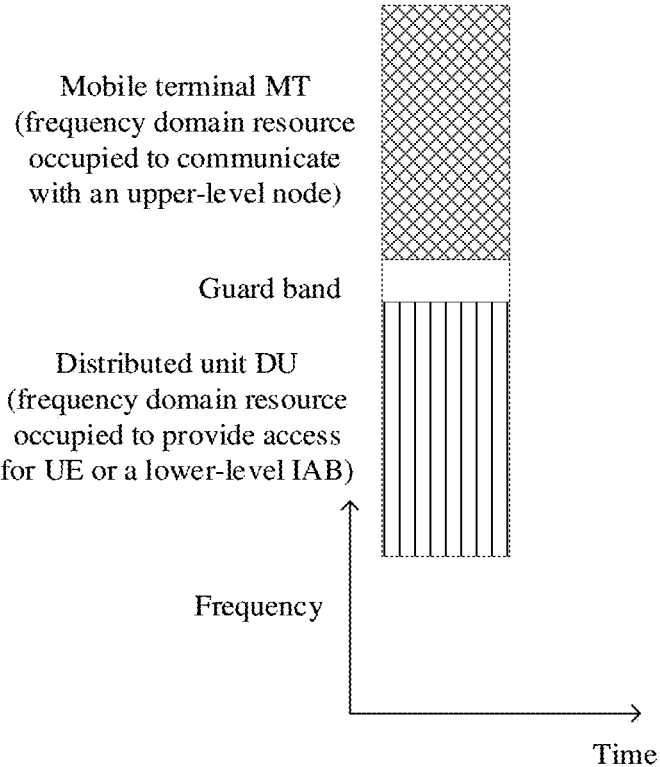
FIG. 5 is a schematic diagram of an example of a frequency division multiplexing scenario according to this application.

FIG. 5 is a schematic diagram of an example of a frequency division multiplexing scenario according to this application. As shown in FIG. 5, frequency division multiplexing is performed between an IAB MT and an IAB DU, and the IAB MT and the IAB DU are isolated by using a guard band. For example, assuming that a total bandwidth of frequency domain resources is 200 MHz, the MT may occupy 100 MHz frequency domain resources to communicate with an upper-level node, and the DU may occupy other 100 MHz frequency domain resource to communicate with UE or a lower-level IAB node.

Figure 6:
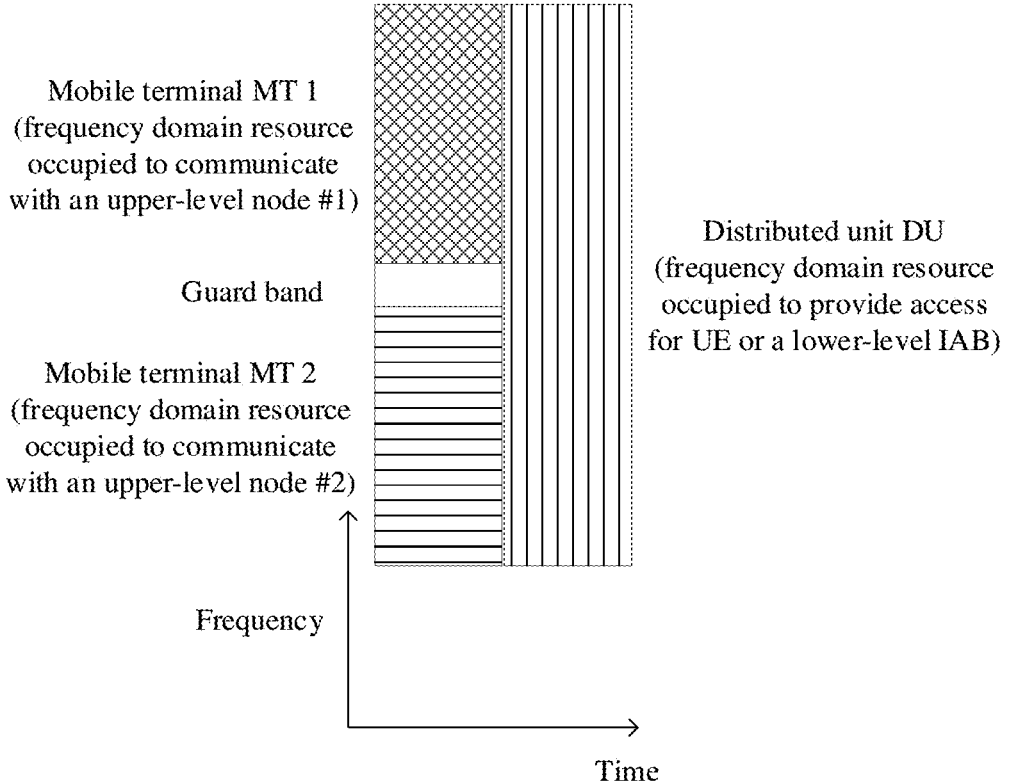
FIG. 6 is a schematic diagram of another example of a frequency division multiplexing scenario according to this application.

FIG. 6 is a schematic diagram of another example of a frequency division multiplexing scenario according to this application. As shown in FIG. 6, frequency division multiplexing is performed between an IAB MT 1 and an IAB MT 2, and the IAB MT 1 and the IAB MT 2 are isolated by using a guard band. The MT may be connected to a plurality of upper-level nodes at the same time. To be specific, the IAB MT uses frequency division resources in a backhaul link with two upper-level nodes, and the two upper-level nodes may simultaneously schedule the MT for transmission. For example, assuming that a total bandwidth of frequency domain resources is 200 MHz, the IAB MT 1 may occupy 100 MHz frequency domain resources to communicate with an upper-level node #1, and the IAB MT 2 may occupy other 100 MHz frequency domain resources to communicate with a lower-level IAB node #2.

It should be noted that an IAB MT module and an IAB DU module use time division resources, and that the IAB MT module and the IAB DU module transmit resources on different orthogonal frequency division multiplexing (orthogonal frequency division multiplexing, OFDM) symbols. It may be understood that the IAB MT 1 and the IAB MT 2 transmit a signal at a first moment, and that the IAB DU transmits a signal at a second moment.

In summary, a guard band (guard band) between the MT and the DU needs to be considered, irrespective of a solution to configuring a frequency division pattern in this application, or a solution to semi-statically configuring frequency domain resource segmentation in the foregoing possible implementation, or a solution to configuring a plurality of frequency domain resource block groups RBGs in the current technology. A constraint condition for a size of a guard band may be defined in a protocol, or may be reported by the IAB node to the donor base station. Specifically, a constraint condition for determining a size of a guard band in a frequency division (or frequency division pattern) configuration may be considered from the following aspects:

(1) For example, a relationship between the guard band and a bandwidth of the DU or MT.

For example, when a bandwidth of a DU cell is greater than or equal to X1 RBs, or a bandwidth of an MT CC is greater than or equal to Y1 RBs, the guard band requires at least Z1 RBs. For another example, when a bandwidth of a DU cell is greater than or equal to X2 RBs, or a bandwidth of an MT CC is greater than or equal to Y2 RBs, the guard band requires at least Z2 RBs. An RB size required by a guard band between the DU cell and the MT CC is not specifically limited in this application.

It should be noted that the IAB node may report signaling in the following form:

For example, a guard band requirement for frequency division multiplexing of a DU cell #1 and an MT serving cell #1 (the CC is a component carrier, and is represented as a serving cell in a higher layer signaling configuration) is reported, where the guard band requirement includes a cell identity of the DU, a serving cell identity of the MT, and at least one condition. The condition further includes a frequency domain bandwidth configuration of the DU, a frequency domain bandwidth configuration of the MT, and at least a required guard band bandwidth. The frequency domain bandwidth configuration includes one or more of the following: a frequency domain RB quantity, a frequency domain RBG quantity, a frequency domain RB quantity range, a frequency domain RBG quantity range, a start frequency, an end frequency, a frequency domain RE quantity, a frequency domain RE quantity range, a subcarrier spacing, and the like.

For example, the signaling may include but is not limited to the following form:

```
{DU cell ID: A,
 MT cell ID: B,
 Condition 1: X1 < Quantity of DU RBs < X2, Y1 < Quantity of MT
RBs < Y2, Guard band ≥ Z
 Condition 2: ...
 ...
}
```

(2) For example, a relationship between the guard band and a transmission timing mode.

For example, when the IAB works in the case #6 timing mode, a guard band of X RBs needs to be reserved on resources of the MT or the DU after frequency division. For another example, when the IAB works in the case #7 timing mode, a guard band of Y RBs needs to be reserved on resources of the MT or the DU after frequency division. For another example, when the DU performs sending while the IAB MT performs receiving, or when the DU performs receiving while the IAB MT performs sending, a guard band of Z RBs needs to be reserved on resources of the MT or the DU after frequency division. Sizes of the X RBs, Y RBs, and Z RBs are not specifically limited in this application.

It should be noted that the timing type 2: case #6 may be replaced with "the DU performs sending while the IAB MT performs sending" described in a protocol, and that the timing type 3: case #7 may be replaced with "the DU performs receiving while the IAB MT performs receiving" described in a protocol.

(3) For example, a relationship between the guard band and a synchronization status.

For example, when time of the MT is aligned with that of the DU, or a transmission timing offset between the MT and the DU is less than X1, the required guard band is Y1 RBs. In this case, there is no inter-carrier interference between the DU and the MT, and the guard band between the DU and the MT is relatively small, that is, Y1 is relatively small. For another example, when time of the MT is not completely aligned with that of the DU, or a transmission timing offset between the MT and the DU is greater than X2, the required guard band is Y2 RBs. Compared with Y1, Y2 may be slightly larger. X1 and X2 may be in units of milliseconds, microseconds, nanoseconds, Ts (any time unit in a protocol), or the like.

It should be noted that the reporting to the donor base station by the IAB may occur before the donor base station sends the frequency division configuration to the IAB, or may occur after the donor base station sends the frequency division configuration to the IAB. If the reporting to the donor base station by the IAB occurs after the donor base station sends the frequency division configuration to the IAB, it may be understood that the donor base station first configures the configuration, but after the IAB receives the configuration, the IAB finds that the configuration does not meet a guard band requirement or a hardware capability of the IAB, and therefore, the IAB is triggered to report these constraint conditions, and the donor base station performs the frequency division (or frequency division pattern) configuration again based on the constraint conditions.

In addition, in the embodiments of this application, a constraint condition of the frequency division (or frequency division pattern) configuration may be defined in a protocol, or the IAB node reports a constraint condition of the frequency division (or frequency division pattern) configuration to the donor base station, and then the donor base station performs the frequency division (or frequency division pattern) configuration based on the constraint condition.

For example, an available resource of the DU cell after frequency division may include one or more of the following cases:

(1) including an RB of a lowest frequency of the DU cell;

(2) including an RB of a highest frequency of the DU cell;

(3) including X continuous RBs starting from the lowest frequency of the DU cell;

(4) including X continuous RBs starting from the highest frequency of the DU cell;

(5) the DU cell after frequency division has at least X continuous available RBs or REs (X is a positive integer);

(6) the DU cell after frequency division includes at least an initial bandwidth part (initial BWP):

for example, the initial bandwidth part may be an initial uplink bandwidth part UL BWP; or the initial bandwidth part may be an initial downlink bandwidth part DL BWP; or the initial bandwidth part may be a larger one or a smaller one of a DL BWP and a UL BWP;

(7) the DU cell after frequency division cannot have discontinuous frequency domain resources;

(8) the DU cell after frequency division is divided into a maximum of X continuous frequency domain resources;

for example, a value of X herein is related to a bandwidth of the DU cell; for example, a bandwidth of 100 MHz may be divided into two frequency domain resource segments, and a bandwidth of 200 MHz may be divided into four continuous frequency domain resource segments;

(9) the DU cell after frequency division includes at least a bandwidth of a single side band (Single Side Band, SSB);

(10) the DU cell after frequency division includes at least a bandwidth of a physical random access channel (physical random access channel, PRACH) resource;

(11) the DU cell after frequency division includes at least a bandwidth occupied by a common physical uplink control channel (common physical uplink control channel, common PUCCH) resource;

(12) the DU cell after frequency division includes at least a bandwidth of a control resource set (control resource set #0, CORESET 0) #0; and

(13) the DU cell after frequency division includes at least a bandwidth occupied by a system information block 1 (system information block #1, SIB 1).

It should be understood that the foregoing case is merely an example for description, and should not constitute any limitation on the solutions of this application.

With continuous development of mobile communication technologies, spectrum resources are increasingly insufficient. Base stations will be deployed more densely in the future to improve spectrum utilization. In addition, dense deployment may further avoid coverage holes. In a conventional cellular network architecture, a base station is connected to a core network by using an optical fiber. However, optical fiber deployment is costly in many scenarios. A wireless relay node RN may establish a connection to the core network through a wireless backhaul link, to reduce some optical fiber deployment costs.

Generally, the relay node establishes a wireless backhaul link to one or more upper-level nodes, and accesses the core network through the upper-level node. The upper-level node may control (for example, perform data scheduling, timing modulation, and power control) on the relay node by using a plurality of types of signaling. In addition, the relay node may also provide services for a plurality of lower-level nodes. The upper-level node of the relay node may be a base station or another relay node. The lower-level node of the relay node may be UE or another relay node. In some cases, the upper-level node may also be referred to as an upstream node, and the lower-level node may also be referred to as a downstream node.

In-band relay is a relay solution in which a backhaul link and an access link share a same frequency band. Because no additional spectrum resource is used, the in-band relay has advantages such as high spectral efficiency and low deployment costs. The in-band relay generally has a half-duplex constraint. Specifically, when receiving a downlink signal sent by an upper-level node of the relay node, the relay node cannot send a downlink signal to a lower-level node of the relay node, or when receiving an uplink signal sent by a lower-level node of the relay node, the relay node cannot send an uplink signal to an upper-level node of the relay node. In NR, the in-band relay solution is referred to as integrated access and backhaul (integrated access and backhaul, IAB), and the relay node is referred to as an JAB node.

When the JAB node works normally, space division multiplexing or frequency division multiplexing is performed on resources in the access link and the backhaul link. A time division multiplexing TDM scenario is used as an example. The backhaul link and the access link work at different moments. Therefore, the JAB node needs to switch between reception and transmission of the backhaul link and reception and transmission of the access link. When seamless switching is performed between the backhaul link and the access link, that is, when symbols in the access link and the backhaul link are continuous, the JAB node has highest resource utilization. However, due to various factors such as a power amplifier turn-on/off time, a transmission distance, and non-ideal synchronization, seamless switching cannot be implemented between the backhaul link and the access link. In this case, the JAB node needs to determine a set of available and/or unavailable symbols in the backhaul link and the access link.

The following first describes technical solutions in a protocol related to the embodiments of this application.

Figure 7:
FIG. 7 is a schematic diagram of an example of resource utilization in a DU time domain resource configuration supported by a current protocol.
Figure 7:
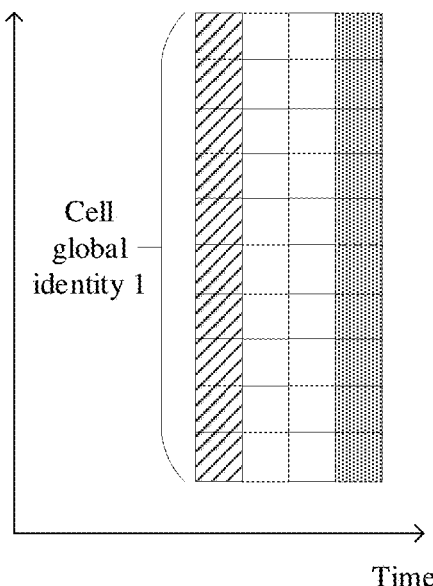

FIG. 7 is a schematic diagram of an example of resource utilization in a DU time domain resource configuration supported by a current protocol Re-16. As shown in FIG. 7, a horizontal coordinate and a vertical coordinate respectively represent time and frequency, that is, a time domain resource and a frequency domain resource. For an entire cell, that is, a cell global identity (cell global ID, CGI) 1, H, S, S, and NA time domain resources are separately configured.

It should be noted that a hard (H) time domain resource is a resource that is definitely available to a DU, and an MT generally does not use the time domain resource for communication; a not available (NA) time domain resource is a resource that is unavailable to the DU, and the MT may use the time domain resource for communication; and availability of a soft (S) time domain resource to the DU mainly depends on a further indication of an upper-level node.

For example, the horizontal coordinate may be considered as a configuration of four different time domain resources of the cell. To be specific, the first time domain resource of the DU cell is definitely available, availability of the second and third time domain resources depends on the indication of the upper-level node, and the fourth slot resource is unavailable. It should be understood that, for the MT, there is only an uplink/downlink transmission direction configuration, and no H/S/NA resource is configured. Because the upper-level node knows a resource configuration of a lower-level node, to avoid a collision between the MT and the DU, the upper-level node does not schedule the MT on the first time domain resource. The DU of the upper-level node sends downlink control information (downlink control information, DCI) signaling to the lower-level node to further indicate whether the second and third time domain resources are available to the DU. For the fourth time domain resource, the MT may choose to perform scheduling or not to perform scheduling based on a transmission requirement.

Figure 8:
FIG. 8 is a schematic diagram of another example of resource utilization in a DU time domain resource configuration supported by a current protocol.
Figure 8:
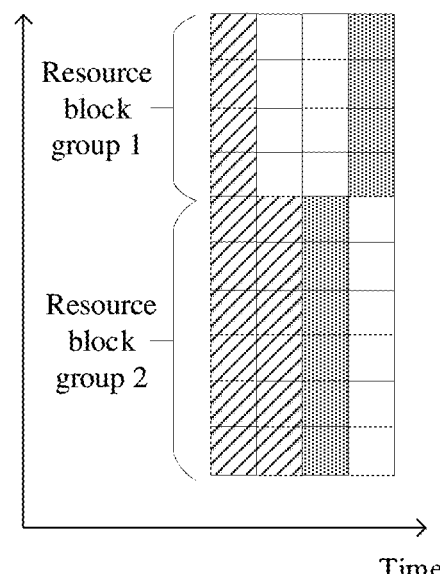

FIG. 8 is a schematic diagram of another example of resource utilization in a DU time domain resource configuration supported by a current protocol Rel-17. As shown in FIG. 8, a horizontal coordinate and a vertical coordinate respectively represent time and frequency, that is, a time domain resource and a frequency domain resource. In this solution, a bandwidth of an original entire cell is first divided in frequency domain into a plurality of parts, and bandwidth values of the parts may be different. To be specific, frequency domain resources are segmented and refined into frequency domain resource block group RBG granularities (for example, a resource block group 1 and a resource block group 2), and then a time domain H/S/NA is configured in each smaller frequency domain granularity.

For example, the horizontal coordinate may be considered as a configuration of four different slot resources in the cell. For the resource block group 1, the first time domain resource is definitely available, availability of the second and third time domain resources depends on an indication of an upper-level node, and the fourth time domain resource is unavailable. For the resource block group 2, the first and second time domain resources are definitely available, availability of the third time domain resource depends on the indication of the upper-level node, and the fourth time domain resource is unavailable.

It should be noted that, in this solution, only an S time domain resource needs to be indicated, and an S frequency domain resource is converted into or equivalent to an S time domain resource on an RBG. The S frequency domain resource may not need to be further defined or indicated. In other words, current physical layer DCI signaling for the S time domain resource may be reused to indicate whether the S frequency domain resource is available to the DU.

It should be understood that the time domain resource configuration solution shown in FIG. 7 is intended for a cell of the DU, and this implementation is intended for a frequency domain resource segment in a cell of the DU, that is, a resource type of the original DU cell is further refined into an RBG granularity. In addition, this implementation is not dynamic frequency division in a real sense. There is no "dynamic" frequency domain resource. Availability of some frequency domain resources does not depend on a physical layer signaling indication. Instead, dynamic frequency division is implemented based on an original dynamic time division framework and semi-static frequency domain resource division. The physical layer signaling indicates only availability of a time domain resource. In other words, the semi-static frequency domain resource division means that frequency domain resources of the entire cell are fixed, and whether some frequency domain resources in a slot are available to the lower-level node cannot be indicated in a real sense, but whether a frequency domain resource block group in a slot is available to the lower-level node is indicated.

Figure 9:
FIG. 9 is a schematic diagram of still another example of resource utilization in a DU time domain resource configuration supported by a current protocol.
Figure 9:
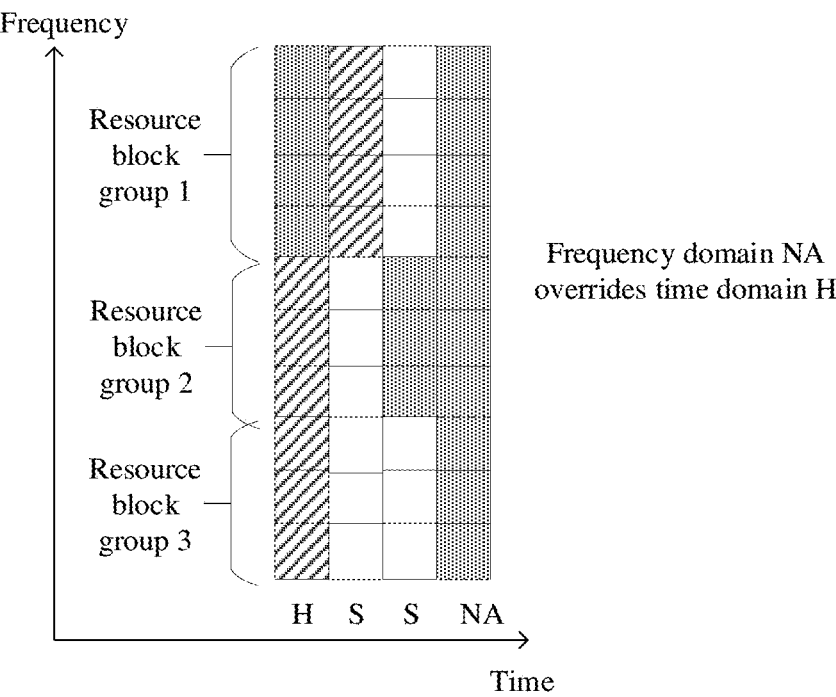

FIG. 9 is a schematic diagram of still another example of resource utilization in a DU time domain resource configuration supported by a current protocol Rel-17. As shown in FIG. 9, a horizontal coordinate and a vertical coordinate respectively represent time and frequency, that is, a time domain resource and a frequency domain resource. First, an H/S/NA time domain resource is configured, corresponding to the solution shown in FIG. 7. Based on this, a frequency domain H/S/NA is configured. For example, frequency domain resources are segmented and refined into resource block group RBG granularities (for example, a resource block group 1, a resource block group 2, and a resource block group 3), and then a frequency domain H/S/NA is configured in each smaller frequency domain granularity. Therefore, an H/S/NA frequency domain resource may override an H/S/NA time domain resource.

For example, the horizontal coordinate may be considered as a configuration of four different slot resources in a cell. After H/S/NA time domain resources and H/S/NA frequency domain resources are configured, for the resource block group 1, the first H time domain resource is overridden by an NA frequency domain resource, and "the time domain resource is definitely available" is changed to "the frequency domain resource is unavailable"; the second S time domain resource is overridden by the H frequency domain resource, and "availability of the time domain resource depends on an indication of an upper-level node" is changed to "the frequency domain resource is definitely available"; and for the resource block group 2, the third S time domain resource is overridden by the NA frequency domain resource, and "availability of the time domain resource depends on an indication of an upper-level node" is changed to "the frequency domain resource is unavailable".

It should be noted that, in the frequency domain resource configuration solution shown in FIG. 8, there is no S frequency domain resource, and availability of some frequency domain resources does not depend on a physical layer signaling indication. However, in the implementation shown in FIG. 9, an H/S/NA frequency domain resource of the DU needs to be defined and indicated. Therefore, the frequency domain resource configuration may override the time domain configuration.

It should be understood that, in the solutions in FIG. 8 and FIG. 9, a resource type of the original DU cell is further refined into an RBG granularity. For a frequency domain resource segment in the DU cell, frequency division multiplexing is implicitly configured by default, and H/S/NA needs to be configured for a plurality of times in each slot. Although time division may be implemented by configuring a plurality of resource block groups RBGs in a same slot or on a same symbol as NA/H, if space division multiplexing or frequency division multiplexing does not need to be performed for most of the time in a system, the H/S/NA configuration performed for each RBG in the foregoing configuration solution is redundant and complex. For the S resource not requiring frequency division, a further signaling indication is required. Therefore, DCI signaling overheads are high. In addition, in an actual application, the frequency division configuration and indication do not need to be excessively flexible. Whether a frequency division resource is supported depends on aspects such as hardware implementation of a device, and unnecessary overheads are added if the frequency division configuration and dynamic indication of availability of the S resource are excessively flexible.

In summary, if the system does not perform time division multiplexing or frequency division multiplexing on the resources for most of the time, how to reduce signaling overheads, especially configuration overheads and overheads for dynamically indicating the S resource, is an urgent problem to be resolved. In addition, different from division of time domain resources fixedly based on a slot, division of frequency domain resources is relatively flexible. How to avoid a problem of complex and redundant configurations and excessively high overheads caused by excessively flexible configurations of frequency domain resources is also an urgent problem to be resolved.

It should be understood that potential problems in the following aspects may be caused if a frequency division multiplexing resource configuration is excessively flexible:

First, a variable bandwidth may make it difficult for UE to measure a periodic reference signal, for example, a tracking reference signal (tracking reference signal, TRS). The TRS can be used for time and frequency offset tracking and can be transmitted periodically or aperiodically. When the TRS is transmitted aperiodically, quasi-co-location (quasi co-location, QCL) information of the TRS may be recognized.

It should be noted that, the TRS is generally transmitted by using a large bandwidth, and the UE measures the TRS and uses the TRS as a QCL Type-A reference source for data demodulation. A QCL-TypeA configuration is {Doppler offset, Doppler spread, average delay, delay spread}. In addition, frequency division of the MT and the DU causes a change in the bandwidth of the DU cell and also a change in a periodic TRS bandwidth, and the UE is affected because a TRS resource of the UE is semi-statically configured and generally requires a large bandwidth. Similarly, impact on a signal such as a single side band SSB also needs to be considered, because the SSB is used as a cell-level signal, and it needs to be ensured that the DU cell can send the SSB on a corresponding bandwidth resource.

Second, the variable bandwidth has impact on reception of signals by the DU, such as an uplink sounding reference signal (sounding reference signal, SRS) and a physical uplink control channel (physical uplink control channel, PUCCH) sent by the UE.

It should be noted that frequency hopping is usually required for sending a PUCCH and an SRS by the UE, to increase transmit power of the UE, and uplink coverage performance of the UE is improved by using channel diversity. In addition, frequency hopping and frequency domain resources for sending the SRS and the PUCCH are both semi-statically configured, that is, configured by the CU for the UE by using RRC signaling. Moreover, frequency division may make the DU unable to receive signals on resources on which the UE sends the SRS and the PUCCH. If the PUCCH and the SRS are configured for the UE from the beginning based on frequency domain resources of the DU after frequency division (narrowband), uplink coverage performance of the UE is significantly affected.

In summary, a constraint needs to be imposed on allocation of frequency division multiplexing resources. When frequency division is not flexible, the network (the IAB and the donor base station) may process an available bandwidth of the DU cell in at least two manners: frequency division and no frequency division, and semi-statically configure corresponding signal and channel resources such as a CORESET, a PUCCH, a TRS, and an SRS in several bandwidths for the UE, for example, two or three relatively small bandwidths, to avoid impact on normal communication and degradation of system performance caused by excessively high signaling overheads and non support of the UE for storing excessive resource configurations.

Based on this, this application provides an IAB resource frequency division and indication method. Specific allocation of frequency domain resources in some non-TDM slots is configured based on a predefined frequency division resource pattern, and availability of some or all resources in each non-TDM slot is indicated based on newly designed dynamic signaling. In this solution, a predefined and configured frequency division resource can be configured and indicated on some or all time domain resources. Because the frequency domain pattern is configured, a differentiated configuration and indication of a frequency domain resource RBG available to a DU are avoided for each FDM slot, and resource configuration complexity and signaling overheads are reduced.

The following describes in detail a wireless communication method in the embodiments of this application with reference to the accompanying drawings.

Figure 10:
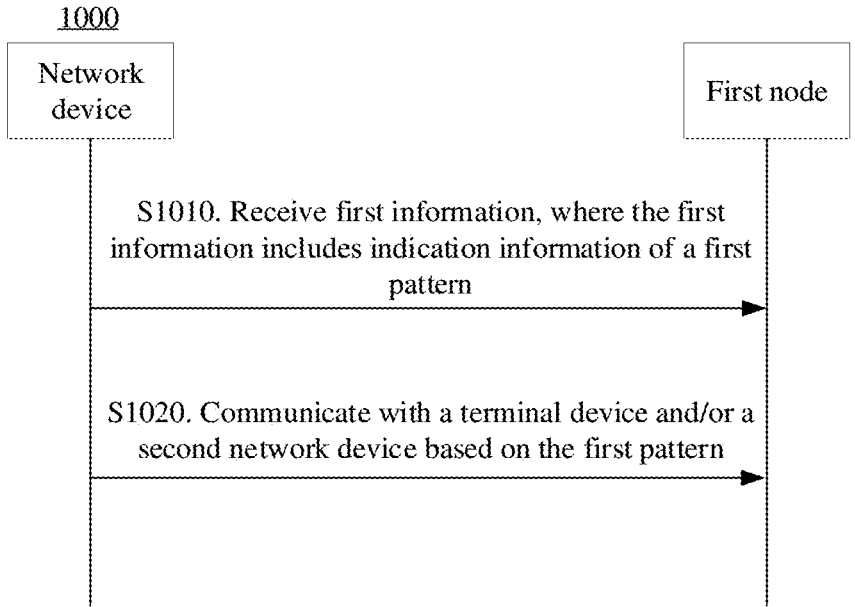
FIG. 10 is a schematic diagram of an example of a wireless communication method according to this application.

FIG. 10 is a schematic diagram of an example of an IAB resource frequency division and indication method according to an embodiment of this application. A specific implementation procedure 1000 includes the following steps.

S1010. A network device (for example, a donor base station) sends first information to a first node (for example, a first IAB node) and/or a terminal device (for example, UE). Correspondingly, the first node receives the first information from the network device.

The first information includes indication information of a first pattern, the first pattern is one of a plurality of patterns, each of the plurality of patterns indicates distribution of at least one resource in frequency domain, and the at least one resource includes at least one of the following resources: a first resource, a second resource, and a third resource, where the first resource is a definitely available resource, the second resource is an unavailable resource, availability of the third resource is determined by first indication information, the first indication information is sent by a first network device, and resource distribution indicated by any two patterns is different.

In a possible implementation, for availability of the third resource, when the first network device does not send the first indication information, the third resource is unavailable to a DU cell by default.

For example, availability of the first resource, the second resource, and the third resource may be configured for a cell of a distributed unit DU of the first node, or configured for a bandwidth part BWP of a distributed unit of the first node, or configured for some frequency domain resources of a distributed unit DU of the first node, for example, a frequency domain resource block group RBG. The first network device is an upper-level node of the first node, and a second network device is a lower-level node of the first node.

It should be understood that the plurality of patterns may be configured by the network device, or the plurality of patterns may be predefined in a protocol. This is not limited in this application.

For example, the plurality of patterns are configured by a donor (donor) network device, that is, configuration information of one or more patterns sent by the donor network device is received. The configuration information of the one or more patterns may be configured by the donor network device at one or more times. This is not specifically limited in this application.

In a possible implementation, before the donor network device configures the plurality of patterns, the donor network device receives frequency division multiplexing configuration information sent by the first node, where the frequency division multiplexing configuration information includes a restrictive condition configured for the plurality of patterns.

For example, patterns of frequency domain resources defined in a protocol may indicate attributes H/S/NA of a plurality of frequency domain resource segments, and/or patterns of frequency domain resources of a plurality of lengths are defined in a protocol.

As an example instead of a limitation, the network device determines a plurality of frequency domain patterns. The first resource may be an H (hard) frequency domain resource, indicating a frequency domain resource definitely available to the DU cell. The second resource may be an NA (not available) frequency domain resource, indicating a resource unavailable to the DU cell, and indicating that the resource is available to a mobile terminal (mobile-termination, MT). The third resource may be an S (soft) frequency domain resource, indicating that availability of the resource to the DU cell needs to be determined based on indication information sent by the upper-level node. In other words, a frequency domain resource attribute (attribute) of the at least one resource indicated by each pattern includes at least one of the following: H, S, and NA.

In this embodiment of this application, after being further indicated, availability of the S resource may be determined as "available" or "unavailable", or may be determined as "available" or "no indication of availability". The indication of availability may be configured for one or more of three TDD transmission direction configurations: uplink, downlink, and flexible. For example, signaling indicates that an S uplink resource is indicated available, and indicate no indication of availability for an S downlink resource and an S flexible resource.

For example, when the at least one resource is the first resource, the first node can communicate with the terminal device and/or the lower-level relay node; when the at least one resource is the second resource, the first node cannot communicate with the terminal device, but the first node can communicate with the first network device; or when the at least one resource is the third resource, the first node needs to determine, based on the indication of the first network device, whether the third resource can be used to communicate with the terminal device and/or the lower-level relay node.

In a possible implementation, a configuration of each pattern includes a frequency domain resource bandwidth of the at least one resource, each pattern has corresponding pattern identification information, and identification information of any two patterns is different.

In a possible implementation, the configuration of each pattern further includes a frequency domain resource attribute of the at least one resource, and each frequency domain resource attribute is one of the first resource, the second resource, and the third resource.

It should be understood that a pattern of a frequency domain resource defined in a protocol may indicate attributes H/S/NA of a plurality of frequency domain resource segments, and/or that a protocol defines a pattern of frequency domain resources of a plurality of lengths.

For example, when a frequency domain resource of the cell of the distributed unit DU of the first node is divided into three segments, that is, three frequency domain resource sets, and each set includes continuous frequency domain resources, a pattern for dividing the corresponding frequency domain resource into three segments may be selected for mapping.

It should be noted that a granularity and a manner of frequency domain resource division may be an RBG, a quantity of RBs, a bandwidth part BWP, or the like. This is not specifically limited in this application.

Optionally, when a protocol defines a pattern of a frequency domain resource of one length only, for example, a pattern for dividing the frequency domain into five segments, only resources with first three resource attributes in each pattern need to be mapped, that is, the first three resource attributes of each pattern correspond to availability of each resource segment.

In a possible implementation, a configuration of the frequency domain resource bandwidth includes a start resource block number of the at least one resource and a quantity of resource blocks of the at least one resource.

For example, the frequency domain resource bandwidth may be configured by the network device, or the frequency domain resource bandwidth may be predefined in a protocol. For example, the DU may calculate an actually indicated frequency domain bandwidth based on a bandwidth actually used by the cell. This is not limited in this application.

For example, when a frequency domain resource of the cell of the distributed unit DU of the first node is divided into three segments, that is, three frequency domain resource sets, and each set includes continuous frequency domain resources, a pattern for dividing the corresponding frequency domain resource into three segments may be selected for mapping.

In a possible implementation, each pattern has corresponding pattern identification information, and a frequency domain size of each resource segment in a corresponding frequency domain resource pattern and a frequency domain attribute corresponding to each resource segment may be determined by using an identifier of the pattern.

For example, when a protocol defines a pattern of a frequency domain resource of one length only, for example, a pattern for dividing the frequency domain into five segments, only resources with first three resource attributes in each pattern need to be mapped, that is, the first three resource attributes of each pattern correspond to availability of each resource segment.

For another example, each pattern has corresponding pattern identification information, and a frequency domain size of each resource segment in a corresponding frequency domain resource pattern and a frequency domain attribute corresponding to each resource segment may be determined by using an identifier of the pattern.

For another example, based on a start and length indicator value SLIV of a frequency domain resource, and a start and duration of a frequency domain bandwidth resource predefined in a protocol, a start frequency domain resource index and an end frequency domain resource index of the scheduled frequency domain resource are mapped. In other words, the network device may determine a start resource block number and a quantity of resource blocks of the corresponding frequency domain resource by using the index values, to configure a frequency domain length of the frequency domain H//S/NA.

In a possible implementation, the first information includes identification information of at least one pattern set, the identification information of the at least one pattern set is used to determine at least one target pattern set, the at least one target pattern set includes the first pattern, a configuration of each pattern set includes at least one of the plurality of patterns, each pattern set has corresponding pattern set identification information, and identification information of any two pattern sets is different.

The first information indicates the first pattern in the plurality of patterns. It should be understood that the first information may indicate only one or more patterns, or may indicate one or more pattern sets. This is not limited in this application.

In a possible implementation, the network device sends third information to the first node and/or the terminal device. Correspondingly, the first node and/or the terminal device receive/receives the third information from the network device. The third information is used to configure at least one first slot; and at least one first pattern is mapped to the at least one first slot.

For example, the first slot is a slot in a first time domain periodicity, or the first slot is a slot corresponding to a time domain resource being a fourth resource in a first time domain periodicity, where the first time domain periodicity corresponds to a configuration periodicity of the first time domain resource, availability of the fourth resource is determined by second indication information, and the second indication information is sent by the first network device.

Optionally, the first slots may further include all slots in the first time domain periodicity.

It should be understood that the first slot herein may be a non-TDM slot, or may be directly referred to as an FDM slot. A specific name of the first slot is not limited in this application. The first slot supports only one function, that is, a frequency division resource configuration is allowed to be configured for some slots. In addition, a quantity of first slots supporting the function is not limited in this application either.

It should be noted that the first slot is only an implementation of a time granularity. Alternatively, a first symbol or the like may be determined in a first time segment. A specific time granularity is not limited in this application.

For example, the first periodicity may correspond to a configuration periodicity of an H/S/NA time domain resource in the first time segment, or a periodicity may be separately configured in units of slots or absolute time, or one system frame may be used as a periodicity. A manner of determining the first periodicity is not limited in this application.

In a possible implementation, the first time segment and/or a total quantity of slots in the first periodicity are/is determined based on a subcarrier spacing; and a quantity of slots corresponding to the first slot is determined based on a number of the first slot and/or a number set of the first slot.

For example, the DU calculates the quantity of slots in the first periodicity based on the configuration periodicity of the H/S/NA time domain resource and the configured subcarrier spacing, and determines, based on the number of the first slot, which slots are non-TDM slots.

For another example, a total quantity of slots in a periodicity is determined with reference to a subcarrier spacing of an initial bandwidth part BWP of the cell of the DU, because in a given subcarrier spacing, a total quantity of slots in a system frame is fixed.

Optionally, the reference subcarrier spacing may be separately configured, or may refer to a configured subcarrier spacing that already exists in other signaling or another application scenario in another current protocol. This is not limited in this application.

As an example instead of a limitation, at least one of the plurality of patterns is mapped to the first slot. In other words, a frequency domain pattern is configured for the first slot based on the plurality of determined frequency domain patterns.

Optionally, the frequency domain pattern may be further indicated by using a number of the frequency domain pattern, or identification information of the frequency domain pattern.

When the H/S/NA frequency domain resource is mapped, a quantity of frequency domain patterns and a quantity of first slots are not limited. For example, a quantity of the at least one pattern is the same as the quantity of first slots; or a quantity of the at least one pattern is a positive integer multiple of the quantity of first slots. In this case, a periodicity of the frequency domain pattern is a positive integer multiple of a mapping periodicity. Alternatively, a quantity of the at least one pattern is less than the quantity of first slots. In this case, by default, no frequency division is performed on a first slot not configured with a frequency domain pattern. For example, the first slot falls back to a TDM slot by default.

Optionally, when the H/S/NA frequency domain resource is mapped, different frequency domain resource patterns may be mapped to the first slot. For example, the H frequency domain resource is mapped to the first slot, or the NA frequency domain resource is mapped to the first slot based on this resource configuration. In this case, the NA frequency domain resource overrides the H frequency domain resource, that is, availability of the frequency domain resource of the DU of the first node in the first slot is changed from a definitely available resource to an unavailable resource. To be specific, in a mapping of frequency domain resources to time domain resources, the H, S, and NA resources may be randomly combined and then mapped to the first slot, specifically depending on a requirement for communication between the network device and the first node and/or the terminal device. This is not limited in this application.

Optionally, in the mapping of the H/S/NA frequency domain resources, any one of the H/S/NA frequency domain resources may be mapped to the first slot; or S+NA, that is, the S resource is first mapped to the first slot, and then the NA frequency domain resource is mapped to the S resource; or S+H, H+NA, S+H+NA, or the like. A resource mapping manner is not limited in this application.

Optionally, in the mapping of the H/S/NA frequency domain resources, a same frequency domain resource, for example, the H frequency domain resource, may be mapped to different time domain resources, for example, S and NA time domain resources. This is not limited in this application.

In a possible implementation, the network device sends fourth information to the first node and/or the terminal device. Correspondingly, the first node and/or the terminal device receive/receives the fourth information from the network device. The fourth information indicates resource availability of the third resource. Optionally, the fourth information further indicates resource availability of the fourth resource, that is, a resource whose time domain resource attribute is S.

In other words, the fourth information may indicate resource availability of the S time domain resource and the S frequency domain resource, and/or the fourth information may indicate resource availability of the S frequency domain resource in the first slot.

In a possible implementation, the network device sends fifth information to the first node and/or the terminal device, where the fifth information indicates grouping information of a frequency domain resource corresponding to the first slot; and sends sixth information, where the sixth information indicates a resource attribute of at least one frequency domain resource group.

For example, the frequency domain resources of the DU cell are grouped by using higher layer signaling (for example, RRC or F1-AP signaling).

It should be noted that a granularity and a manner of frequency domain resource division may be an RBG, a quantity of RBs, a bandwidth part BWP, or the like. This is not specifically limited in this application.

For example, resource availability of the at least one frequency domain resource group is explicitly and implicitly indicated by sending physical layer DCI signaling. For example, the DCI signaling indicates resource availability of the at least one resource group of the IAB DU by using a bit 0/1, where 0 indicates that a resource in the frequency domain resource group is unavailable, or indicates no indication of availability of a resource in the frequency domain resource group, and 1 indicates that a frequency domain resource in the resource group is available. Alternatively, resource availability of the at least one resource group is implicitly indicated by using a bit or no bit. For example, when a bit value corresponding to a frequency domain resource group is 1, it indicates that a resource in the frequency domain resource group is available. Otherwise, if there is no bit value, it indicates that a resource in a corresponding frequency domain resource group is unavailable. This is not limited in this application.

In a possible implementation, a first relationship and/or a second relationship are/is obtained, where the first relationship indicates a correspondence between a first parameter and indication information of availability of the first resource, the first relationship indicates resource availability of the first slot, that is, availability of an uplink resource, a downlink resource, and a flexible resource of a soft slot, the second relationship indicates a correspondence between a second parameter and indication information of availability of the second resource, and the second relationship indicates resource availability of the frequency domain resource of the first slot, that is, H/S/NA resource availability of an uplink resource, a downlink resource, and a flexible resource of the soft slot; and the first pattern is determined based on the first relationship and/or the second relationship.

It should be understood that the first relationship and the second relationship may indicate availability of all time domain resources and availability of all frequency domain resources, and/or may indicate resource availability of the first slot, that is, a slot that requires frequency division multiplexing, and/or may indicate availability of the frequency domain resource of the first slot. This is not limited in this application.

In a possible implementation, the network device sends seventh information to the first node and/or the terminal device, where the seventh information includes identification information of at least one indication set, the identification information of the at least one indication set is used to determine at least one target indication set, the at least one target indication set includes the first parameter and/or the second parameter, and identification information of any two indication sets is different; and resource attributes of one or more frequency domain resources of the at least one first slot are determined based on the at least one target indication set.

Further, resource availability of the third resource and/or the fourth resource is determined based on the at least one target indication set.

S1020. The network device communicates with the first node and/or the terminal device based on the first pattern.

The first node is a relay node. It should be understood that this embodiment of this application is applicable to a wireless communication system having a relay node. The relay node may be an IAB node, or may be a terminal device, that is, a terminal device having a wireless relay function. In particular, in NR, the relay node is generally an IAB node.

For example, the network device communicates with the first node and/or the terminal device on the first time domain resource based on the first pattern.

It should be understood that the first time domain resource herein may be understood as a time resource set. The first time domain resource may include one or more slots. The plurality of slots may be continuous slots or discontinuous slots. The first pattern is mapped to the one or more slots, and is used for communication between the first node and the second network device and/or the terminal device.

Optionally, different frequency domain resource patterns may be mapped to the one or more slots of the first time domain resource.

Optionally, the first time domain resource may alternatively include one or more symbols, and a time granularity is not limited in this application.

For example, the network device sends second information to the first node and/or the terminal device. Correspondingly, the first node and/or the terminal device receive/receives the second information from the network device. The second information indicates the first time domain resource.

It should be noted that the indication information, the configuration information, or the like in this application may be carried, without limitation, in one of radio resource control signaling, media access control MAC layer signaling, and physical layer PHY signaling, or a combination of at least two thereof. The radio resource control signaling includes radio resource control RRC signaling. The MAC layer signaling includes a MAC control element CE. The physical layer signaling includes downlink control information DCI or the like.

According to the solutions in the embodiments of this application, a wireless communication method and apparatus are provided. A frequency division resource pattern is predefined and configured, and then mapped to a time domain resource that requires frequency division multiplexing; and further, availability of some or all resources in each frequency division slot is indicated by using signaling, so that resources of a relay node can be configured. A constraint is imposed on allocation of frequency division multiplexing resources, to make a frequency division configuration not excessively flexible, so that a network (for example, a donor base station and an IAB node) can process an available bandwidth of a DU cell in at least two manners: frequency division and no frequency division, and semi-statically configure corresponding signal and channel resources or the like in several bandwidths for UE. This further reduces signaling overheads and improves system performance.

Figure 11:
FIG. 11 is a schematic diagram of another example of a wireless communication method according to this application.
Figure 11:
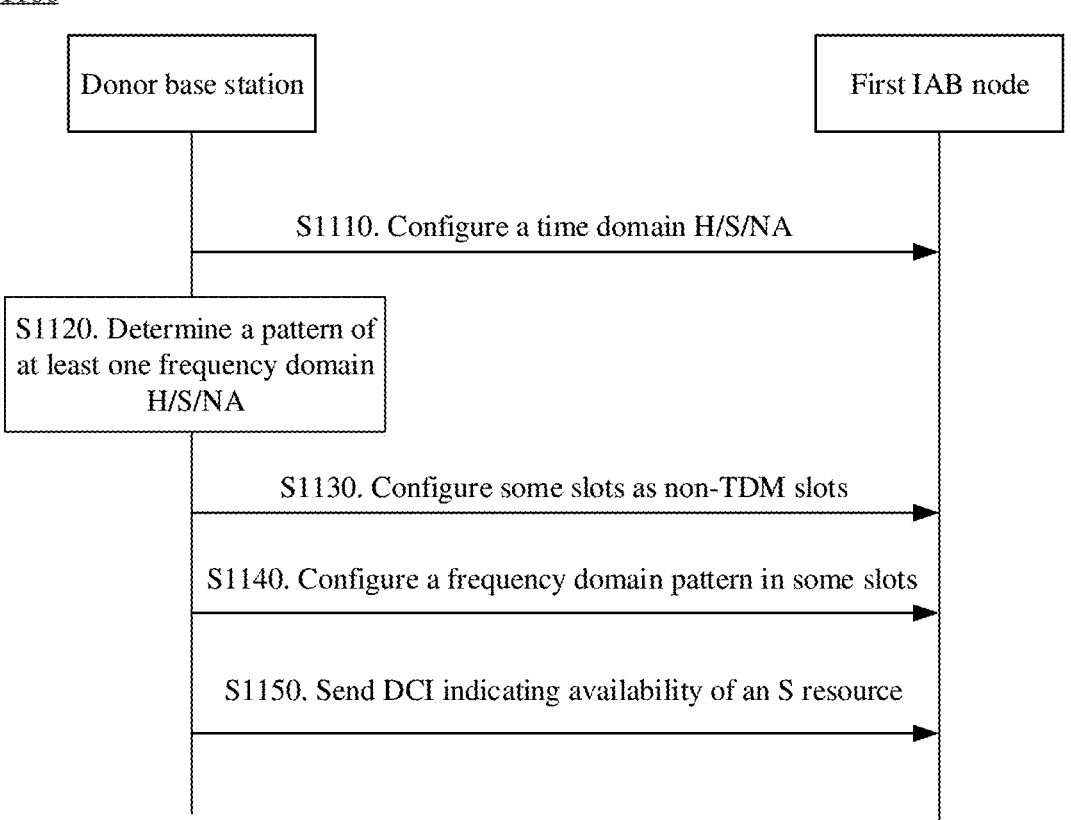

FIG. 11 is a schematic diagram of another example of an IAB resource frequency division and indication method according to this application. A frequency domain H/S/NA is mainly configured in some slots, and the frequency domain H/S/NA is configured based on several patterns (pattern). As shown in FIG. 11, an implementation procedure 1100 includes the following steps.

S1110. A donor base station (that is, an example of a network device) determines an H/S/NA time domain resource configuration, and sends the H/S/NA time domain resource configuration to each cell of a DU of a first IAB node (that is, an example of a first node). Correspondingly, the first IAB node receives the H/S/NA time domain resource configuration from the donor base station.

For example, a CU of the donor base station sends signaling, for example, higher layer RRC signaling, to the DU, to indicate a time domain resource configuration of a cell. For a specific signaling format, refer to a specification in the standard 3GPP protocol TS 38.473. Details are not described herein again. Therefore, an H time domain resource, an S time domain resource (that is, an example of a fourth resource), and an NA time domain resource are configured for each cell of the DU. The DU of the first node communicates with a lower-level node (for example, a terminal device) based on the resource configuration. For example, time domain resources of a cell 1 are sequentially configured as H, S, S, and NA. Correspondingly, it may be understood that the first time domain resource of the cell 1 of the DU is definitely available, and availability of the second time domain resource and the third time domain resource depends on a further indication of an upper-level node, and the fourth time domain resource is unavailable, that is, the DU of the first IAB node cannot communicate with the lower-level node and/or the terminal device on the fourth time domain resource.

S1120. The donor base station determines a pattern of at least one H/S/NA frequency domain resource.

In a possible implementation, the base station configures or a protocol predefines one or more frequency domain H/S/NA patterns. It should be understood that the term "one" herein is mainly used to allow adding one configuration or modifying one configuration by using signaling. Therefore, there is a case in which only one pattern is included.

In this embodiment of this application, the frequency domain resource includes an available (H) resource, a not available (NA) resource, and a to-be-scheduled (S) resource (that is, an example of a first resource, a second resource, and a third resource). Herein, the to-be-scheduled resource indicates that availability of the resource depends on a further indication of the upper-level node. It should be noted that when a difference is not emphasized, meanings to be expressed by the two are consistent.

Figure 12:
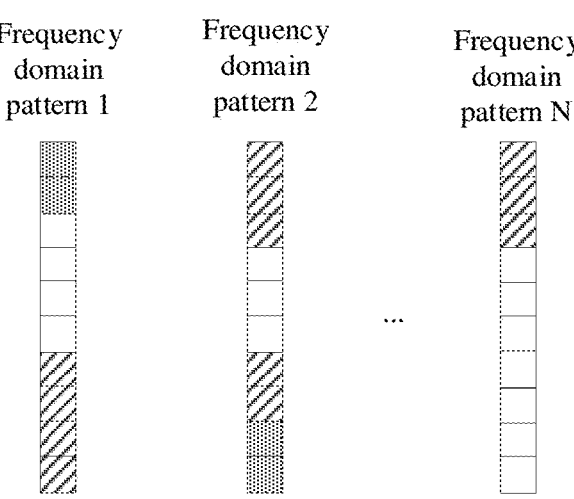
FIG. 12 is a schematic diagram of an example of a frequency domain H/S/NA pattern configuration according to this application.

FIG. 12 is a schematic diagram of an example of a frequency domain H/S/NA pattern configuration. As shown in FIG. 12, N frequency domain patterns are included. A frequency domain pattern 1 may be considered as dividing a frequency domain resource of a cell into three segments, which sequentially indicate: the frequency domain resource is unavailable NA, availability depends on a further indication S of the upper-level node, and the frequency domain resource is definitely available H. A frequency domain pattern 2 may be considered as dividing a frequency domain resource of a cell into four segments, which sequentially indicate: the frequency domain resource is definitely available H, availability depends on a further indication S of the upper-level node, the frequency domain resource is definitely available H, and availability depends on a further indication S of the upper-level node. A frequency domain pattern N may be considered as dividing a frequency domain resource of a cell into two segments, which sequentially indicate: the frequency domain resource is definitely available H, and availability depends on a further indication S.

As an example instead of a limitation, attributes of a plurality of frequency domain resource segments are defined as hard (H), soft (S), or not available (NA). A specific bandwidth indicated by each frequency domain resource segment depends on a further configuration of the DU by the CU of the donor base station. This configuration is intended for a specific cell of the DU, that is, a frequency domain resource of the cell is further divided.

For example, it is assumed that a pattern of a frequency domain resource defined in a protocol may indicate that attributes of five resource segments are H/S/NA. In this case, a plurality of pattern combinations may be defined in a protocol, and each pattern combination is identified by a number. Table 1 shows a plurality of pattern combinations. As shown in Table 1, a pattern of H, H, S, NA, and NA, represented by a number 0 indicates that a frequency domain resource of the cell is divided into five segments, which are sequentially as follows: the frequency domain resource is definitely available, the frequency domain resource is definitely available, availability depends on a further indication of the upper-level node, the frequency domain resource is unavailable, and the frequency domain resource is unavailable. Alternatively, a pattern may indicate that attributes of five resource segments are H/NA. In this case, a protocol may define a plurality of pattern combinations, for example, H, H, NA, NA, and H, or NA, H, H, H, and H, or H, H, H, H, and H. It should be understood that Table 1 is merely an example for description and should not constitute any limitation on the solutions of this application. Actually, there may be many pattern forms, which are not listed one by one herein.

Optionally, a protocol may define patterns of a plurality of lengths. For example, the frequency domain resource may be further divided into frequency domain resource segments of different lengths, such as six segments or seven segments.

TABLE 1

| Number | Pattern |
| --- | --- |
| 0 | H, H, S, NA, and NA |
| 1 | NA, S, H, S, and H |
| 2 | S, S, S, H, and NA |
| 3 | H, H, H, H, and H |
| 4 | NA, NA, NA, NA, and NA |
| . . . | . . . |

Figure 13:
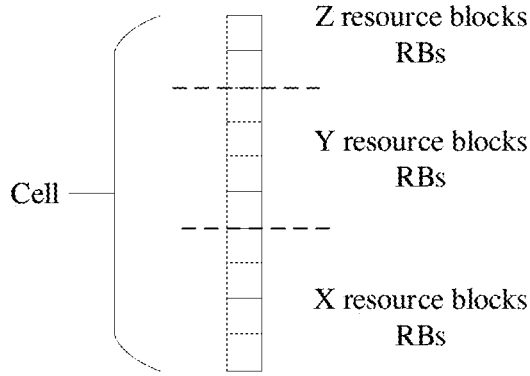
FIG. 13 is a schematic diagram of an example of an H/S/NA pattern configuration for frequency domain segmentation of a cell according to this application.

FIG. 13 is a schematic diagram of an example of an H/S/NA pattern configuration for frequency domain segmentation of a cell. As shown in FIG. 13, a cell of the DU is divided into three segments: X resource blocks RBs, Y resource blocks RBs, and Z resource blocks RBs. For example, a configuration of RBs may be: starting from a first RB counting from a lowest frequency of the cell, the RBs are sequentially arranged; and there may also be additional configuration information used to configure a physical resource block (physical resource block, PRB) number at a start position of the RBs.

In other words, a configuration of the three RBGs may be as follows: An RBG 1 is X continuous RBs counting from a start frequency of the DU cell, an RBG 2 is Y continuous RBs counting from a first RB after a last RB of the RBG 1, and an RBG 3 is Z continuous RBs counting from a first RB after a last RB of the RBG 2. A size of a frequency domain resource in each resource block group is not limited in this application.

In this case, for the case of frequency domain segmentation shown in FIG. 12, a pattern for dividing a corresponding frequency domain into three segments may be selected. If a protocol defines a pattern of a frequency domain of one length only, first several attributes of each pattern are selected. For example, Table 1 defines five frequency domain patterns. If a frequency domain resource of the DU cell is divided into three segments, first three resource attributes of each pattern correspond to availability of each resource segment.

For example, in an FDM slot, it is indicated that a pattern (NA, S, H, S, and H) numbered 1 in Table 1 is used and corresponds to the case of frequency domain segmentation shown in FIG. 12. In this case, first three attributes of the frequency domain pattern numbered 1 correspond to availability of first three resource segments of the cell. A finally obtained configuration is: first X RBs are NA resources (unavailable to the DU), next Y RBs are S resources (availability of the Y RBs to the DU depends on a further indication of the upper-level node), and last Z RBs are H resources (definitely available to the DU).

As an example instead of a limitation, attributes of a plurality of frequency domain resource segments are defined as hard (H), soft (S), or not available (NA). Specifically, a bandwidth indicated by each frequency domain resource segment is specified in a protocol as a reference value, and the IAB DU calculates an actually indicated bandwidth based on a bandwidth actually used by a cell.

For example, the reference value specified in the protocol is determined in a form of a frequency domain resource ratio. For example, it is specified that the pattern is H:S: NA=2:1:0 and corresponds to a DU cell having 100 MHz. In this case, a hard resource of 100 MHz×2/(2+1)=66.7 MHz and a soft resource of 100 MHz×1/(2+1)=33.3 MHz are determined in the slot. For another example, it is specified that the pattern is NA:H=1:1 and corresponds to a DU cell having 100 MHz. In this case, an NA resource of 100 MHz×1/2=50 MHz, and a soft resource of 100 MHz×1/2=50 MHz are determined in the slot. Alternatively, in a possible implementation, the 100 MHz bandwidth is replaced with a quantity of resource blocks RBs for calculation or the like.

In another possible implementation, the donor base station configures the pattern of the H/S/NA frequency domain resource.

It should be noted that the donor base station may implement a frequency domain resource pattern configuration in any form, and each pattern may be identified by using an ID. The pattern configuration includes a frequency domain size (that is, an RB length) of each resource segment and an attribute of each resource segment.

For example, the following shows a frequency domain pattern configuration of a non-TDM slot. It should be noted that, in a protocol, another manner including same content may also be used for implementation.

```
FDMPatternConfiguration: {
Pattern ID
RBG1 {
Start RB number;
Length: Number of RB;
attribute   enumerate (hard, soft, not available);
}
RBG2 {
Start RB number;
Length: Number of RB;
attribute   enumerate (hard, soft, not available)
}
...
RBG N {
Start RB number;
Length: Number of RB;
attribute   enumerate (hard, soft, not available)
}
}
```

The following Table 2 shows pattern configuration information of each frequency domain resource segment. As shown in Table 2, a frequency domain pattern whose pattern ID is RBG 1 is divided into four segments, a number of a start RB is 0, quantities of RBs are 1, 2, 3, and 4 respectively, and corresponding frequency domain attributes are H, H, S, and NA respectively. A frequency domain pattern whose pattern TD is RBG 2 is divided into three segments, a number of a start RB is 1, quantities of RBs are 1, 2, and 3 respectively, and corresponding frequency domain attributes are NA, H, and S, and so on. It should be understood that Table 2 is merely an example for description, and should not constitute any limitation on this application.

TABLE 2

| Pattern ID | Number of a start RB | Length (quantity of RBs) | Attribute of a frequency domain resource |
|---|---|---|---|
| RBG 1 | 0 | 1 | H |
| | | 2 | H |
| | | 3 | S |
| | | 4 | NA |
| RBG 2 | 1 | 1 | NA |
| | | 2 | H |
| | | 3 | S |
| . . . | . . . | . . . | . . . |
| RBGN | N | 1 | NA |
| | | 2 | H |

In still another possible implementation, the base station configures a frequency domain pattern based on a start and length indicator value (start and length indicator value, SLIV) of a frequency domain resource.

For example, indexes of a start slot/symbol and an end slot/symbol of a scheduled time domain resource are mapped to the SLIV by using a table predefined in a protocol. Similarly, in this implementation, the frequency domain pattern is configured by defining a start and duration of a frequency domain bandwidth resource. It should be noted that when a resource type, for example, hard (H), has two SLIV values, there are two segments.

Table 3 shows pattern configuration information of a frequency domain resource. As shown in Table 3, a combination of some indexes and bandwidths indicated by the indexes is listed. For example, an index 1 indicates that a length of a resource whose frequency domain pattern is hard (H, the frequency domain resource is definitely available) is 2, that is, two resource blocks are included, and a start resource block number of the resource is 0; an index 13 indicates that a length of a resource whose frequency domain pattern is soft (5, availability of the frequency domain resource depends on a further indication of the upper-level node) is 6, that is, six resource blocks are included, and a start resource block number of the resource is 1; and an index 18 indicates that a length of a resource whose frequency domain pattern is not available (NA, the frequency domain resource is unavailable) is 1, that is, there is only one resource block, and a start resource block number of the resource is 2. It should be understood that values in Table 3 are merely examples. Actually, there may be a plurality of table definition forms, which are not listed one by one herein. Actually, a length, a start number, and a value and a value range of a corresponding index are not limited, and should not constitute any limitation on the solutions of this application.

TABLE 3

| Number of a start RB | Length (quantity of RBs) | Index |
|---|---|---|
| 0 | 1 | 0 |
|  | 2 | 1 |
|  | 3 | 2 |
|  | 4 | 3 |
|  | 5 | 4 |
|  | 6 | 5 |
|  | 7 | 6 |
|  | 8 | 7 |
| 1 | 1 | 8 |
|  | 2 | 9 |
|  | 3 | 10 |
|  | 4 | 11 |
|  | 5 | 12 |
|  | 6 | 13 |
|  | 7 | 14 |
|  | 8 | 15 |
| 2 | 1 | 16 |
|  | 2 | 17 |
|  | 3 | 18 |
| . . . |  |  |

As an example instead of a limitation, when the resource start, the length, and the index shown in Table 3 are defined or configured, the base station can configure the resource start and the length of the H/S/NA frequency domain resource based on the index. For example:

Hard: SLIV index X1, SLIV index X2, . . .
Soft: SLIV index Y1, SLIV index Y2, . . .
NA: SLIV index Z1, . . .

In summary, in this configuration form, the base station can configure continuous or discontinuous H/S/NA frequency domain resources of any length.

Optionally, the donor base station determines a plurality of pattern sets, where a configuration of each pattern set includes at least one of the plurality of patterns, each pattern set has corresponding pattern set identification information, and identification information of any two pattern sets is different.

S1130. The donor base station sends first configuration information (that is, an example of third information) to each cell of the DU of the first IAB node, where the first configuration information indicates resource configuration of a non-TDM slot (that is, an example of a first slot). Correspondingly, the first IAB node receives the resource configuration information of the non-TDM slot from the donor base station.

The non-TDM slot (or referred to as an FDM slot) supports only one function, and the function may configure frequency division resource configurations for some slots. It should be understood that, so long as all slots supporting the function are within the protection scope, names of the slots are not specifically limited in this application.

In a possible implementation, in time domain, some slots are configured as non-TDM slots. For a TDM slot, the H/S/NA time domain resource configured in step S1110 is still applicable. For a non-TDM slot, availability of each frequency domain resource segment needs to be further determined based on the H/S/NA frequency domain resource pattern.

In another possible implementation, some slots in a time domain periodicity may be configured as non-TDM slots.

As an example instead of a limitation, the configuration of the H/S/NA frequency domain resource pattern may be bound to a configuration periodicity of the time domain H/S/NA, that is, some slots in the periodicity are non-TDM slots. Specifically, slot numbers of non-TDM slots are configured. The DU calculates a quantity of slots in a periodicity based on the configuration periodicity of H/S/NA and the configured subcarrier spacing, and determines, based on the numbers, which slots are non-TDM slots.

As an example instead of a limitation, a periodicity is separately configured in units of slots or absolute time (for example, seconds or milliseconds). For example, the periodicity may be referred to as a frequency division multiplexing transmission periodicity (FDM transmission periodicity) or a non time division multiplexing transmission periodicity (non-TDM transmission periodicity).

As an example instead of a limitation, one system frame (10 ms) is used as a periodicity, and the configuration directly indicates that some slots are non-TDM slots. In a given subcarrier spacing, a total quantity of slots in a system frame is fixed. Therefore, a total quantity of slots in a periodicity may be determined with reference to a subcarrier spacing of an initial bandwidth part (bandwidth part, BWP) of the cell of the DU. For example, in a 60 kHz subcarrier spacing, a determined total quantity of slots in a system frame is 40; and in a 120 kHz subcarrier spacing, a determined total quantity of slots in a system frame is 80. In this case, only a number set of non-TDM slots may be configured. For example, a set {5, 9, 25, 29} indicates that fifth, ninth, twenty-fifth, and twenty-ninth slots are non-TDM slots.

Optionally, the reference subcarrier spacing is separately configured, or refers to a configured subcarrier spacing that already exists in other signaling or another application scenario in another current protocol. This is not limited in this application.

In still another possible implementation, all S (availability depends on a further indication of the upper-level node) slots in time domain are potential non-TDM slots by default.

S1140. Map an H/S/NA frequency domain resource pattern (that is, a first pattern) to a non-TDM slot.

Optionally, the donor base station sends indication information (that is, an example of first information) to the DU of the first IAB node, where the indication information includes indication information of the first pattern, used to instruct to map the first pattern to the non-TDM slot. Correspondingly, the first IAB node receives the indication information from the donor base station.

For example, the donor base station sends F1-AP signaling (that is, an example of the first information) to the first IAB node. Correspondingly, the first IAB node receives the F1-AP signaling from the donor base station. The F1-AP signaling is used to instruct to map the first pattern in a plurality of patterns to one corresponding slot.

In a possible implementation, H/S/NA frequency domain resource patterns of a plurality of slots (non-TDM slots) may be configured at a time by using F1-AP signaling. For example, H/S/NA frequency domain resource patterns of all non-TDM slots in a configuration periodicity are configured by using one piece of signaling.

Optionally, the first IAB node receives DCI signaling, where the third information includes identification information of at least one pattern set, and the identification information of the at least one pattern set indicates at least one target pattern set.

In other words, based on the plurality of frequency domain patterns configured in step S1120, the donor base station maps a frequency domain pattern to each non-TDM slot (or collectively referred to as some slots) in a periodicity for each cell of the DU of the first IAB node. Further, a pattern number (for example, a pattern 1 and a pattern 2) may be used for indication.

In a possible implementation, the donor base station configures one frequency domain pattern for all non-TDM slots in one periodicity. The method for determining a specific periodicity has been described in step S1130. Details are not described herein again. For example, if there are four non-TDM slots in one configuration periodicity, the donor base station may configure numbers of four patterns. Frequency domain patterns corresponding to the four numbers sequentially correspond to the four non-TDM slots in the periodicity. The configuration is cyclically performed in a plurality of periodicities according to this rule.

Figure 14:
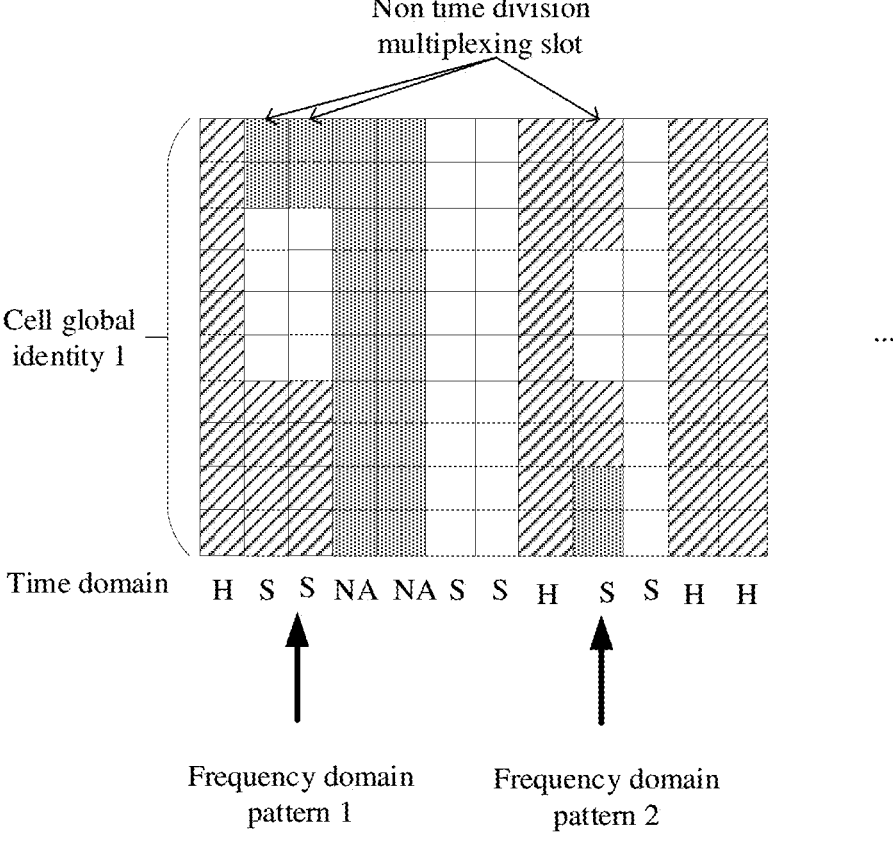
FIG. 14 is a schematic diagram of an example of mapping a frequency domain H/S/NA pattern to a periodic non-TDM slot according to this application.

FIG. 14 is a schematic diagram of an example of mapping a frequency domain H/S/NA pattern to some periodic slots. As shown in FIG. 14, a horizontal coordinate and a vertical coordinate respectively represent time and frequency, that is, a time domain resource and a frequency domain resource. For an entire cell, that is, a cell global identity (cell global ID, CGI) 1, H, S, S, and NA time domain resources are separately configured.

In a cell of the DU, three S resources are non-TDM slots by default in one configuration periodicity. A frequency domain pattern 1 is configured for the first and second non-TDM slots, and may be considered as dividing a frequency domain resource into three segments, and corresponding resource attributes are sequentially NA, S, and H. A frequency domain pattern 2 is configured for the third non-TDM slot, and may be considered as dividing a frequency domain resource into four segments, and corresponding resource attributes are sequentially H, S, H, and NA.

Optionally, the donor base station may configure three different pattern numbers, for example, a pattern 1, a pattern 2, and a pattern 3. In this case, a frequency domain pattern 1, a frequency domain pattern 2, and a frequency domain pattern 3 are configured for the three non-TDM slots sequentially. It should be noted that frequency domain patterns configured in a periodicity and mapped to non-TDM slots may be the same or may be different. This is not limited in this application.

It should be understood that a non-TDM slot configuration may be understood as further refining a frequency domain resource into an RBG granularity and is intended for each frequency domain resource segment; and a TDM slot configuration is intended for a cell of the DU.

In another possible implementation, the donor base station is allowed to configure more pattern IDs, and a quantity of patterns is an integer multiple of a quantity of non-TDM slots in a periodicity. For example, if there are four non-TDM slots in one configuration periodicity, the donor base station configures numbers of eight patterns, and a cycle periodicity of the frequency domain pattern is twice the configuration periodicity.

In still another possible implementation, a quantity of pattern IDs configured by the donor base station is less than a quantity of non-TDM slots in a periodicity. In this case, a non-TDM slot for which no pattern ID is configured falls back to a TDM slot by default, that is, no frequency division is performed on a resource. For example, if there are three non-TDM slots in one configuration periodicity, and the donor base station configures two pattern IDs, frequency domain patterns may be configured only for the first two non-TDM slots, and no frequency division multiplexing is performed on a resource in the third non-TDM slot by default.

S1150. The donor base station sends physical layer signaling DCI (that is, an example of fourth information) to the first IAB node, to indicate availability of a soft (S) resource of the DU. Correspondingly, the first IAB node receives the physical layer signaling DCI from the donor base station.

In particular, for an uplink resource, a downlink resource, and a flexible resource in the resource configuration of the DU of the first IAB node. Resource attributes are configured per resource type. A resource attribute of a symbol is determined by the following conditions: an attribute configuration of a slot to which the symbol belongs and a resource type of the symbol. For example, one slot may have the following TDD transmission direction configuration: {uplink (uplink, UL) symbol, downlink (downlink, DL) symbol, flexible (flexible) symbol}.

The donor node provides a plurality of resource attribute configurations for the IAB node. The plurality of resource attribute configurations are associated with a plurality of resource configurations respectively. For example, the donor node provides a first resource attribute configuration and a second resource attribute configuration for the IAB node, where the first resource attribute configuration and the second resource attribute configuration are respectively associated with a first resource type configuration and a second resource type configuration. If the donor node provides a plurality of DU resource configurations of the DU of the IAB node for the upper-level node of the IAB node, the upper-level node needs to learn an association relationship between the resource attribute configuration and the resource type configuration of the IAB node. The association relationship may be provided by the donor node for the upper-level node, or may be reported by the IAB node to the upper-level node.

Because one slot includes a plurality of OFDM symbols, and each OFDM symbol may be used for uplink or downlink, availability of a soft resource of the DU of the IAB node needs to be indicated by the upper-level node, and the upper-level node also indicates availability of the soft resource slot per slot and per resource type. Therefore, the donor node may define one or more of the following eight availability states for one slot of the DU of the IAB node. Each case may be indicated based on three bits, and indicates that symbols in all or some transmission directions in one slot are available, or give no indication of availability (no indication of availability). It should be noted that no indication of availability is different from unavailability. Herein, the resource is not defined as unavailable to the child node IAB DU. A protocol requirement is that transmission or no transmission off the IAB DU on the resource should not affect use of the resource by a co-site IAB MT.

Specifically, Table 4 (that is, an example of a first relationship) shows a mapping relationship between a value of a resource availability element and an availability type of a soft resource in a slot. As shown in Table 4, a value 0 indicates no indication of availability for all soft resources; and a value 3 indicates that uplink and downlink resources are indicated available and indicates no indication of availability for a flexible resource.

TABLE 4

| Value of a resource availability element | Indication of an availability type of an S symbol |
| --- | --- |
| 0 | No indication of availability for uplink, downlink, and flexible resources. |
| 1 | A downlink resource is indicated available. No indication of availability for uplink and flexible resources. |
| 2 | An uplink resource is indicated available. No indication of availability for downlink and flexible S symbols. |
| 3 | Uplink and downlink resources are indicated available. No indication of availability for a flexible S symbol. |
| 4 | A flexible resource is indicated available. No indication of availability for uplink and downlink resources. |
| 5 | Downlink and flexible resources are indicated available. No indication of availability for an uplink resource. |
| 6 | Uplink and flexible resources are indicated available. No indication of availability for a downlink resource. |
| 7 | Uplink, downlink, and flexible resources are indicated available. |

In this embodiment of this application, the DCI signaling shown in Table 4 may continue to indicate the S resource. In addition, a new definition may be further added to the value of the resource availability element, that is, the existing DCI signaling in Table 4 indicates availability of an S frequency domain resource in a non-TDM slot. It should be understood that an indication of an S symbol or slot in a protocol is effective on an entire bandwidth. In this embodiment of this application, for some slots or symbols in which frequency division exists, the availability indication is effective on only resources identified as S in frequency domain in the slots or symbols.

In summary, in the foregoing embodiment, an H/S/NA time domain resource is first configured, then an H/S/NA resource of a frequency domain pattern is configured or predefined, a frequency domain pattern is mapped to some periodic slots, and finally, availability of an S frequency domain resource is further indicated based on DCI signaling. A main difference lies in the pattern configuration and definition of the newly added H/S/NA frequency domain resource, and DCI signaling specified in a protocol or newly added that indicates availability of the S frequency domain resource. By using the method for predefining and indicating the frequency domain pattern, configuration redundancy and complexity are avoided, and signaling overheads are reduced.

Figures 15, 16:
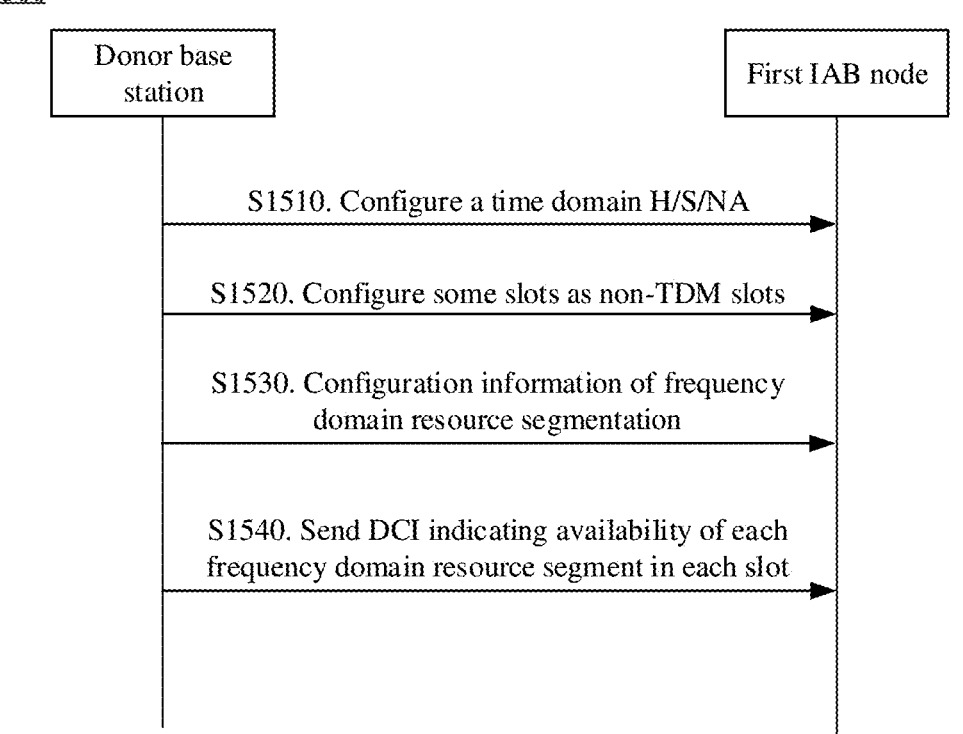
FIG. 15 is a schematic diagram of still another example of a resource configuration method according to this application.
FIG. 16 is a schematic diagram of an example in which some time domain resources are configured as non-TDM slots according to this application.

FIG. 15 is a schematic diagram of still another example of an IAB resource frequency division and indication method according to this application. The method mainly relates to using a pattern to dynamically indicate a specific quantity of frequency division resources for some slots on which frequency division is performed. A main difference between this specific implementation and the method 1100 in the foregoing embodiment lies in that new DCI signaling is designed to indicate availability of DU frequency domain resources in a plurality of non-TDM slots. It should be noted that the method 1500 may be used to dynamically indicate the S resource in step S1150 of the method 1100. To some extent, the two solutions may be used together. This is not specifically limited in this application. As shown in FIG. 15, an implementation procedure 1500 includes the following steps.

S1510. A donor base station (that is, an example of a network device) determines an H/S/NA time domain resource configuration, and sends the H/S/NA time domain resource configuration to each cell of a DU of a first IAB node (that is, an example of a first node). Correspondingly, the first IAB node receives the H/S/NA time domain resource configuration from the donor base station.

For example, a CU of the donor base station sends signaling to the DU, to indicate a time domain resource configuration of a cell. For a specific signaling format, refer to a specification in the standard 3GPP protocol TS 38.473. Details are not described herein again. Therefore, an H time domain resource, an S time domain resource, and an NA time domain resource are configured for each cell of the DU. The DU of the first node communicates with a lower-level node (for example, a terminal device) based on the resource configuration. A specific implementation is similar to S1110 in the foregoing method 1100. For brevity, details are not described herein again.

S1520. The donor base station sends configuration information (that is, an example of third information) to each cell of the DU of the first IAB node, where the configuration information indicates a resource configuration of a non-TDM slot (that is, an example of a first slot). Correspondingly, the first IAB node receives the configuration information from the donor base station.

The non-TDM slot (or referred to as an FDM slot) supports only one function, and the function may configure frequency division resource configurations for some slots. It should be understood that, so long as all slots supporting the function are within the protection scope, names of the slots are not specifically limited in this application.

In a possible implementation, in time domain, some slots are configured as non-TDM slots (slots). For a TDM slot, the H/S/NA time domain resource configured in step S1110 is still applicable. For a non-TDM slot, availability of each frequency domain resource segment needs to be further determined based on the H/S/NA frequency domain resource pattern.

In another possible implementation, some slots in a time domain periodicity may be configured as non-TDM slots.

For example, the configuration of the H/S/NA frequency domain resource pattern may be bound to a configuration periodicity of the time domain H/S/NA, that is, some slots in the periodicity are non-TDM slots; or a periodicity is separately configured in units of slots or absolute time (for example, seconds or milliseconds); or a system frame (10 ms) is used as a periodicity, and the configuration directly indicates that some slots are non-TDM slots.

In still another possible implementation, all S (availability depends on a further indication of an upper-level node) slots in time domain are potential non-TDM slots by default.

For example, FIG. 16 is a schematic diagram of an example in which some time domain resources are configured as non-TDM slots (or FDM slots). As shown in FIG. 16, second, third, ninth, and tenth slots in time domain are separately configured as FDM slots.

The foregoing several possible implementations are similar to S1140 in the foregoing method 1100. For brevity, details are not described herein again.

S1530. The donor base station sends second configuration information (that is, an example of fifth information) to the first IAB node, where the configuration information indicates a configuration of frequency domain resource segmentation of the DU cell. Correspondingly, the first IAB node receives the configuration information of frequency domain resource segmentation from the donor base station.

In a possible implementation, a frequency domain resource of the cell of the DU may be semi-statically divided into a plurality of segments. To be specific, the frequency domain resource of the cell is segmented by using higher layer signaling (RRC or F1-AP signaling).

Further, different segment sizes may be allowed to be configured for each slot or symbol on which frequency division multiplexing needs to be performed.

Figure 17:
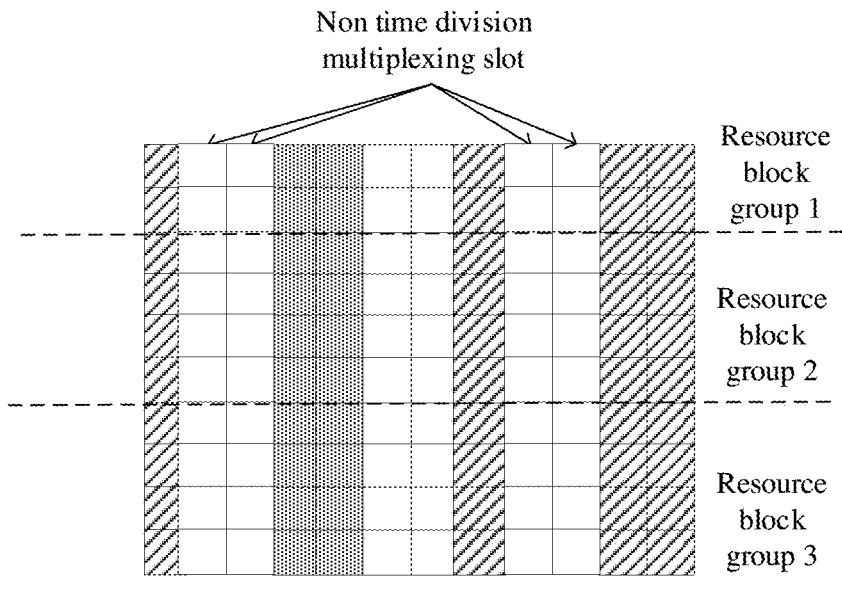
FIG. 17 is a schematic diagram of an example of frequency domain segmentation of a non-TDM slot according to this application.

For example, FIG. 17 is a schematic diagram of an example of frequency domain segmentation of a frequency division multiplexing slot or symbol of a cell. As shown in FIG. 17, a frequency division slot of the cell is segmented. For example, a frequency domain resource is divided into three segments: an RBG 1, an RBG 2, and an RBG 3. Optionally, it may be considered that a non frequency division slot is also divided into three segments, or it may be considered that there is no grouping. This does not affect a resource of the non frequency division slot. A size of a frequency domain resource group is not specifically limited in this application.

It should be noted that, in addition to the foregoing RBG, a granularity and a manner of frequency domain resource division may be a quantity of RBs, a bandwidth part BWP, or the like. This is not specifically limited in this application.

In another possible implementation, the frequency division H/S/NA resource may be semi-statically configured in some slots (non-TDM slots) by using the configuration method 1100 (for example, steps S1120 and S1140) in the foregoing Embodiment 1. A specific implementation process is described in the foregoing steps. For brevity, details are not described herein again.

S1540. The donor base station sends DCI signaling (that is, an example of sixth information) to the first IAB node, to indicate availability of each frequency domain resource segment in each slot. Correspondingly, the first IAB node receives the DCI signaling from the donor base station.

In a possible implementation, for each slot, each frequency domain resource segment of the IAB DU may be indicated available or unavailable by using a bit 0/1 of DCI signaling. Similarly to a design of DCI 2_5, DCI of a dynamic frequency domain resource may be indicated by using a segment of continuous bits in a cell of a DU, to indicate availability of a frequency division resource in each slot of a non-TDM resource in a periodicity. A specific indication is described in Table 4. For brevity, details are not described herein again.

Figure 18:
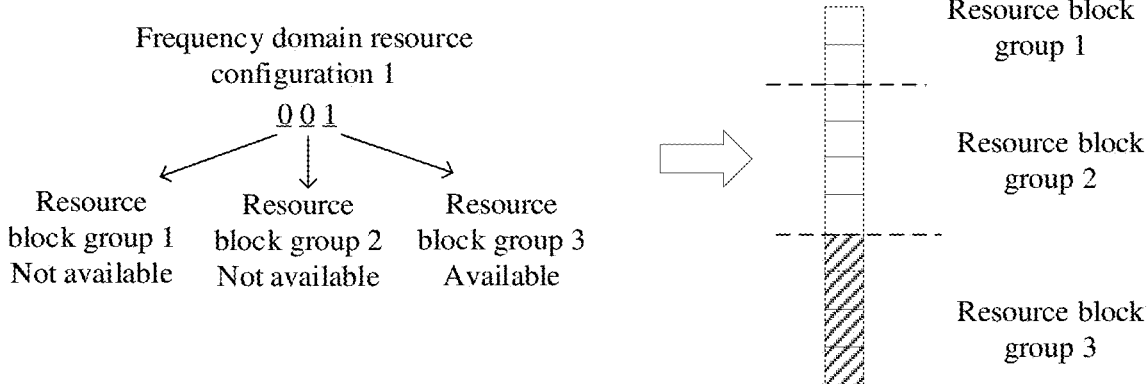
FIG. 18 is a schematic diagram of an example of using signaling to indicate availability of a frequency domain resource according to this application.
Figure 18:

For example, FIG. 18 is a schematic diagram of an example of using DCI signaling to indicate availability of a frequency domain resource. As shown in FIG. 18, a frequency domain resource of a cell X of the DU is divided into three segments: an RBG 1, an RBG 2, and an RBG 3. In this case, 3-bit DCI signaling needs to be used for further indication. For example, if DCI signaling for indicating FDM resources of the cell X of the DU is 001 010 011 010, DCI signaling corresponding to a start position of the FDM resource indication is 001, referred to as a frequency domain resource configuration 1. The three bits 0/1 respectively correspond to availability of frequency domain resources of the RBG 1, the RBG 2, and the RBG 3, where 0 indicates that the frequency domain resource is unavailable or indicates no indication of availability for the frequency domain resource, and 1 indicates that the frequency domain resource is available. In other words, the frequency domain resource of the RBG 1 is unavailable, the frequency domain resource of the RBG 2 is unavailable, and the frequency domain resource of the RBG 3 is available.

It should be understood that if the frequency domain resource of the cell X of the DU is divided into two segments, availability of the frequency domain resource may be indicated by using 2-bit DCI signaling.

Further, this embodiment of this application may alternatively be combined with H/S/NA to semi-statically configure the H/S/NA frequency domain resource. In this case, only a bit 0/1 of the DCI signaling may indicate availability of the S frequency domain resource. For example, the frequency domain resource of the cell X shown in FIG. 18 is divided into three segments. In this case, based on the pattern of the H/S/NA frequency domain resource configured or predefined in step S1120 in the foregoing method 1100, a pattern for dividing a corresponding frequency domain into three segments may be selected, and only 1-bit DCI signaling 0/1 is used to further indicate availability of the S resource.

In another possible implementation, for each frequency domain resource segment in each slot, a predefined configuration index may be indicated by using DCI signaling.

The predefined configuration index includes a resource indication for a plurality of slots/symbols. When receiving the indication, the child IAB node may determine, in one or more slots/symbols, availability of an S resource in the cell of the DU, where the S resource includes a resource whose bandwidth part is S in frequency domain. Specific implementation steps are as follows:

Step 1: A protocol predefines a correspondence table, to associate a value of an indication bit with a meaning of the bit.

In a possible implementation, a table defined in a current protocol is used. As shown in Table 4, a mapping relationship between a value of a resource availability element and an availability type of an S symbol in a slot is used. For brevity, details are not described herein again. In other words, Table 4 may be used to configure an availability indication of a soft time domain resource, and may also be used to configure an availability indication of a soft frequency domain resource.

In another possible implementation, a new table may be defined to indicate more cases availability of a frequency domain resource. For a symbol configured as soft in time domain, there may be a frequency domain H/S/NA, or there may be different transmission direction configurations. Therefore, more cases need to be indicated. Correspondingly, more bits may be required in each case.

Figure 19:
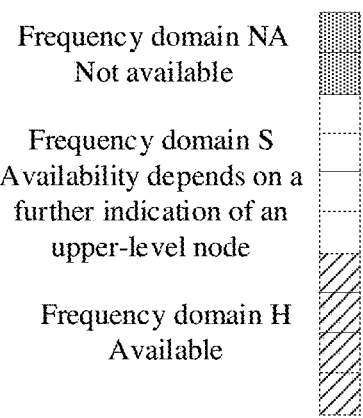
FIG. 19 is a schematic diagram of an example of availability of a frequency domain resource on an S time domain resource according to this application.

For example, FIG. 19 is a schematic diagram of an example of availability of a frequency domain resource on an S time domain resource. As shown in FIG. 19, a frequency domain resource is divided into three segments, and corresponding attributes are respectively: the frequency domain resource is not available (NA), availability depends on a further indication of the upper-level node (S), and the frequency domain resource is definitely available (H).

It should be understood that a bandwidth size obtained by dividing the frequency domain resource in the time domain S is not limited, and H and/or S and/or NA may be considered for a frequency domain resource attribute. Specific frequency domain resource division is not limited in this application. Table 5 (that is, an example of a second relationship) shows a mapping relationship between a value of a resource availability element and an availability type of a soft resource (including a time domain resource and a frequency domain resource). A total of 16 cases are defined. Each case may be indicated based on four bits, indicating that symbols in all or some transmission directions in one slot are available or indicate no indication of availability. Values 0 to 7 indicate indication information of availability of a soft time domain resource, and values 8 to 15 indicate indication information of availability of a soft frequency domain resource. As shown in Table 5, a value 0 indicates no indication of availability for all soft time domain resources; a value 9 indicates no indication of availability for a downlink resource; and a value 14 indicates that a flexible resource is indicated available and indicates no indication of availability for uplink and downlink resources.

TABLE 5

| Value of a resource availability element | Indication of an availability type of an S symbol |
|---|---|
| 0 | No indication of availability for uplink, downlink, and flexible resources. |
| 1 | A downlink resource is indicated available. No indication of availability for uplink and flexible resources. |
| 2 | An uplink resource is indicated available. No indication of availability for downlink and flexible resources. |
| 3 | Uplink and downlink resources are indicated available. No indication of availability for a flexible resource. |
| 4 | A flexible resource is indicated available. No indication of availability for uplink and downlink resources. |
| 5 | Downlink and flexible resources are indicated available. No indication of availability for an uplink resource. |
| 6 | Uplink and flexible resources are indicated available. No indication of availability for a downlink resource. |
| 7 | Uplink, downlink, and flexible time domain resources are indicated available. |
| 8 | No indication of availability for uplink, downlink, and flexible frequency domain resources. |
| 9 | No indication of availability for a downlink frequency domain resource. |
| 10 | No indication of availability for an uplink frequency domain resource. |
| 11 | No indication of availability for an S frequency domain resource. |
| 12 | An uplink frequency domain resource is indicated available. No indication of availability for downlink and flexible frequency domain resources. |
| 13 | A downlink frequency domain resource is indicated available. No indication of availability for uplink and flexible frequency domain resources. |
| 14 | A flexible frequency domain resource is indicated available. No indication of availability for uplink and downlink frequency domain resources. |
| 15 | Uplink, downlink, and flexible frequency domain resources are indicated available. |

It should be understood that Table 5 is merely an example. Actually, there may be a plurality of table definition forms, which are not listed one by one herein. However, a core idea is to indicate availability of the S resource. In addition to UL, DL, and flexible transmission directions, the H/S/NA frequency domain resource may also be considered, or availability of only some time domain resources, for example, the H and S frequency domain resources, is considered.

Step 2: The donor base station configures a plurality of indication sets by using higher layer signaling (for example, RRC signaling).

One set includes a plurality of values in the table predefined in step 1, and the values sequentially indicate availability of a series of slot resources that need to be indicated, that is, one value corresponds to one slot resource. The plurality of indication sets are identified by using numbers, for example, 1, 2, 3, . . . , N. It should be understood that a number in the indication set is a value column in the table. In an actual configuration, the number in the indication set may also be converted into a binary format for configuration, provided that a one-to-one correspondence between the value of the resource availability element and the availability type of the S symbol in the slot can be ensured.

For example, the indication set is configured as follows:

```
{set ID:  1
2, 3, 3, 6, 7, 3, 6, ...
}
{set ID: 2
4, 3, 5, 6, 2, 6, 9, 2, 2, ...
}
...
{set ID: N
5, 7, 3, 2, 5, 7, 3, ...
}
```

Specifically, for a set whose ID is 1, corresponding to the mapping relationship between a value of a resource availability element and an availability type of an S symbol in a slot shown in Table 5, a first slot corresponds to a number 2, that is, '0010', indicating that an uplink S symbol is indicated available; second, third, and sixth slots correspond to a number 3, that is, '0011', indicating that uplink and downlink S symbols are indicated available; fourth and seventh slots correspond to a number 6, that is, '0110', indicating that uplink and flexible S symbols are indicated available and indicate that a downlink S symbol is indicated unavailable; and a fifth slot corresponds to a number 7, that is, '0111', indicating that uplink, downlink, and flexible S symbols are indicated available, and the like.

It should be understood that in a specific implementation process, the following two cases are further included:

(1) There is only one type of configuration indication set, that is, IDs included in all indication sets fall within a unified range. In this case, the indication set may be based only on a table defined in a current protocol, for example, Table 4, and can indicate availability of only DL, UL, and flexible resources in an S slot; or the indication set may be based only on a newly defined table, for example, Table 5, and can indicate availability of only DL, UL, and flexible H/S/NA frequency domain resources in the S slot.

(2) Both two configuration sets may exist. In other words, by using DCI, the base station may indicate availability of a time domain resource in a slot (that is, no frequency division is performed), or may indicate availability of a specific frequency domain resource in a slot (that is, frequency division is performed).

However, considering a problem that an indication set of a frequency domain configuration and an indication set of a time domain configuration in an existing standard protocol coexist, this application further provides the following several possible implementations.

Figure 24:
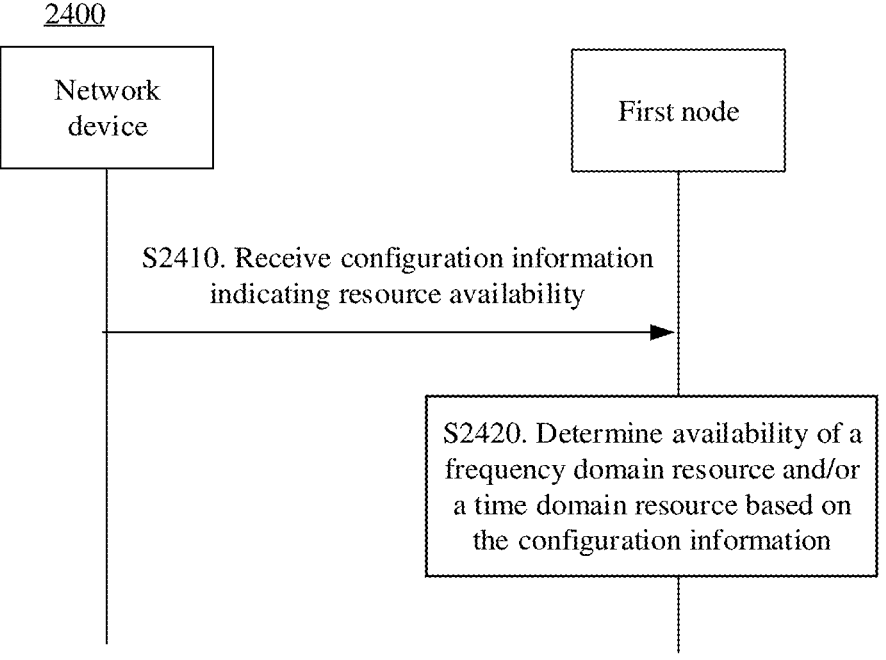
FIG. 24 is a schematic diagram of still another example of a wireless communication method according to this application.

FIG. 24 is a schematic diagram of still another example of a wireless communication method according to this application. Specifically, the method includes the following steps.

S2410. A network device sends configuration information to a first node.

Correspondingly, the first node receives the configuration information from the network device.

The configuration information indicates resource availability, the configuration information includes identification information of a plurality of indication sets, and each indication set includes availability indications of a plurality of time domain resources and/or frequency domain resources.

S2420. The first node determines availability of the frequency domain resource and/or the time domain resource based on the configuration information.

In a possible implementation, the availability indication of the frequency domain resource includes a resource availability indication of at least one RB set group, and each RB set group includes a resource availability indication of an RB set group of at least one slot.

In another possible implementation, the availability indication of the frequency domain resource includes a resource availability indication of at least one slot, the at least one slot includes a first slot, and the first slot further includes a resource availability indication of at least one RB set group.

In still another possible implementation, the plurality of indication sets include a first indication set and a second indication set, the first indication set corresponds to the time domain resource, the second indication set corresponds to the availability indication of the frequency domain resource, and identification information of the first indication set is different from identification information of the second indication set.

Specifically, in an example, a new resource availability indication configuration is designed, to support both an availability indication of a time division resource and an availability indication of a frequency division resource.

Optionally, if a frequency division resource availability indication configuration is configured for an IAB MT, the IAB MT does not expect to receive an availability indication configuration used for only a time division resource or use a received availability indication configuration used for only a time division resource. The availability indication configuration includes an availability indication set ID (AvailabilityCombinationId), and each ID includes one or more resource availability indications (resourceAvailability). The resource availability indication may be an availability indication used for a time division resource, or may be an availability indication used for a frequency division resource. Specifically, if the availability indication is an availability indication used for a time division resource, a value of the availability indication is used to determine availability of a soft slot resource. If the availability indication is an availability indication used for a frequency division resource, the availability indication is a sequence including one or more values, where each value in the sequence indicates availability of at least one soft frequency domain resource in one slot, and the soft frequency domain resource may be one or more RB sets (RB sets), or one or more RB set groups (RB set groups).

Optionally, if an availability indication configuration used for a frequency division resource is configured for the IAB MT, availability of a time division resource may be determined by using a configured rule or a rule predefined in a protocol. For example, only an rbSetGroups information element that can support a frequency division resource is configured. The information element includes a resource availability indication of at least one RB set group, and may further include a quantity of RB set groups. Specifically, when the quantity of RB set groups is configured as 1, the resource availability indication may be understood as indicating availability of all frequency domain resources in a corresponding slot, that is, availability of soft frequency domain resources in one slot can be indicated. For another example, a constraint is imposed by using a protocol. When an availability indication for a time division resource is configured, a quantity of RB set groups is configured as 1. For another example, a protocol is used for predefining. If a plurality of resource availability indications are configured for a slot of a time division resource, the availability indication for the time division resource may be based on a first resource availability indication to determine a plurality of corresponding RB set groups.

Optionally, if an availability indication of a time division resource is configured or indicated for a soft slot in which a frequency division resource exists, it may be understood that resource availability is determined for all soft frequency domain resources (that is, RB set groups) in the slot based on the configured availability indication of the time division resource. Specifically, the following several possible implementations are included.

Solution 1: Each frequency domain resource, for example, an RB set group, indicates resource availability of one or more slots.

A first possible form of configuration signaling is as follows:

```
AvailabilityCombinationsPerCellIndex-r16 ::= INTEGER(0..maxNrofDUCells-r16)
AvailabilityCombination-r16 ::=                    SEQUENCE {
    availabilityCombinationId-r16                      AvailabilityCombinationId-r16,
    resourceAvailability-r16                               SEQUENCE (SIZE
(1..maxNrofResourceAvailabilityPerCombination-r16)) OF INTEGER (0..7)
}
    AvailabilityCombinationId-r16   ::=                                     INTEGER
(0..maxNrofAvailabilityCombinationsPerSet-1-r16)
    AvailabilityCombination-r17 ::=                    SEQUENCE {
    availabilityCombinationId-r16                      AvailabilityCombinationId-r16,
    resourceAvailability-r17 choice {
        rbSetGroups-r17                                          SEQUENCE (SIZE
(1..maxNrofRbSetGroups-r17)) OF RbSetGroup-r17      OPTIONAL, -- Need M
        resourceAvailability-r16                                 SEQUENCE (SIZE
(1..maxNrofResourceAvailabilityPerCombination-r16)) OF INTEGER (0..7)   OPTIONAL --
Need M
    }
}
```

-continued

```
RbSetGroup-r17 ::=                                    SEQUENCE {
    resourceAvailability-r16                                SEQUENCE (SIZE
(1..maxNrofResourceAvailabilityPerCombination-r16)) OF INTEGER (0..7)   OPTIONAL, -
- Need M
    rbSets-r17                                        INTEGER (0..7)
OPTIONAL -- Need M
    }
    -- TAG-AVAILABILITYCOMBINATIONSPERCELL-STOP
    -- ASN1STOP
``` resourceAvailability-r17 choice indicates that a time domain resource availability indication manner or a frequency domain resource availability indication manner is selected. rbSetGroups-r17 may be a sequence including more than one RbSetGroup-r17. Each RbSetGroup-r17 includes a frequency domain resource availability configuration of the RbSetGroup-r17, that is, indicates resource availability of each RB set group. maxNrofRbSetGroups-r17 indicates that resource availability of several (maximum) RB set groups is configured. For example, a maximum of eight RB set groups may be obtained through division in frequency domain. Further, each RbSetGroup-r17 further includes a quantity of RB sets and corresponding resource availability in the slot, which is configured by resourceAvailability-r16. maxNrofResourceAvailabilityPer-Combination-r16 indicates a resource availability indication of an RB set group in a maximum configuration of time. INTEGER (0 . . . 7) may indicate a resource availability indication of an RB set group in a slot. For meanings of values (0 to 7), refer to Table 4. Details are not described herein again.

A second possible form of configuration signaling is as follows:

resources both include a set ID, resource availability indications of frequency domain RB set groups, and maxNrof-RbSetGroups indicating resource availability indications of a maximum quantity of RB set groups that can be included. For each RB set group, the indication set further includes a resource availability configuration (configured by resourceAvailability) of the RB set group in one or more slots, and a quantity of RB sets included in each RB set group.

It should be understood that, a difference between the configuration signaling and the first configuration signaling lies in that in the second manner, an availability indication may be correspondingly configured based on different quantities of groups, but in the first method, quantities of RB set groups in different slots are relatively inflexible.

A third possible form of configuration signaling is as follows:

```
AvailabilityCombinationsPerCellIndex-r16 ::= INTEGER(0..maxNrofDUCells-r16)
AvailabilityCombination-r16 ::=                       SEQUENCE {
    availabilityCombinationId-r16                         AvailabilityCombinationId-r16,
    resourceAvailability-r16                              SEQUENCE (SIZE
(1..maxNrofResourceAvailabilityPerCombination-r16)) OF INTEGER (0..7)
    }
    AvailabilityCombinationId-r16   ::=                               INTEGER
(0..maxNrofAvailabilityCombinationsPerSet-1-r16)
    AvailabilityCombination-r17 ::=                       SEQUENCE {
    availabilityCombinationId-r16                         AvailabilityCombinationId-r16,
    rbSetGroups-r17                                       SEQUENCE (SIZE (1..
maxNrofRbSetGroups-r17)) OF RbSetGroup-r17      OPTIONAL, -- Need M
        }
    RbSetGroup-r17 ::=                                    SEQUENCE {
    resourceAvailability-r16                              SEQUENCE (SIZE
(1..maxNrofResourceAvailabilityPerCombination-r16)) OF INTEGER (0..7)
    rbSets-r17                                           INTEGER (0..7)
OPTIONAL -- Need M
    }
```

A set indicating availability of frequency division resources and a set indicating availability of time division

```
AvailabilityCombinationsPerCellIndex-r16 ::= INTEGER(0..maxNrofDUCells-r16)
AvailabilityCombination-r16 ::=                       SEQUENCE {
    availabilityCombinationId-r16                         AvailabilityCombinationId-r16,
    resourceAvailability-r16                              SEQUENCE (SIZE
(1..maxNrofResourceAvailabilityPerCombination-r16)) OF INTEGER (0..7)
    }
    AvailabilityCombinationId-r16   ::=                               INTEGER
(0..maxNrofAvailabilityCombinationsPerSet-1-r16)
    AvailabilityCombination-r17 ::=                       SEQUENCE {
    availabilityCombinationId-r16                         AvailabilityCombinationId-r16,
```

```
resourceAvailability-r17 choice {
       rbSetGroups-r17                                    SEQUENCE (SIZE
(1.. maxNrofResourceAvailabilityPerCombination-r16)) OF RbSetGroup-r17   OPTIONAL,
-- Need M
       resourceAvailability-r16                           SEQUENCE (SIZE
(1..maxNrofResourceAvailabilityPerCombination-r16)) OF INTEGER (0..7)   OPTIONAL --
Need M
       }
    }
    RbSetGroup-r17 ::=                                    SEQUENCE {
       resourceAvailabilityRbSetGroup-r17                    SEQUENCE (SIZE (1..
maxNrofRbSetGroups-r17)) OF INTEGER (0..7)       OPTIONAL, -- Need M
       rbSets-r17                                         SEQUENCE (SIZE
(1..maxNrofRbSets-r17)) OF INTEGER (0..7)      OPTIONAL -- Need M
    }
    -- TAG-AVAILABILITYCOMBINATIONSPERCELL-STOP
    -- ASN1STOP
``` rbSetGroups-r17 may be a sequence including more than one RbSetGroups-r17, and each RbSetGroups-r17 includes a resource availability configuration of one or more RB set groups in one slot. Further, each RbSetGroup-r17 further includes a quantity of RB sets and corresponding resource availability in the slot, which is configured by resourceAvconfiguration further includes a value of the resource availability indication, where the value is any value in Table 4. The resource availability indication of any RB set group may further include a quantity of RB sets of the RB set group. A specific form of configuration signaling may be shown as follows:

```
AvailabilityCombination-r17 ::=              SEQUENCE {
availabilityCombinationId-r16                  AvailabilityCombinationId-r16,
    resource Availability-r17                    SEQUENCE (SIZE
(1..maxNrofResourceAvailabilityPerCombination-r16))   OF   resourceAvailabilityPerSlot-r17
OPTIONAL -- Need M
       }
    resourceAvailabilityPerSlot-r17 choice {
       rbSetGroups-r17                          SEQUENCE (SIZE
(1..maxNrofRbSetGroups-r17)) OF RbSetGroup-r17   OPTIONAL, -- Need M
       resourceAvailability-r16                 INTEGER (0..7)
OPTIONAL -- Need M
       }
    }
    RbSetGroup-r17 ::=                           SEQUENCE {
       resourceAvailability-r16                    INTEGER (0..7)
OPTIONAL, -- Need M
       rbSets-r17                                INTEGER (0..
maxNrofRbSetsFrequency-r17)   OPTIONAL -- Need M
    }
``` ailability-r16. maxNrofResourceAvailabilityPerCombination indicates that a length is a maximum of N slots in time. RbSetGroup-r17 indicates an availability configuration of one or more RB set groups in each slot. resourceAvailabilityRbSetGroup indicates one or more values (0 to 7). If there are a plurality of values, each value corresponds to resource availability of one RB set group. maxNrofRbSetGroups indicates a maximum of eight values (0 to 7). maxNrofRbSets indicates a quantity of sets in each group.

Solution 2: Each time domain resource, for example, a slot, indicates resource availability of one or more RB set groups. In other words, if frequency division exists, each slot indicates resource availability of each RB set group.

A configuration of a resource availability indication includes an availability indication of a plurality of time resources in time domain, and the time resource may be a slot. For any slot, if the slot is a slot of a time division resource, the resource availability indication is a value in Table 4, used to determine resource availability of the slot. For any slot, if the slot is a slot of a frequency division resource, the configuration further includes a resource availability indication of one or more RB set groups. For a resource availability indication of any RB set group, the Specifically, in another example, an additional resource availability indication configuration is designed to support an availability indication of a frequency division resource. It should be understood that the configuration is independent of an existing availability indication of a time division resource (for example, Table 4). In this manner, the availability indication of the time division resource and the availability indication of the frequency division resource may share a same availabilityCombinationId set. In other words, one piece of DCI signaling may indicate resource availability of a time division slot, and may also indicate resource availability of a frequency division slot.

Specifically, different availabilityCombinationIds may be configured for the availability indication of the time division resource and the availability indication of the frequency division resource. In other words, one availabilityCombinationId is used only to configure availability of the time division resource or availability of the frequency division resource. In the configuration signaling, the availability configuration of the time division resource and the availability configuration of the frequency division resource may be independent of each other, and both include one availabilityCombinationId. A specific implementation is as follows:

```
AvailabilityCombinationsPerCellIndex-r16 ::= INTEGER(0..maxNrofDUCells-r16)
AvailabilityCombination-r16 ::=                     SEQUENCE {
    availabilityCombinationId-r16                   AvailabilityCombinationId-r16,
    resourceAvailability-r16                                SEQUENCE (SIZE
(1..maxNrofResourceAvailabilityPerCombination-r16)) OF INTEGER (0..7)
}
AvailabilityCombinationId-r16 ::=                              INTEGER
(0..maxNrofAvailabilityCombinationsPerSet-1-r16)
AvailabilityCombinationRBGroups-r17 ::=            SEQUENCE {
    availabilityCombinationId-r16                   AvailabilityCombinationId-
r16,
    rbSetGroups-r17                                         SEQUENCE (SIZE
(1..maxNrofRbSetGroups-r17)) OF RbSetGroup-r17       OPTIONAL, -- Need M
    resourceAvailability-r16                              SEQUENCE (SIZE (1..
maxNrofRbSetGroups-r17)) OF INTEGER (0..7)   OPTIONAL -- Need M
}
RbSetGroup-r17 ::=                                SEQUENCE {
    resourceAvailability-r16                              SEQUENCE (SIZE
(1..maxNrofResourceAvailabilityPerCombination-r16)) OF INTEGER (0..7)   OPTIONAL, -
- Need M
    rbSets-r17                                              SEQUENCE (SIZE
(1..maxNrofRbSets-r17)) OF INTEGER (0..7)   OPTIONAL -- Need M
}
-- TAG-AVAILABILITYCOMBINATIONSPERCELL-STOP
-- ASN1STOP
```

The "resource availability indication" may be an indication manner of "frequency domain first and then time domain". For example, it is assumed that there are four resource availability indications {a, b, c, d}, indicating resource availability of two soft slots, where values of a, b, c, and d are respectively one of values (0 to 7), and each soft slot resource may be further divided into two RB set groups (RB set groups). In this case, it may be considered that {a, b} in the four resource availability indications indicates availability of soft frequency domain resources of two RB set groups in the first soft slot, and {c, d} indicates availability of soft frequency domain resources of two RB set groups in the second soft slot.

It should be noted that the foregoing mapping method of the "resource availability indication" is more likely to coexist with an existing time domain resource availability indication (for example, Table 4), that is, the resource availability indication is provided per slot regardless of whether the soft slot is a frequency division slot.

It should be understood that the information element name in the configuration signaling is merely an example for description. This is not specifically limited in this application.

It should be noted that the several possible implementations provided above are merely examples for description, and should not constitute any limitation on the technical solutions of this application.

In the method disclosed above, a plurality of frequency domain resource availability indications are configured and defined, to avoid excessively redundant and complex configurations of frequency division resources in the current technology, thereby reducing signaling overheads and improving system performance. Particularly, for a problem of coexistence of a frequency domain configuration indication and a time domain configuration indication set, a plurality of possible resource availability indication configurations are provided, to avoid confusion and interference between time domain resource availability indications and frequency domain resource availability indications. In addition, availability indication configurations may be configured for time division resources and frequency division resources based on a unified signaling framework.

It should be noted that the resource block group in this embodiment of this application may be replaced with a resource block set, a resource block set list (list), or a resource block set group. This is not specifically limited in this application. Therefore, the frequency domain resource block group may be replaced with a frequency domain resource block set, a frequency domain resource block set list (list), or a frequency domain resource block set group. For a time domain resource, the case is similar.

For a DU cell, frequency division resources may be configured in some slots, and time division resources may be configured in some slots. The resource availability indication disclosed in this application may be used to configure both frequency division resources and time division resources.

Step 3: The upper-level node (for example, the donor base station) sends DCI signaling (that is, an example of seventh information) to the IAB node, where the seventh information includes identification information of at least one indication set and indicates at least one target indication set. Correspondingly, the IAB node receives the DCI signaling from the upper-level node.

The DCI signaling carries the configured indication set ID, to indicate resource availability of a plurality of non-TDM slots for the lower-level DU. It should be noted that the DCI signaling sent herein includes an index value of the set, that is, a set ID.

In summary, in the foregoing embodiment, the H/S/NA time domain resource is first configured, then the frequency domain resource is divided into a plurality of segments, and finally, availability of each frequency domain resource segment is indicated by using DCI signaling. A main difference lies in that new DCI signaling is designed to further indicate resources available to the DU, in each slot that requires frequency division, thereby avoiding complex and redundant configurations and reducing signaling overheads.

With reference to FIG. 10 to FIG. 19, the foregoing describes in detail the resource configuration method embodiments provided in the embodiments of this application. With reference to FIG. 20 to FIG. 23, the following describes in detail apparatus embodiments of this application. It should be understood that descriptions of the method embodiments correspond to descriptions of the apparatus embodiments. Therefore, for parts not described in detail, refer to the foregoing method embodiments.

Figure 20:
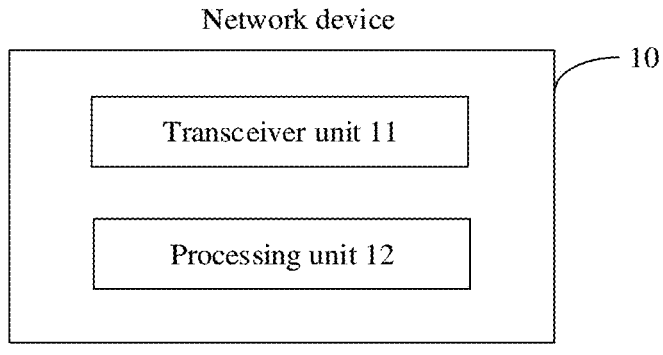
FIG. 20 is a schematic diagram of an example of a wireless communication apparatus according to this application.

According to the foregoing method, FIG. 20 is a schematic diagram of a communication apparatus 10 according to an embodiment of this application. It may be understood that the communication apparatus 10 may be a network device (for example, a donor base station). As shown in FIG. 20, the communication apparatus 10 includes a transceiver unit 11 and a processing unit 12.

For example, the transceiver unit 11 is configured to send first information, where the first information includes indication information of a first pattern, the first pattern is one of a plurality of patterns, each of the plurality of patterns indicates distribution of at least one resource in frequency domain, and the at least one resource includes at least one of the following resources: a first resource, a second resource, and a third resource, where the first resource is a definitely available resource, the second resource is an unavailable resource, availability of the third resource is determined by first indication information, the first indication information is sent by a first network device, and resource distribution indicated by any two patterns is different.

The processing unit 12 is configured to determine, based on the first pattern, a resource for communication between the network device and a first node and/or a terminal device, where the first node is a relay node.

The transceiver unit 11 is further configured for the network device to communicate with the first node and/or the terminal device. The resource for communication between the network node and the first node and/or the terminal device may be located on the resource determined by the processing unit 12.

Optionally, the transceiver unit 11 is further configured to send second information, where the second information indicates a first time domain resource.

Optionally, the processing unit 12 is further configured to determine, on the first time domain resource based on the first pattern, a resource for communicating with the first node and/or the terminal device.

Optionally, the transceiver unit 11 is further configured for the network device to communicate with the first node and/or the terminal device on the first time domain resource.

It should be understood that the communication apparatus 10 may correspond to the network device (the donor base station) in the method 1000/1100/1500 according to the embodiments of this application. The communication apparatus 10 may include modules (or units) configured to perform the method performed by the network device (the donor base station) in FIG. 10, FIG. 11, or FIG. 15. In addition, the modules (or units) in the communication apparatus 10 and the foregoing other operations and/or functions are separately used to implement corresponding procedures in the method 1000/1100/1500.

For example, the transceiver unit 11 is configured to perform actions that are performed by the network device (for example, the donor base station) in S1010 and S1020, or S1110, S1120, S1130, S1140, and S1150, or S1510, S1520, S1530, and S1540 in the method 1000/1100/1500. A process of performing the corresponding step by each module (or unit) has been described in detail in the method 1000/1100/1500. For brevity, details are not described herein again.

It should be understood that the structure of the apparatus 10 shown in FIG. 20 is merely a possible form, and should not constitute any limitation on this embodiment of this application. This application does not exclude a possibility that there may be a network device in another form in the future.

It should be understood that the communication apparatus 10 according to this embodiment of this application may correspond to the network device (the donor base station) in the foregoing method embodiment, and the foregoing and other management operations and/or functions of the modules (or units) in the communication apparatus 10 are separately used to implement corresponding steps of the foregoing method. Therefore, beneficial effects in the foregoing method embodiment can also be achieved.

It should be further understood that the processing module (or unit) in this embodiment of this application may be implemented by a processor, and the transceiver module (or unit) may be implemented by a transceiver.

Figure 21:
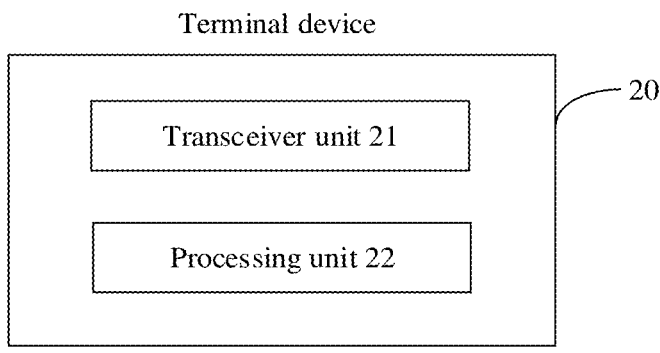
FIG. 21 is a schematic diagram of another example of a wireless communication apparatus according to this application.

According to the foregoing method, FIG. 21 is a schematic diagram of a communication apparatus 20 according to an embodiment of this application. It may be understood that the communication apparatus 10 may be a first node, a component (for example, a first IAB node) that can be used for the first node, or a terminal device (for example, UE). As shown in FIG. 21, the communication apparatus 20 includes a transceiver unit 21 and a processing unit 22.

For example, the transceiver unit 21 is configured to receive first information, where the first information includes indication information of a first pattern, the first pattern is one of a plurality of patterns, each of the plurality of patterns indicates distribution of at least one resource in frequency domain, and the at least one resource includes at least one of the following resources: a first resource, a second resource, and a third resource, where the first resource is a definitely available resource, the second resource is an unavailable resource, availability of the third resource is determined by first indication information, the first indication information is sent by a first network device, and resource distribution indicated by any two patterns is different.

The processing unit 22 is configured to determine, based on the first pattern, a resource for communicating with a second network device and/or the terminal device.

The transceiver unit 21 is further configured for the first node to communicate with the second network device and/or the terminal device. The resource for communication between the network node and the first node and/or the terminal device may be located on the resource determined by the processing unit 22.

Optionally, the processing unit 22 is further configured to determine, on a first time domain resource based on the first pattern, a resource for communicating with the second network device and/or the terminal device.

Optionally, the transceiver unit 21 is further configured to receive second information, where the second information indicates the first time domain resource.

Optionally, the transceiver unit 21 is further configured for the first node to communicate with the second network device and/or the terminal device on the first time domain resource.

It should be understood that the communication apparatus 20 may correspond to the first node (the first IAB node) in the method 1000/1100/1500 according to the embodiments of this application. The communication apparatus 20 may include modules (or units) configured to perform the method performed by the first node (the first IAB node) in FIG. 10, FIG. 11, or FIG. 15. In addition, the modules (or units) in the communication apparatus 20 and the foregoing other operations and/or functions are separately used to implement corresponding procedures in the method 1000/1100/1500.

For example, the transceiver unit 11 is configured to perform actions that are performed by the first node and/or the terminal device in S1010 and S1020, or S1110, S1120, S1130, S1140, and S1150, or S1510, S1520, S1530, and S1540 in the method 1000/1100/1500. A process of performing the corresponding step by each module (or unit) has been described in detail in the method 1000/1100/1500. For brevity, details are not described herein again.

It should be understood that the structure of the apparatus 20 shown in FIG. 21 is merely a possible form, and should not constitute any limitation on this embodiment of this application. This application does not exclude a possibility that there may be a relay node or a terminal device in another form in the future.

It should be understood that the communication apparatus 20 according to this embodiment of this application may correspond to the first node (the first IAB node) in the foregoing method embodiment, and the foregoing and other management operations and/or functions of the modules (or units) in the communication apparatus 20 are separately used to implement corresponding steps of the foregoing method. Therefore, beneficial effects in the foregoing method embodiment can also be achieved.

It should be further understood that the processing module (or unit) in this embodiment of this application may be implemented by a processor, and the transceiver module (or unit) may be implemented by a transceiver.

Figure 22:
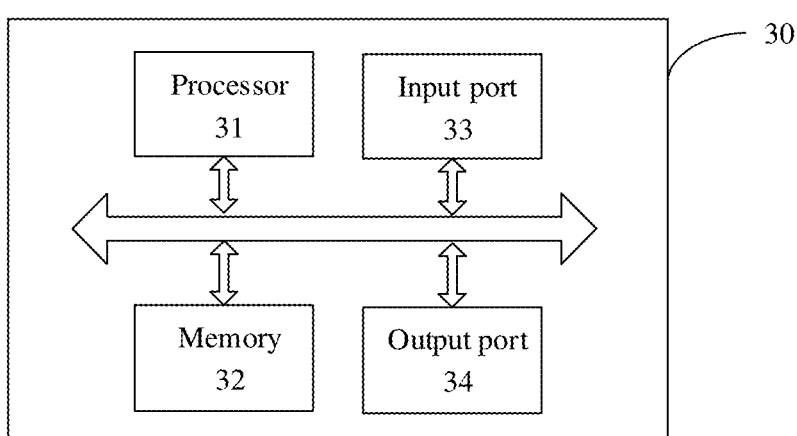
FIG. 22 is a schematic diagram of an example of a network device according to this application.

According to the foregoing method, FIG. 22 is a schematic diagram of a communication apparatus (which may also be referred to as a network device) 30 according to an embodiment of this application. As shown in FIG. 22, the apparatus 30 may be a network device (for example, a donor base station), or may be a chip or a circuit, for example, a chip or a circuit that may be disposed in a network device.

The apparatus 30 may include a processor 31 (that is, an example of a processing unit) and a memory 32. The memory 32 is configured to store instructions, and the processor 31 is configured to execute the instructions stored in the memory 32, so that the apparatus 30 implements the steps performed by the network device (for example, the donor base station) in the foregoing method (for example, the method 1000, the method 1100, or the method 1500).

Optionally, the apparatus 30 may further include an input port 33 (that is, an example of a communication unit) and an output port 34 (that is, another example of the communication unit). It should be understood that the processor 31, the memory 32, the input port 33, and the output port 34 may communicate with each other through an internal connection path, to transmit a control signal and/or a data signal.

The memory 32 is configured to store a computer program. The processor 31 may be configured to invoke the computer program from the memory 32 and run the computer program to control the input port 33 to receive a signal and control the output port 34 to send a signal, to complete steps of the network device in the foregoing method.

The memory 32 may be integrated in the processor 31, or may be disposed separately from the processor 31.

Optionally, if the apparatus 30 is a network device, the input port 33 is a receiver, and the output port 34 is a transmitter. The receiver and the transmitter may be a same physical entity or different physical entities. When the receiver and the transmitter are the same physical entity, the receiver and the transmitter may be collectively referred to as a transceiver.

Optionally, if the apparatus 30 is a chip or a circuit, the input port 33 is an input interface, and the output port 34 is an output interface.

In an implementation, functions of the input port 33 and the output port 34 may be implemented by using a transceiver circuit or a special-purpose transceiver chip. The processor 31 may be implemented by using a special-purpose processing chip, a processing circuit, a processor, or a general-purpose chip.

In another implementation, it may be considered that the network device provided in this embodiment of this application is implemented by using a general-purpose computer. To be specific, program code that is used to implement functions of the processor 31, the input port 33, and the output port 34 is stored in the memory 32, and a general-purpose processor implements the functions of the processor 31, the input port 33, and the output port 34 by executing the code in the memory 32.

In this embodiment of this application, the output port 34 is configured to send first information, where the first information includes indication information of a first pattern, the first pattern is one of a plurality of patterns, each of the plurality of patterns indicates distribution of at least one resource in frequency domain, and the at least one resource includes at least one of the following resources: a first resource, a second resource, and a third resource, where the first resource is a definitely available resource, the second resource is an unavailable resource, availability of the third resource is determined by first indication information, the first indication information is sent by a first network device, and resource distribution indicated by any two patterns is different.

The processor 31 is configured to determine, based on the first pattern, a resource for communicating with a first node and/or a terminal device, where the first node is a relay node.

Optionally, the output port 34 is further configured to send second information, where the second information indicates a first time domain resource.

Optionally, the processor 31 is further configured to determine, on the first time domain resource based on the first pattern, a resource for communicating with the first node and/or the terminal device.

Optionally, the apparatus 30 is configured in or is a network device, for example, a donor base station.

The foregoing listed functions and actions of the modules or units in the apparatus 30 are merely examples for description. The modules or units in the apparatus 30 may be configured to perform actions or processing procedures performed by the network device (for example, the donor base station) in the foregoing method 1000/1100/1500. To avoid repetition, detailed descriptions are omitted herein.

For example, the output port 34 is configured to perform actions or processing procedures that are performed by the network device (for example, the donor base station) in S1010 and S1020, or S1110, S1120, S1130, S1140, and S1150, or S1510, S1520, S1530, and S1540 in the method 1000/1100/1500.

For concepts, explanations, detailed descriptions, and other steps related to the technical solutions provided in this embodiment of this application and related to the apparatus 30, refer to descriptions about the content in the foregoing methods or other embodiments. Details are not described herein again.

In a possible implementation, with development of a system-on-chip (System-on-chip, SoC) technology, all or some functions of the apparatus 30 are implemented by using the SoC technology, for example, implemented by using a network device function chip. The network device function chip integrates components such as a processor, a memory, and a communication interface. A program related to functions of a network device is stored in the memory. The processor executes the program to implement related functions of a base station. Optionally, the network device function chip can also read a memory outside the chip, to implement related functions of the base station.

It should be understood that the structure of the apparatus 30 shown in FIG. 22 is merely a possible form, and should not constitute any limitation on this embodiment of this application. This application does not exclude a possibility that there may be a base station structure in another form in the future.

Figure 23:
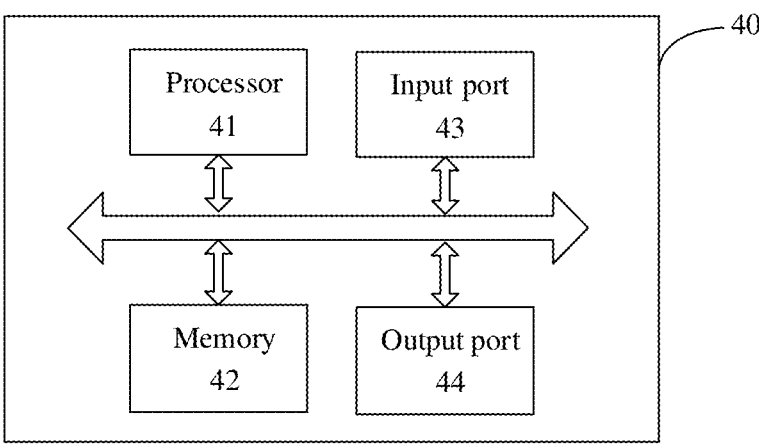
FIG. 23 is a schematic diagram of an example of a terminal device according to this application.

According to the foregoing method, FIG. 23 is a schematic diagram of a communication apparatus (which may also be referred to as a relay device or a terminal device) 40 according to an embodiment of this application. As shown in FIG. 23, the apparatus 40 may be a first node (for example, a first IAB node), or a component that may be used for a first node, or a terminal device (for example, UE), or a chip or a circuit that may be disposed in a relay device or a terminal device.

The apparatus 40 may include a processor 41 (that is, an example of a processing unit) and a memory 42. The memory 42 is configured to store instructions, and the processor 41 is configured to execute the instructions stored in the memory 42, so that the apparatus 40 implements the steps performed by the first node (for example, the first IAB node) in the foregoing method (for example, the method 1000, the method 1100, or the method 1500).

Optionally, the apparatus 40 may further include an input port 43 (that is, an example of a communication unit) and an output port 44 (that is, another example of the communication unit). It should be understood that the processor 41, the memory 42, the input port 43, and the output port 44 may communicate with each other through an internal connection path, to transmit a control signal and/or a data signal.

The memory 42 is configured to store a computer program. The processor 41 may be configured to invoke the computer program from the memory 42 and run the computer program to control the input port 43 to receive a signal and control the output port 44 to send a signal, to complete steps of the network device in the foregoing method.

The memory 42 may be integrated in the processor 41, or may be disposed separately from the processor 41.

Optionally, if the apparatus 40 is a relay device or a terminal device, the input port 43 is a receiver, and the output port 44 is a transmitter. The receiver and the transmitter may be a same physical entity or different physical entities. When the receiver and the transmitter are the same physical entity, the receiver and the transmitter may be collectively referred to as a transceiver.

Optionally, if the apparatus 40 is a chip or a circuit, the input port 43 is an input interface, and the output port 44 is an output interface.

In an implementation, functions of the input port 43 and the output port 44 may be implemented by using a transceiver circuit or a special-purpose transceiver chip. The processor 41 may be implemented by using a special-purpose processing chip, a processing circuit, a processor, or a general-purpose chip.

In another implementation, it may be considered that the first node (for example, the first IAB node) provided in this embodiment of this application is implemented by using a general-purpose computer. To be specific, program code that is used to implement functions of the processor 41, the input port 43, and the output port 44 is stored in the memory 42, and a general-purpose processor implements the functions of the processor 41, the input port 43, and the output port 44 by executing the code in the memory 42.

In this embodiment of this application, the input port 43 is configured to receive first information, where the first information includes indication information of a first pattern, the first pattern is one of a plurality of patterns, each of the plurality of patterns indicates distribution of at least one resource in frequency domain, and the at least one resource includes at least one of the following resources: a first resource, a second resource, and a third resource, where the first resource is a definitely available resource, the second resource is an unavailable resource, availability of the third resource is determined by first indication information, the first indication information is sent by a first network device, and resource distribution indicated by any two patterns is different.

The processor 41 is configured to determine, based on the first pattern, a resource for communicating with a second network device and/or a terminal device.

Optionally, the processor 41 is further configured to determine, on a first time domain resource based on the first pattern, a resource for communicating with the second network device and/or the terminal device.

Optionally, the input port 43 is further configured to receive second information, where the second information indicates the first time domain resource.

Optionally, the apparatus 40 is configured in or is a relay device, a first node (for example, a first IAB node), or a terminal device (for example, UE).

The foregoing listed functions and actions of the modules or units in the apparatus 40 are merely examples for description. The modules or units in the apparatus 40 may be configured to perform actions or processing procedures performed by the first node (for example, the first IAB node) in the foregoing method 1000/1100/1500. To avoid repetition, detailed descriptions are omitted herein.

For example, the input port 43 may perform actions that are performed by the first node (for example, the first IAB node) in S1010 and S1020, or S1110, S1120, S1130, S1140, and S1150, or S1510, S1520, S1530, and S1540 in the method 1000/1100/1500.

For concepts, explanations, detailed descriptions, and other steps related to the technical solutions provided in this embodiment of this application and related to the apparatus 40, refer to descriptions about the content in the foregoing methods or other embodiments. Details are not described herein again.

In a possible implementation, with development of a system-on-chip (System-on-chip, SoC) technology, all or some functions of the apparatus 40 are implemented by using the SoC technology, for example, implemented by using a terminal device function chip. The terminal device function chip integrates components such as a processor, a memory, and a communication interface. A program related to functions of a terminal device is stored in the memory. The processor executes the program to implement related functions of user equipment. Optionally, the terminal device function chip can also read a memory outside the chip, to implement related functions of the user equipment.

It should be understood that the structure of the apparatus 40 shown in FIG. 23 is merely a possible form, and should not constitute any limitation on this embodiment of this application. This application does not exclude a possibility that there may be a user equipment structure in another form in the future.

It should be understood that, the processor in the embodiments of this application may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA), or another programmable logic device, a discrete gate or transistor logic device, a discrete hardware component, or the like. The general-purpose processor may be a microprocessor, or the processor may be any conventional processor or the like.

It should be further understood that the memory in the embodiments of this application may be a volatile memory or a nonvolatile memory, or may include a volatile memory and a nonvolatile memory. The non-volatile memory may be a read-only memory (read-only memory, ROM), a programmable read-only memory (programmable ROM, PROM), an erasable programmable read-only memory (erasable PROM, EPROM), and an electrically erasable programmable read-only memory (electrically EPROM, EEPROM), or a flash memory. The volatile memory may be a random access memory (random access memory, RAM), and is used as an external cache. By way of example and not limitation, RAMs in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware, firmware, or any other combination thereof. When the software is used to implement the embodiments, all or some of the foregoing embodiments may be implemented in a form of a computer program product. The computer program product includes one or more computer instructions or computer programs. When the computer instructions or the computer programs are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and indicates that three relationships may exist. For example, A and/or B may represent the following three cases: Only A exists, both A and B exist, and only B exists. In addition, the character "/" in this specification usually indicates an "or" relationship between associated objects.

It should be understood that sequence numbers of the foregoing processes do not mean execution sequences in various embodiments of this application. The execution sequences of the processes should be determined based on functions and internal logic of the processes, but should not be construed as any limitation on the implementation processes in the embodiments of this application.

It should be further understood that "first", "second", and the like mentioned in this specification are merely used for distinguishing to describe the technical solutions of this application more clearly, and should not constitute any limitation on this application.

Terms such as "component", "module", and "system" used in this specification indicate computer-related entities, hardware, firmware, combinations of hardware and software, software, or software being executed. For example, a component may be but is not limited to a process that runs on a processor, a processor, an object, an executable file, an execution thread, a program, and/or a computer. As illustrated by using figures, both a computing device and an application that runs on the computing device may be components. One or more components may reside in a process and/or an execution thread, and a component may be located on one computer and/or distributed between two or more computers. In addition, these components may be executed from various computer-readable media that store various data structures. For example, the components may perform communication by using a local process and/or a remote process and based on, for example, a signal with one or more data packets (for example, data from two components interacting with another component in a local system, a distributed system, and/or across a network such as the Internet interacting with other systems by using the signal).

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the foregoing apparatus embodiments are merely examples. For example, division of the units is merely logical function division and may be other division during actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, in other words, may be located in one place, or may be distributed on a plurality of network units. Some or all of the units may be selected based on actual requirements to achieve the objectives of the solutions of the embodiments.

In addition, functional units in the embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method, comprising:
receiving configuration information, wherein
the configuration information indicates resource availability,
the configuration information comprises identification information of a plurality of indication sets, and
each of the plurality of indication sets comprises at least one of an availability indication of a time domain resource or an availability indication of a frequency domain resource; and
determining availability of at least one of the frequency domain resource or the time domain resource based on the configuration information, wherein
the plurality of indication sets comprises a first indication set and a second indication set,
the first indication set corresponds to the availability indication of the time domain resource,
the second indication set corresponds to the availability indication of the frequency domain resource, and
the identification information of the first indication set is different from the identification information of the second indication set.

2. The method according to claim 1, wherein
the availability indication of the frequency domain resource comprises a resource availability indication of at least one resource block (RB) set group, and each of the at least one RB set group comprises a resource availability indication of an RB set group of at least one slot.

3. The method according to claim 1, wherein
the availability indication of the frequency domain resource comprises a resource availability indication of at least one slot,
the at least one slot comprises a first slot, and
the first slot further comprises a resource availability indication of at least one resource block (RB) set group.

4. The method according to claim 1, further comprising:
communicating with a communication apparatus, based on the determined availability of the at least one of the frequency domain resource or the time domain resource.

5. The method according to claim 1, wherein
the first indication set is used only to configure availability of the time domain resource, and
the second indication set is used only to configure availability of the frequency domain resource.

6. A wireless communication method, comprising:
sending configuration information, wherein
the configuration information indicates resource availability,
the configuration information comprises identification information of a plurality of indication sets, and
each of the plurality of indication sets comprises at least one of an availability indication of a time domain resource or an availability indication of a frequency domain resource; and
determining availability of at least one of the frequency domain resource or the time domain resource based on the configuration information, wherein
the plurality of indication sets comprises a first indication set and a second indication set,
the first indication set corresponds to the availability indication of the time domain resource,
the second indication set corresponds to the availability indication of the frequency domain resource, and
the identification information of the first indication set is different from the identification information of the second indication set.

7. The method according to claim 6, wherein
the availability indication of the frequency domain resource comprises a resource availability indication of at least one resource block (RB) set group, and
each of the at least one RB set group comprises a resource availability indication of an RB set group of at least one slot.

8. The method according to claim 6, wherein
the availability indication of the frequency domain resource comprises a resource availability indication of at least one slot,
the at least one slot comprises a first slot, and
the first slot further comprises a resource availability indication of at least one resource block (RB) set group.

9. The method according to claim 6, wherein
the determined availability of the at least one of the frequency domain resource or the time domain resource is used for communicating with a communication apparatus.

10. The method according to claim 6, wherein
the first indication set is used only to configure availability of the time domain resource, and
the second indication set is used only to configure availability of the frequency domain resource.

11. A device, comprising:

a processor; and a non-transitory computer-readable storage medium storing a program to be executed by the processor to cause the device to:

receive configuration information, wherein the configuration information indicates resource availability, the configuration information comprises identification information of a plurality of indication sets, and each of the plurality of indication sets comprises at least one of an availability indication of a time domain resource or an availability indication of a frequency domain resource; and determine availability of at least one of the frequency domain resource or the time domain resource based on the configuration information, wherein the plurality of indication sets comprises a first indication set and a second indication set, the first indication set corresponds to the availability indication of the time domain resource, the second indication set corresponds to the availability indication of the frequency domain resource, and the identification information of the first indication set is different from the identification information of the second indication set.

12. The device according to claim 11, wherein the availability indication of the frequency domain resource comprises a resource availability indication of at least one resource block (RB) set group, and each of the at least one RB set group comprises a resource availability indication of an RB set group of at least one slot.

13. The device according to claim 11, wherein the availability indication of the frequency domain resource comprises a resource availability indication of at least one slot, the at least one slot comprises a first slot, and the first slot further comprises a resource availability indication of at least one resource block (RB) set group.

14. The device according to claim 11, wherein the program, when executed by the processor, further causes the device to:

communicate with a communication apparatus, based on the determined availability of the at least one of the frequency domain resource or the time domain resource.

15. The device according to claim 11, wherein the first indication set is used only to configure availability of the time domain resource, and the second indication set is used only to configure availability of the frequency domain resource.

16. A device, comprising:

a processor; and a non-transitory computer-readable storage medium storing a program to be executed by the processor to cause the device to:

send configuration information, wherein the configuration information indicates resource availability, the configuration information comprises identification information of a plurality of indication sets, and each of the plurality of indication sets comprises at least one of an availability indication of a time domain resource or an availability indication of a frequency domain resource; and determine availability of at least one of the frequency domain resource or the time domain resource based on the configuration information, wherein the plurality of indication sets comprises a first indication set and a second indication set, the first indication set corresponds to the availability indication of the time domain resource, the second indication set corresponds to the availability indication of the frequency domain resource, and the identification information of the first indication set is different from the identification information of the second indication set.

17. The device according to claim 16, wherein the availability indication of the frequency domain resource comprises a resource availability indication of at least one resource block (RB) set group, and each of the at least one RB set group comprises a resource availability indication of an RB set group of at least one slot.

18. The device according to claim 16, wherein the availability indication of the frequency domain resource comprises a resource availability indication of at least one slot, the at least one slot comprises a first slot, and the first slot further comprises a resource availability indication of at least one resource block (RB) set group.

19. The device according to claim 16, wherein the determined availability of the at least one of the frequency domain resource or the time domain resource is usable for communicating with a communication apparatus.

20. The device according to claim 16, wherein the first indication set is used only to configure availability of the time domain resource, and the second indication set is used only to configure availability of the frequency domain resource.

* * * * *